US011887188B2

(12) United States Patent
Burkhardt et al.

(10) Patent No.: US 11,887,188 B2
(45) Date of Patent: Jan. 30, 2024

(54) SYSTEM AND METHOD FOR DISCRETIONARY BROKER QUOTES AND PEGGED BROKER QUOTES

(75) Inventors: Roger Burkhardt, Irvington, NY (US); Anne E. Allen, Cranford, NJ (US); Robert J. McSweeney, Merrick, NY (US); Louis G. Pastina, Belle Harbor, NY (US)

(73) Assignee: NYSE Group, Inc., New York, NY (US)

(*) Notice: Subject to any disclaimer, the term of this patent is extended or adjusted under 35 U.S.C. 154(b) by 955 days.

(21) Appl. No.: 11/545,222

(22) Filed: Oct. 10, 2006

(65) Prior Publication Data

US 2007/0219898 A1 Sep. 20, 2007

Related U.S. Application Data

(60) Provisional application No. 60/763,424, filed on Jan. 30, 2006, provisional application No. 60/725,482, filed on Oct. 10, 2005.

(51) Int. Cl.
*G06Q 40/04* (2012.01)

(52) U.S. Cl.
CPC .................................. *G06Q 40/04* (2013.01)

(58) Field of Classification Search
CPC ............................................... G06Q 40/00–08
USPC .................................................... 705/35–38
See application file for complete search history.

(56) References Cited

U.S. PATENT DOCUMENTS

| | | | | |
|---|---|---|---|---|
| 4,674,044 | A * | 6/1987 | Kalmus et al. | 705/37 |
| 5,077,665 | A * | 12/1991 | Silverman et al. | 705/37 |
| 7,475,046 | B1 * | 1/2009 | Foley et al. | 705/74 |
| 7,693,775 | B2 * | 4/2010 | Korhammer | G06Q 40/04 705/37 |
| 7,716,077 | B1 * | 5/2010 | Mikurak | G06Q 10/0631 705/7.12 |
| 7,747,509 | B2 * | 6/2010 | Burkhardt | G06Q 40/06 705/37 |
| 7,788,162 | B2 * | 8/2010 | Burkhardt | G06Q 40/03 705/37 |
| 8,626,637 | B1 * | 1/2014 | Gooch | G06Q 40/04 705/37 |
| 2002/0152153 | A1 * | 10/2002 | Nakagawa | G06Q 40/04 705/37 |
| 2002/0188552 | A1 * | 12/2002 | Kavounas | G06Q 40/04 705/37 |
| 2003/0093343 | A1 * | 5/2003 | Huttenlocher et al. | 705/35 |

(Continued)

OTHER PUBLICATIONS

Federal Register, Thursday, Mar. 13, 2003, vol. 68, No. 49 Notices pp. 12134-12138.*

(Continued)

*Primary Examiner* — Narayanswamy Subramanian
(74) *Attorney, Agent, or Firm* — DLA Piper LLP (US)

(57) ABSTRACT

To represent broker interest in a security, a system receives broker interest to buy or sell a security at a first price with a minimum trade size, and receives an order with an order trade size. The system determines whether the order trade size is greater than the minimum trade size, and responsive to determining whether the order trade size is greater than the minimum trade size, the system trades at least part of the broker interest against the order if the order trade size is greater than the minimum trade size.

24 Claims, 55 Drawing Sheets

(56) References Cited

U.S. PATENT DOCUMENTS

| | | | | |
|---|---|---|---|---|
| 2003/0233309 | A1* | 12/2003 | Matus | G06Q 40/04 705/37 |
| 2004/0034591 | A1* | 2/2004 | Waelbroeck et al. | 705/37 |
| 2004/0078317 | A1* | 4/2004 | Allen et al. | 705/37 |
| 2004/0177024 | A1* | 9/2004 | Bok | G06Q 40/04 705/37 |
| 2004/0236662 | A1* | 11/2004 | Korhammer et al. | 705/37 |
| 2005/0015323 | A1* | 1/2005 | Myr | G06Q 40/06 705/37 |
| 2005/0240510 | A1* | 10/2005 | Schweickert et al. | 705/37 |
| 2006/0015445 | A1* | 1/2006 | Burkhardt | G06Q 40/00 705/37 |
| 2006/0036532 | A1* | 2/2006 | Silverman | G06Q 30/00 705/37 |
| 2009/0281954 | A1* | 11/2009 | Waelbroeck | G06Q 40/06 705/37 |

OTHER PUBLICATIONS

Darla C. Stuckey "Amendment No. 1 to File No. SR-NYSE-2004-05 Relating to Amendments to NYSE Direct+®", Securities and Exhange Commission, Aug. 2, 2004.*

Darla C. Stuckey "Amendment No. 1 to File No. SR-NYSE-2004-05 Relating to Amendments to NYSE Direct+®", Securities and Exhange Commission, Aug. 2, 2004 (Year: 2004).*

A Taxonomy of Automated Trade Execution Systems, Ian Domowitz, Journal of International Money and Finance, (1993), 12, pp. 607-631.

* cited by examiner

AUTO EX:
3,000 @ 20.01

| 19.99 | 20.03 |
|---|---|
| 60 | 10 |

| LMT | 100ths | LMT | BRKR RES |
|---|---|---|---|
| | 20.14 | 50 | |
| | 20.05 | 45 | |
| | 20.04 | 50 | |
| | 20.03 | 10 | 10 |
| 30 | 20.01 | | 30 |
| 60 | 19.99 | | |
| 70 | 19.98 | | |
| 65 | 19.96 | | |
| | MKT | | |

SINCE INCOMING ORDER IS WITHIN THE PRICE DISCRETION RANGE SPECIFIED BY THE dQUOTE, THE ORDER TRADES
THE LMT ORDER TRADES AT THE dQUOTE DISCRETIONARY PRICE

EXECUTIONS
1. LMT/BRKR RES (dQUOTE)
3,000 @ 20.01

| 19.99 | 20.03 |
|---|---|
| 60 | 10 |

| LMT | 100ths | LMT | BRKR RES |
|---|---|---|---|
| | 20.14 | 50 | |
| | 20.05 | 45 | |
| | 20.04 | 50 | |
| | 20.03 | 10 | 10 |
| 60 | 19.99 | | |
| 70 | 19.98 | | |
| 65 | 19.96 | | |
| 20 | 19.94 | | |
| | MKT | | |

THE INSIDE QUOTE DOES NOT CHANGE, SO NO AUTO QUOTE IS TRIGGERED

FIG.3B

AUTO EX:
4,000 @ 20.02

| 19.99 | 20.03 |
| --- | --- |
| 100 | 10 |

| LMT | 100ths | LMT | BRKR RES |
| --- | --- | --- | --- |
| | 20.14 | 300 | |
| | 20.05 | 100 | |
| | 20.04 | 100 | |
| | 20.03 | 10 | 40 |
| 40 | 20.02 | | 40 |
| 100 | 19.99 | | |
| 120 | 19.98 | | |
| 100 | 19.96 | | |
| 80 | 19.94 | | |
| | MKT | | |

LMT ORDERS GET TRADED AT THEIR LIMIT PRICE WHEN TRADING WITH dQUOTES.
THE dQUOTE TRADES AT THE LESSER OF THE LIMIT ORDER PRICE OR MAX DISCRETION

EXECUTIONS
1. LMT/BRKR RES (dQUOTE)
4,000 @ 20.02

| 19.99 | 20.03 |
| --- | --- |
| 100 | 10 |

| LMT | 100ths | LMT | BRKR RES |
| --- | --- | --- | --- |
| | 20.14 | 300 | |
| | 20.05 | 100 | |
| | 20.04 | 100 | |
| | 20.03 | 10 | |
| 100 | 19.99 | | |
| 120 | 19.98 | | |
| 100 | 19.96 | | |
| 80 | 19.94 | | |
| | MKT | | |

THE INSIDE QUOTE DOES NOT CHANGE, SO NO AUTO QUOTE IS TRIGGERED

FIG.4B

AUTO EX:
4,000 @ 20.03

19.99 | 20.03
100 | 10

| LMT | 100ths | LMT | BRKR RES |
|---|---|---|---|
| | 20.14 | 300 | |
| | 20.05 | 100 | |
| | 20.04 | 100 | |
| | 20.03 | 10 | 40 |
| 100 | 19.99 | | |
| 120 | 19.98 | | |
| 100 | 19.96 | | |
| 80 | 19.94 | | |
| 40 | MKT | | |

MARKET NX ORDERS TRADES AGAINST BBO SINCE THE dQUOTE IS THE ONLY PARTY AT THE OFFER AND THERE IS NO NEED FOR THE DISCRETION

EXECUTIONS
1. LMT/BRKR RES (dQUOTE)
4,000 @ 20.03

19.99 | 20.03
100 | 10

| LMT | 100ths | LMT | BRKR RES |
|---|---|---|---|
| | 20.14 | 300 | |
| | 20.05 | 100 | |
| | 20.04 | 100 | |
| | 20.03 | 10 | |
| 100 | 19.99 | | |
| 120 | 19.98 | | |
| 100 | 19.96 | | |
| 80 | 19.94 | | |
| | MKT | | |

THE INSIDE QUOTE DOES NOT CHANGE, SO NO AUTO QUOTE IS TRIGGERED

FIG.5B

THE dQUOTE PRICE DISCRETION RANGES OVERLAP, RESULTING IN A TRADE IN THE OVERLAPPING REGION OF THE MAX DISCRETIONS, WHERE THE LATER ARRIVAL WILL EXTEND TO THE MAX DISCRETION AND TRADE THERE

<u>EXECUTIONS</u>

1. BRKR RES B/BRKR RES A: 4,000 @ 20.02

MANUAL TRADE:
3,000 @ 20.02

| 19.99 | 20.03 |
|---|---|
| 40 | 10 |

| LMT | 100ths | LMT | BRKR RES |
|---|---|---|---|
| | 20.07 | 300 | |
| | 20.05 | 100 | |
| | 20.04 | 170 | |
| | 20.03 | 10 | 40 |
| 40 | 19.99 | | |
| 140 | 19.98 | | |
| 90 | 19.96 | | |
| 200 | 19.94 | | |
| | MKT | | |

dQUOTE WILL NOT BE INCORPORATED AS ELIGIBLE QUANTITY IN THE REPORT TEMPLATE IF THE PRICE DISCRETION IS IN THE RANGE FOR A MANUAL TRANSACTION

FIG.22B

SYSTEM AND METHOD FOR DISCRETIONARY BROKER QUOTES AND PEGGED BROKER QUOTES

This application claims priority to U.S. Provisional Patent Application Ser. No. 60/725,482, entitled SYSTEM AND METHOD FOR PEGGED DISCRETIONARY BROKER QUOTE, filed Oct. 10, 2005, and U.S. Provisional Patent Application Ser. No. 60/763,424, entitled SYSTEM AND METHOD FOR PEGGED DISCRETIONARY BROKER QUOTE, filed Jan. 30, 2006, the disclosures of which are incorporated herein by reference.

The inventions described herein relate to the field of securities trading, and more particularly to systems and methods for automatic order processing and execution in conjunction with live floor auction markets.

BACKGROUND

Live floor auction markets for securities, commodities, futures and other associated financial instruments have been known for many years. A few examples include NYSE, AMEX, CME, CBOT, CBOE, and NYMEX. More recently, computer automated markets such as NASDAQ, and other computer automated order matching systems have been introduced. Each of these market types have distinct advantages in certain areas. Systems and methods are needed to provide a greater integration of the live floor auction markets with computer automated markets and order matching systems.

The preceding description is not to be construed as an admission that any of the description is prior art relative to the present invention.

SUMMARY OF THE INVENTION

In one embodiment, systems and methods are provided to represent broker interest in a security. The systems and methods comprise receiving broker interest to buy or sell a security at a first price with a minimum trade size, and receiving an order with an order trade size. The systems and methods further comprise determining whether the order trade size is greater than the minimum trade size, and responsive to determining whether the order trade size is greater than the minimum trade size, trading at least part of the broker interest against the order if the order trade size is greater than the minimum trade size.

In another embodiment, the systems and methods further comprise responsive to determining whether the order trade size is greater than the minimum trade size, trading no part of the broker interest against the order if the order trade size is less than the minimum trade size. In another embodiment of the systems and methods, the order is a market order. In another embodiment of the systems and methods, the order is a limit order.

In one embodiment, systems and methods are provided to represent broker interest in a security. The systems and methods comprise receiving broker interest to buy or sell a security at a first price with a maximum trade size, and receiving an order with an order trade size. The systems and methods further comprise determining whether the order trade size is less than the maximum trade size, and responsive to determining whether the order trade size is less than the maximum trade size, trading at least part of the broker interest against the order if the order trade size is less than the maximum trade size.

In another embodiment, the systems and methods further comprise responsive to determining whether the order trade size is less than the maximum trade size, trading no part of the broker interest against the order if the order trade size is greater than the maximum trade size.

In one embodiment, systems and methods are provided to represent broker interest in a security. The systems and methods comprise receiving broker interest to buy or sell a security at a first price with a minimum trade size, a maximum trade size and a maximum discretionary volume size, and receiving an order with an order trade size. The systems and methods further comprise determining whether the order trade size is greater than the minimum trade size and less than the maximum trade size, and responsive to determining whether the order trade size is greater than the minimum trade size and less than the maximum trade size, trading at least part of the broker interest against the order up to the maximum discretionary volume size if the order trade size is greater than the minimum trade size and less than the maximum trade size.

In another embodiment, the systems and methods further comprise responsive to determining whether the order trade size is greater than the minimum trade size and less than the maximum trade size, trading no part of the broker interest against the order if the order trade size is less than the minimum trade size or greater than the maximum trade size.

In one embodiment, systems and methods are provided to represent broker interest in a security. The systems and methods comprise receiving broker interest to sell a security at a first price with a discretion price range, and receiving an order to buy with an order trade price. The systems and methods further comprise determining whether the order trade price is less than the first price and whether the order trade price is within the discretion price range, and responsive to determining whether the order trade price is less than the first price and whether the order trade price is within the discretion price range, trading at least part of the broker interest against the order if the order trade price is less than the first price and the order trade price is within the discretion price range.

In another embodiment, the systems and methods further comprise responsive to determining whether the order trade price is less than the first price and whether the order trade price is within the discretion price range, trading no part of the broker interest against the order if the order trade price is not within the discretion price range. In another embodiment of the systems and methods, trading is at the order trade price. In another embodiment of the systems and methods, trading is at a lower limit of the discretion price range.

In one embodiment, systems and methods are provided to represent broker interest in a security. The systems and methods comprise receiving broker interest to buy a security at a first price with a discretion price range, and receiving an order to sell with an order trade price. The systems and methods further comprise determining whether the order trade price is greater than the first price and whether the order trade price is within the discretion price range, and responsive to determining whether the order trade price is greater than the first price and whether the order trade price is within the discretion price range, trading at least part of the broker interest against the order if the order trade price is greater than the first price and the order trade price is within the discretion price range.

In another embodiment, the systems and methods further comprise responsive to determining whether the order trade price is greater than the first price and whether the order trade price is within the discretion price range, trading no part of the broker interest against the order if the order trade price is not within the discretion price range. In another embodiment of the systems and methods, trading is at an upper limit of the discretion price range.

In one embodiment, systems and methods are provided to represent broker interest in a security. The systems and methods comprise receiving a limit order to sell a security at a first price, and receiving broker interest to sell a security at the first price with a discretion price range. The system and method further comprise receiving a marketable order to buy, and trading at least part of the broker interest against the marketable order at a trade price that is one cent below the first price.

In one embodiment, systems and methods are provided to represent broker interest in a security. The systems and methods comprise receiving a limit order to buy a security at a first price, and receiving broker interest to buy a security at the first price with a discretion price range. The systems and methods further comprise receiving a marketable order to sell, and trading at least part of the broker interest against the marketable order at a trade price that is one cent above the first price.

In one embodiment, systems and methods are provided to represent broker interest in a security. The systems and methods comprise receiving broker interest to buy a security at a first price, and determining that the first price is less than a published bid price. The systems and methods further comprise adjusting the first price to equal the published bid price.

In another embodiment, the systems and methods further comprise determining that the published bid price has changed to a new published bid price, and adjusting the first price to equal the new published bid price.

In one embodiment, systems and methods are provided to represent broker interest in a security. The systems and methods comprise receiving broker interest to sell a security at a first price, and determining that the first price is greater than a published offer price. The systems and methods further comprise adjusting the first price to equal the published offer price.

In another embodiment, the systems and methods further comprise determining that the published offer price has changed to a new published offer price, and adjusting the first price to equal the new published offer price.

The foregoing specific aspects are illustrative of those which can be achieved and are not intended to be exhaustive or limiting of the possible advantages that can be realized. Thus, the objects and advantages will be apparent from the description herein or can be learned from practicing the invention, both as embodied herein or as modified in view of any variations which may be apparent to those skilled in the art. Accordingly the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein.

Figure 1:
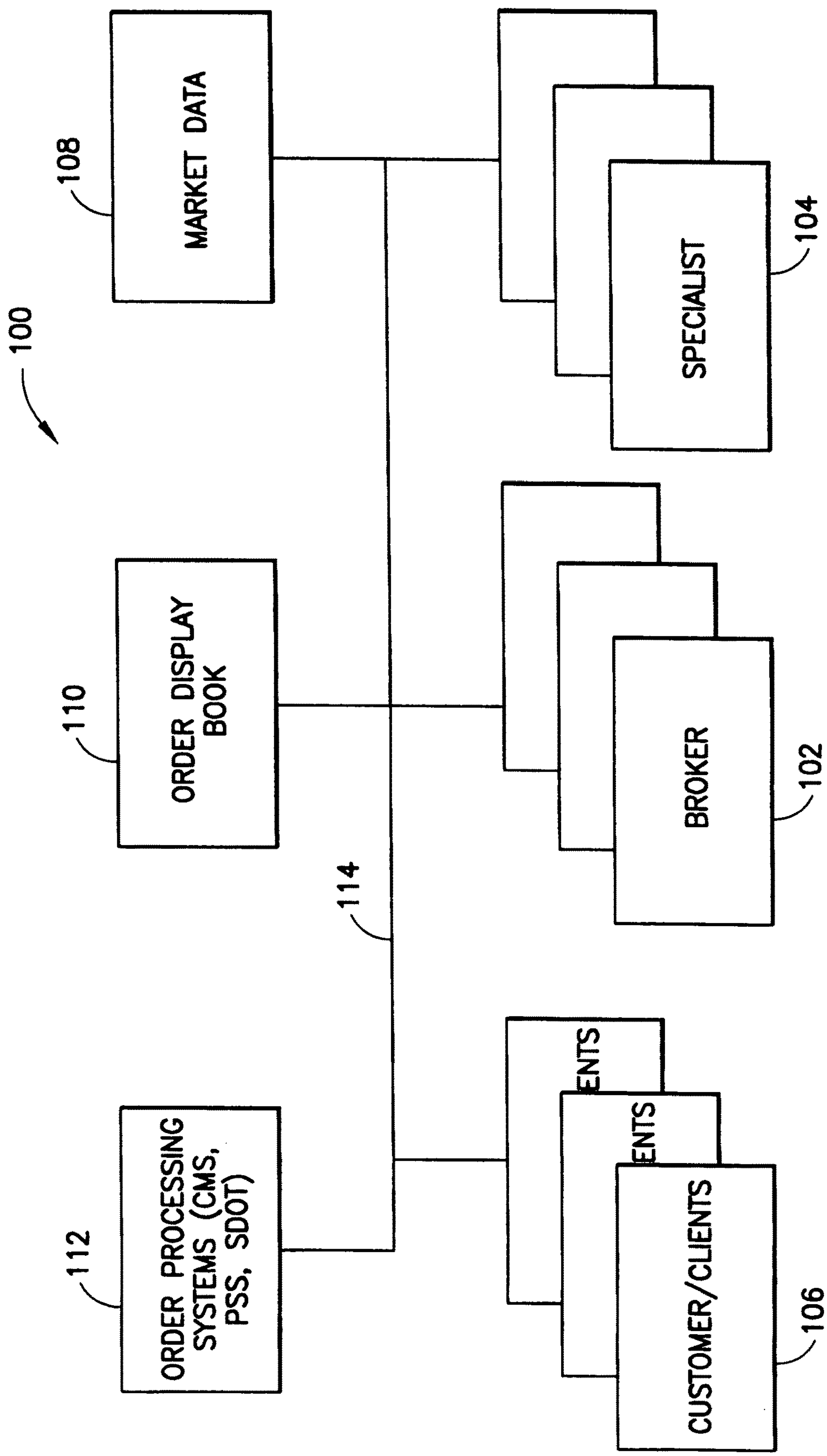
FIG. 1 illustrates an example system according to an embodiment of the inventions.

It is understood that the drawings are for illustration only and are not limiting.

DETAILED DESCRIPTION OF THE DRAWINGS

A number of embodiments and inventions are described below that generally related to securities auction markets incorporating automated order handling and execution in conjunction with a live floor auction.

Short History

In 1792 twenty-four prominent brokers and merchants gathered on Wall Street to sign the Buttonwood Agreement, agreeing to trade securities on a commission basis. The New York Stock Exchange ("NYSE") traces its beginnings to that historic pact, and since shortly after that time has operated an open-outcry exchange. Throughout, NYSE has continuously implemented technology while maintaining an open-outcry market, and recently implemented a form of automated electronic trading integrated with the open-outcry market under the name Hybrid market. In the mostly-manual pre-Hybrid market, Floor brokers had an opportunity to make trading decisions with respect to arriving orders. In a more electronic trading environment, the Floor broker may not have that opportunity. e-Quotes are one of the features implemented in Hybrid market.

Broker Interest (e-Quotes)

e-Quotes provide floor brokers with the ability to electronically represent customer interest at varying prices with respect to the orders they are handling. A broker agency interest file gives customers the benefit of floor broker knowledge and trading expertise in "working" their orders, while not precluding them from participating in electronic executions and sweeps.

Broker agency interest is not displayed publicly unless it is at or becomes the Exchange best bid or offer. When a broker's agency interest is at or becomes the Exchange best bid or offer, a minimum of 1,000 shares per broker is displayed for agency interest greater than or equal to 1,000 shares, and is included in the quote. A broker has discretion to display more than 1,000 shares of his or her agency interest at the best bid or offer. The actual amount of a broker's agency interest, if less than 1,000 shares, is displayed and included in the quote. The displayed agency interest at the best bid or offer is entitled to parity with displayed orders at the bid or offer price other than an order or broker interest entitled to priority. Broker agency interest at the best bid or offer that is not displayed ("reserve interest") must yield to displayed interest in the best bid or offer, but does participate in automatic executions provided there is sufficient contra-side liquidity. An order designated for automatic execution trades against the displayed interest in the quote and any reserve at the bid or offer price before it sweeps the order display book.

After an execution, if there is less than 1,000 shares of broker agency interest displayed at the best bid/offer, but additional amount in the reserve, the displayed amount replenishes so that at least 1,000 shares of agency interest at the best bid/offer is displayed. (For example, if there are 1,000 shares of broker agency interest displayed at the best bid/offer, and 500 shares of reserve (undisplayed at that price), and a 500 share order executes against the 1,000 shares of displayed interest, the remaining 500 shares of reserve interest is added to the 500 shares of remaining broker agency interest at the best bid/offer to total 1,000 shares displayed interest at the best bid/offer.

If what is remaining in the displayed broker agency interest and the reserve at the best bid/offer do not equal 1,000 shares, all of the reserve and remaining displayed broker agency interest at that price is displayed. (For example, if there are 1,600 shares of broker agency interest displayed at the best bid/offer, and 300 shares of reserve interest (undisplayed at that price), and a 1,500 share order executes against the 1,600 shares of displayed broker agency interest, then the remaining 100 shares of broker agency interest plus the full amount of the reserve interest (300 shares), totaling 400 shares, is displayed at the best bid/offer).

Displayed agency interest in the broker file that establishes the Exchange best bid or offer is entitled to priority at that price for one trade, as is the case with any other bid or offer. Broker agency interest that is outside the quote participates on parity during sweeps, providing liquidity to the market.

Floor broker agency interest at the same price is on parity with each other unless the interest was entitled to priority, and no interest is able to invoke precedence based on size.

Generally, floor brokers with an agency interest file must be in the crowd, representing those orders. The agency interest file allows floor brokers to represent their customers much as they do in the auction market, negotiating execution prices without being required to disclose their intentions. Parity is the agency-auction principle designed as an incentive for crowd participation in the price discovery process, to deepen liquidity particularly as it relates to the working of orders with potential market impact.

The broker agency interest file is not publicly disseminated except for the amount of agency interest displayed at the best bid or offer. The only information concerning the broker agency interest file available to the specialist is the aggregate amount of agency interest at each price. This aggregate information, which includes any reserve interest at the Exchange best bid or offer unless excluded from the aggregate as described elsewhere, is included in a specialist's response to a member's market probe.

A floor broker has discretion to remove his or her agency interest, including any reserve interest at the best bid or offer, from the aggregate information available to the specialist. Broker agency interest removed from the aggregate is displayed when it becomes, or is at, the Exchange best bid or offer. If a better bid or offer is made on the Exchange, such interest is no longer displayed and is not included in the aggregate information unless the floor broker chooses otherwise. Broker agency interest removed from the aggregate information participates in automatic executions and sweeps. It is the responsibility of the broker representing interest not included in the aggregate information to ensure that such interest is properly represented with respect to any manual trade that may occur because the specialist does not have any knowledge of such interest.

Broker Interest with Discretion (d-Quotes)

While e-Quotes as described above enable Floor brokers' customer interest to participate in automatic executions at the Exchange best bid and offer ("BBO") and in sweeps, e-Quotes do not initiate trades with incoming orders at prices better than the BBO. In other words, e-Quotes do not provide Floor brokers with the means to express a price range within which they are willing to actively trade.

The embodiments described herein provide Floor brokers with the ability not only to quote in an attempt to draw interest, but, at the same time, initiate trades with contra-side interest able to trade at prices at or within the BBO. By using d-Quotes, a Floor broker may set a discretionary price range and a discretionary size range. Discretionary size can apply to the amount of a d-Quote to which discretionary instructions apply and/or to the amount of contra-side volume with which the d-Quote is willing to trade, as described below. Discretionary instructions are only active when the d-Quote is at the BBO. Neither the specialist on the Floor nor the specialist system employing algorithms have access to the discretionary instructions entered by the Floor broker.

Discretionary instructions with d-Quotes allow Floor brokers to set a price range for their d-Quotes within which they are willing to initiate or participate in a trade. This discretion is used, as necessary, to initiate or participate in a trade with an incoming order capable of trading at a price within the discretionary range. Discretionary price instructions may apply to all or part of a d-Quote.

For example, the BBO is 0.05 bid, offered at 0.10. A Floor broker enters a d-Quote to sell at 0.10, with price discretion of 0.04. A limit order to buy at 0.06 enters the market. The d-Quote will use its four cents of price discretion and initiate a trade at 0.06.

When a d-Quote is competing with same-side quoted or trading interest (i.e. displayed interest at the BBO, other d-Quotes, or a same-side specialist algorithmic trading message, such as to provide price improvement), if the d-Quote can get a larger allocation by providing an additional penny (or more) of price improvement and the discretionary instructions permit the d-Quote to trade at that price, it will do so.

Floor brokers who use d-Quoting price discretion may also set a minimum and/or maximum size limit with respect to the size of contra-side interest with which it is willing to trade using price discretion. This allows for more specific order management by preventing the d-Quote from trading with opposite side interest that the Floor broker has judged to be too little or too great in the context of the order or orders he or she is managing.

For example, the BBO is 0.05 bid, offered at 0.10. A Floor broker d-Quotes stock to sell at 0.10, with price discretion of 0.04 and minimum/maximum volume discretion of 1,000/10,000 shares. A limit order to buy 500 shares at 0.06 enters the market. No trade will occur, even though a trade at 0.06 is within the d-Quote's price discretion range, because the incoming order size is below the d-Quote's minimum discretionary volume size. A new best bid of 0.06 is auto-quoted. An order to buy 1,500 shares at 0.06 enters the market. The d-Quote will initiate a transaction, selling 2,000 shares at 0.06, as the size available to trade at 0.06 is now within the d-Quote's discretionary volume parameters. Similarly, a sufficient reduction in the size of a bid or offer that was previously larger than the maximum discretionary volume will trigger an execution of a d-Quote.

Only published contra-side volume is considered when determining whether such volume is within the d-Quote's discretionary volume range. Reserve and other interest at the possible execution price is not considered, as it is not displayed. Interest displayed by other market centers at the price at which a d-Quote may trade is not considered when determining if the minimum volume range is met, unless the Floor broker electronically designates that such away volume should be included in this determination.

Pegging Broker Interest to the BBO

In the Hybrid market, a Floor broker needs to be represented in the BBO in order to participate in automatic executions. e-Quotes and d-Quotes provide Floor brokers with the mechanism to be part of the quote at the BBO. However, in a more automated environment, the BBO may change rapidly and Floor brokers may be unable to stay with a quickly changing BBO. In another embodiment a pegging function allows Floor brokers to keep their interest in the quote at the BBO, even as the BBO moves. Floor brokers designate a range to which their e-Quotes or d-Quotes peg and, as long as the BBO is within that range, the e-Quote or d-Quote will be included. Buy side e-Quotes or d-Quotes peg to the best bid, and sell side e-Quotes or d-Quotes peg to the best offer.

In addition, pegging e-Quotes or d-Quotes may set a minimum and/or maximum size of same-side volume to which the e-Quote or d-Quote will peg. Pegging e-Quotes or d-Quotes may set a "quote price" specifying the lowest price to which a buy-side e-Quote or d-Quote may peg and the highest price to which a sell-side e-Quote or d-Quote may peg. A "ceiling price" may be set to establish the highest price to which a buy-side e-Quote or d-Quote may peg, and a "floor price" may be set to establish the lowest price to which a sell-side or e-Quote or d-Quote may peg. The quote, ceiling and floor prices must be at or within the limit price of the order being e-Quoted or d-Quoted.

A pegging d-Quote's price discretion range will move along with the d-Quote as it pegs. Pegging is a separate type of discretionary instruction and may occur with d-Quotes using discretionary price instructions.

Example

A Floor broker is representing an order to buy 4,000 shares of XYZ with a limit of 0.97, not-held. He decides to electronically represent this order as a d-Quote, with a quote price of 0.92 and with price discretion of 0.02, in the hope of obtaining a better execution price for his customer. This means that the Floor broker is willing to participate in an execution at the following prices: 0.92, 0.93 and 0.94. Further, he has decided to display 1,000 shares, with 3,000 in reserve. In addition, the Floor broker has decided to have this order peg, with minimum and maximum volume sizes of 500 and 8,000 shares respectively. The Floor broker has set the ceiling price at 0.97. This means that as long as the Exchange best bid is a minimum of 500 shares and no more than 8,000 shares, the d-Quote would peg to any Exchange best bid at or between 0.92 and 0.97.

The Exchange best bid becomes 2,000 shares bid for 0.94. As this is within the minimum and maximum pegging size range, the order will peg to the 0.94 bid, increasing the displayed size at that price to 3,000 shares (2,000 shares that established that price and the d-Quote's displayed 1,000 shares). The Exchange best bid then becomes 300 shares bid for 0.95. The d-Quote will not peg to that best bid, as its size is below the minimum pegging size designated by the Floor broker. If an additional 400 shares is added to the best bid as a result of other interest at that price, the d-Quote will peg to it, increasing the displayed size to 1,700 shares. Similarly, if the displayed volume at 0.95 increased from 300 shares to 10,000 shares (instead of 700 shares), the d-Quote would not peg to that price, as 10,000 shares is more than the maximum pegging size selected by the Floor broker (which was 8,000 shares, as noted above). Again, if the displayed volume at 0.95 decreases to 6,000 shares, for example, as a result of a trade at that price, the d-Quote will peg to the 0.95 bid, as the displayed volume size is now lower than the maximum selected by the Floor broker. 7,000 shares will be bid at 0.95, with the d-Quote's 3,000 shares in reserve.

As the d-Quote pegs, it continues to be able to use its price discretion of 0.02 to effect a trade. Accordingly, if 7,000 shares is bid at 0.95, comprised of 6,000 shares of other interest and 1,000 shares of the d-Quote (with 3,000 shares of the d-Quote in reserve at 0.95) and the Exchange best offer is 0.97 for 1,700 shares, the d-Quote will initiate an execution, trading 1,700 shares at 0.97. The d-Quote's reserve size will be decremented by the amount of the trade, leaving 1,300 shares to buy in reserve, with 1,000 shares displayed. The best bid continues to be 0.95, so the d-Quote remains pegged at that price. The displayed volume at 0.95 continues to be 7,000 shares, including the displayed portion of the d-Quote (1,000 shares).

General Principles Covering d-Quotes and Pegging

Discretionary instructions relate to the price at which the d-Quote may trade and the number of shares to which the discretionary price instructions apply.

The goal of discretionary trading is to secure the largest execution for the d-Quote, using the least amount of price discretion. In so doing, d-Quotes may often improve the execution price of incoming orders. Conversely, if no discretion is necessary to accomplish a trade, none will be used.

Discretionary instructions are only active when the d-Quote is at the BBO.

Neither the specialist on the Floor nor the specialist system employing algorithms have access to the discretionary instructions entered by the Floor broker.

Specialists do not have the ability to enter discretionary trading or pegging instructions on behalf of a Floor broker.

The minimum price range for a d-Quote is the minimum price variation set forth in Rule 62.

The requirements for e-Quoting apply to the d-Quote, including the requirement that the Floor broker be in the Crowd.

Discretionary instructions apply to displayed and reserve size, including reserve interest that is excluded from the aggregate volume visible to the specialist on the Floor.

When price discretion is used, d-Quotes trade first from reserve volume, if any, and then from displayed volume.

Once the total amount of a Floor broker's discretionary volume has been executed, the d-Quote's price instructions will become inactive and the remainder of that d-Quote will be treated as an e-Quote.

Discretionary instructions are only applicable to automatic executions, they are not utilized in manual transactions.

Discretionary instructions may be entered for all d-Quotes, however, these instructions are only active when the d-Quote is at or joins the existing Exchange BBO or would establish a new Exchange BBO.

Multiple same-side d-Quotes from different Floor brokers will compete for an execution with the most aggressive price range (e.g. three cents vs. two cents) establishing the execution price. If the incoming order remains unfilled at that price, executions within the less aggressive price range may occur.

d-Quotes with the same discretionary price instructions on the same side will trade on parity, after any interest entitled to priority.

d-Quotes on opposite sides of the market will be able to trade with each other. The d-Quote that arrived last will use the most discretion, if necessary, to effect a trade.

d-Quotes will compete with same-side specialist algorithmic trading messages targeting incoming orders. If the price of d-Quotes and the trading messages are the same, the d-Quotes and the specialist messages will trade on parity.

If a d-Quote is competing with same-side quoted or trading interest, including a same-side specialist algorithmic trading message (i.e. to provide price improvement) and the d-Quote can get a larger allocation by providing an additional penny of price improvement (or other applicable minimum price variation), generally, it will do so.

d-Quotes may price improve and trade with an incoming contra-side specialist algorithmically-generated message to "hit bid/take offer," just as they can with any other marketable incoming interest.

d-Quotes may initiate sweeps, but only to the extent of their price and volume discretion. d-Quotes may participate in sweeps initiated by other orders, but their discretionary instructions will not be active.

A sweep involving a d-Quote will always stop at least one cent (or other applicable minimum price variation) before a liquidity replenishment point is reached.

Executions involving d-Quotes will comply with the Regulation NMS Order Protection Rule ("OPR").

When a better price is displayed by an away market and such price is in the middle of contra-side d-Quotes, the amount of price discretion extended to a participating d-Quote will be adjusted to permit a trade consistent with Reg. NMS OPR requirements.

Discretionary instructions will be applied only if all d-Quoting prerequisites are met. Otherwise, the d-Quote will be handled as a regular e-Quote, notwithstanding the fact that the Floor broker has designated the e-Quote as a d-Quote.

When price discretion is used, d-Quotes trade first from reserve volume, then from published volume. When no price discretion is used, the d-Quote is treated as an e-Quote and the e-Quote's published volume trades first.

Floor brokers may specify that price discretion applies to all or only a portion of their d-Quote. Price discretion is necessary for d-Quotes. Therefore, if price discretion is provided for only a portion of the d-Quote, the residual will be treated as an e-Quote.

Floor brokers may have more than one e-Quote/d-Quote per side and price. Trading volume is allocated by broker, not e-Quote/d-Quote, in accordance with Exchange rules.

Pegging e-Quotes and d-Quotes may set a "quote price" specifying the lowest price to which a buy-side e-Quote or d-Quote may peg and the highest price to which a sell-side e-Quote or d-Quote may peg. A "ceiling price" may be set to establish the highest price to which a buy-side e-Quote or d-Quote may peg, and a "floor price" may be set to establish the lowest price to which a sell-side e-Quote or d-Quote may peg. The quote, ceiling, and floor prices must be at or within the limit price of the order being e-Quoted or d-Quoted.

Pegging will not establish a new BBO and it will not generally sustain a BBO when there is no other interest at that price. If the BBO is the lowest quotable price established by the Floor broker for a pegging buy-side e-Quote or d-Quote or the highest quotable price established by the Floor broker for a sell-side pegging e-Quote or d-Quote and all other interest at that price cancels or is executed, the pegging e-Quote or d-Quote will remain displayed at such BBO.

Pegging will only occur at prices within the pegging price range designated by the Floor broker.

Pegging applies to the entire e-Quote/d-Quote volume.

Pegging is reactive and moves in both directions.

Pegging e-Quotes and d-Quotes peg only to other non-pegging interest within the pegging range selected by the Floor broker.

Pegging is available only when auto-quoting is on.

Price priority cannot be established by pegging, although the existence of pegging instructions does not preclude an e-Quote or a d-Quote from having priority.

Pegging e-Quotes and d-Quotes trade on parity with other interest on the same side at the Exchange best bid or offer after interest entitled to priority.

Discretionary trading and pegging is not available for tick-sensitive e-Quotes.

An e-Quote may have either or both discretionary trading (i.e., it is a d-Quote), and pegging instructions.

As a d-Quote pegs, its discretionary price range moves along with it, subject to any floor or ceiling price set by the Floor broker.

Pegging e-Quotes and d-Quotes may establish a minimum and/or maximum size of same-side volume to which it will peg. Other pegging e-Quote or d-Quote volume will not be considered in determining whether the volume parameters set by the Floor broker have been met.

An Example System

Referring to FIG. 1, an example system 100 according to various embodiments of the inventions includes Brokers 102, Specialists 104, and Customers or clients 106, who generate orders, or participate in the management and execution of orders. System 100 also includes source of market date or other information 108 that is relevant to decision making by Brokers 102, Specialists 104 and Customers or clients 106. Tools for a specialist to manage and view orders, such as an order display book 110 are also part of system 100. Other order processing systems 112, such as a Common Message Switch (CMS), Post Support System (PSS), and Designated Order Turnaround (SDOT) as well as network(s) 114 connecting the various elements are part of system 100. Although not illustrated in the figure, elements of system 100 that are used by the brokers, specialists and customers include general purpose computers, as well as special purpose computers, such as handheld devices. The computers generally include a central processor (CPU), memory for processing software instructions that is stored on fixed and removable media, as well as input/output devices such as keyboards, monitors, printers, pointing devices, and system busses. All of these systems use information signals to communicate as needed. Network 114 may be a LAN, WAN, the Ethernet, the PSTN, or any form of wireless or wired network.

Examples of the Methods

Figure 2:
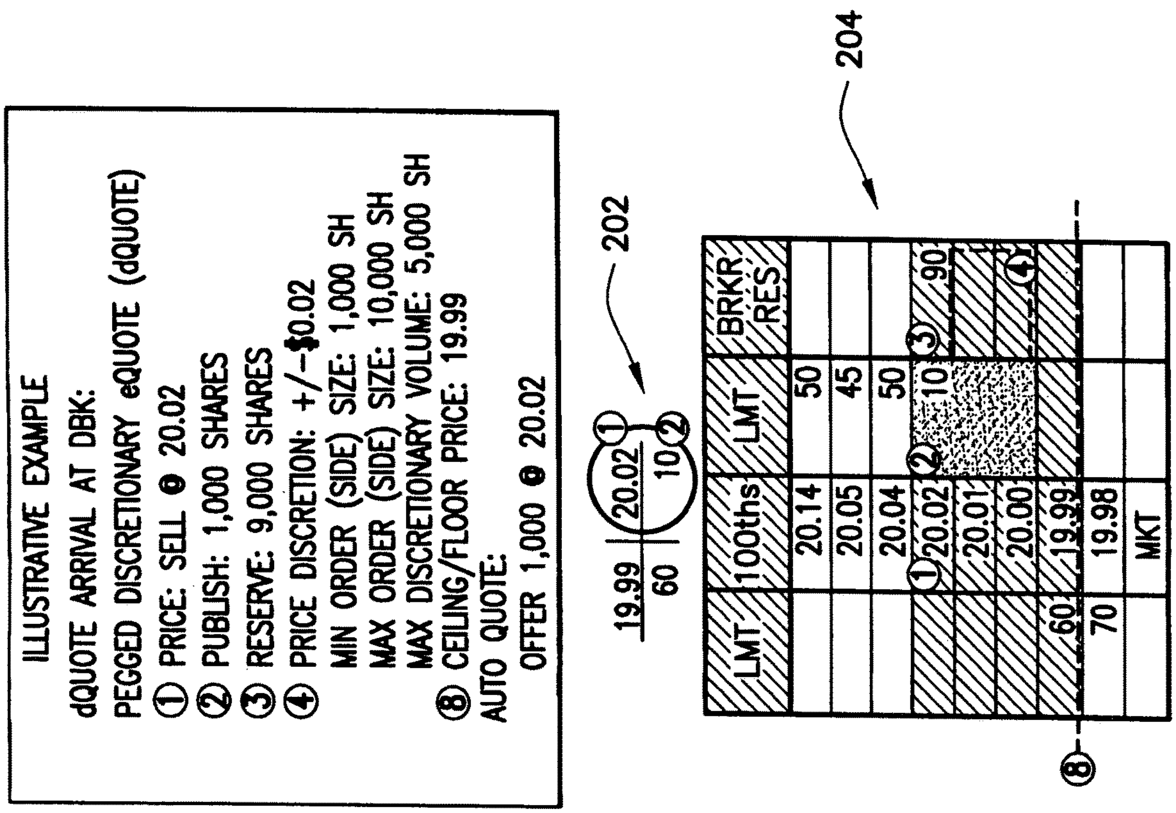
FIG. 2 illustrates a legend for use with FIGS. 3-32.

The description above explains the various embodiments of the inventions. Examples of those embodiments are provide in the figures and described below. In figures used to describe the examples, an example order display is provided to show progress as an order is handled and executed. FIG. 2 provides a legend for FIGS. 3-32, and is a pictorial representation of the state of the market (i.e., Exchange best bid or offer) order arrivals and executions. As is customary, quantities are in round lots (100's) and the illustrations show an action on an order display book after an event happens. The displays are illustrative to show the methods and are not limiting.

In FIG. 2, the Exchange best bid and best offer is illustrated at 202. The best bid is the highest price that someone is willing to pay to buy the security, while the best offer is the lowest price that someone is willing to sell the security. The numbers above the cross are the prices of the best bid and best offer, while the numbers below the cross are the size or number of shares at the respective best bid and best offer. The size is in round lots of 100, so as illustrated in FIG. 2, the best bid is $19.99 and the number of shares bid at $19.99 is 6,000. The best offer is $20.02 and the number of shares offered at $20.02 is 1,000. The spread is the difference between the bid and offer, and in FIG. 2 the spread is three cents ($0.03). Immediately below the best bid and best offer, is a table 204 that shows orders and interest on an order display book format. The columns on the left and right (labeled LMT for limit orders) include a number of shares (again in round lots of 100 shares) at the price in the center column. The prices are arranged in order with highest prices at the top and lowest prices at the bottom. The order display book may show limit orders, as well as broker interest and specialist interest. An action corresponding to an event is circled, and market orders are identified at the bottom of the table When a broker enters a d-Quote, the d-Quote has a price to buy or sell. As illustrated in FIG. 2, the price is $20.02 and the d-Quote is to sell. The d-Quote also has a published volume, which is a number of shares that are for publication (display to other traders and the specialist). As with e-Quotes, a d-Quote is not published unless it is at the best bid or offer. In FIG. 2, the number of shares for publication is 1,000, which in one embodiment is the same minimum number of shares that must be published as for an e-Quote.

The d-Quote may also have a reserve volume, which is a number of shares that will not be published in the quote, but which are available for execution within the discretionary price range. Reserve volume is not required in a d-Quote. In FIG. 2, the reserve volume is 9,000 shares. Before this d-Quote is entered, the best offer is $20.04 for 5,000 shares. When the broker enters the d-Quote illustrated in FIG. 2, for 10,000 total shares to sell at $20.02, with 1,000 shares published, and 9,000 shares reserve that d-Quote becomes the best offer. As the new best offer, 1,000 shares are published at $20.02. Although the 9,000 shares are also at the same offer price of $20.02, they are not published in the display book. Price, published volume and reserve volume are features available for an e-Quote and also for a d-Quote.

The d-Quote in FIG. 2 also includes price discretion of +/−$0.02. The price discretion is the range away from the BBO where the d-Quote may be triggered and executed. A d-Quote may also include a minimum order (side) size and a maximum order (side) size, and in FIG. 2, the d-Quote minimum order (side) size is 1,000 shares, while the maximum order (side) size is 10,000 shares. When a broker enters a minimum order (side) size, the discretionary feature is only active for incoming orders (or aggregate contra-size) of at least this amount of shares, per price point. Similarly, when a broker enters a maximum order (side) size, the discretionary feature is only active for incoming orders (or aggregate contra-size) of maximum this amount of shares, per price point. When a broker enters a maximum discretionary volume, that is the maximum amount of shares that are eligible for discretion out of the total quote volume. In FIG. 2, the maximum discretionary volume is 5,000 shares. Discretionary price range, minimum order (side) size, maximum order (side) size, and maximum discretionary volume are features available for a d-Quote.

If the broker enters a ceiling/floor price, that is the maximum/minimum price at which the quote will trade (no price discretion will be extended beyond this price). In the embodiments described here, entry of a ceiling/floor price is a pegging feature and it attempts to peg the quote to either the best bid (for buy d-Quotes) or the best offer (for sell d-Quotes). One advantage of a pegging feature is related to the discretionary feature of a d-Quote, which can only be active when the d-Quote is in the best bid or offer. As markets become more automated, the best bid or offer may change very rapidly and the broker may have difficulty manually keeping the d-Quote at the best bid or offer. Therefore to allow the d-Quote to participate in more trades, the pegging feature attempts to automatically peg the d-Quote to either the best bid (for buy quotes) or the best offer (for sell quotes). In FIG. 2, the ceiling/floor price is $19.99. All of these features are described further below.

Figure 3A:
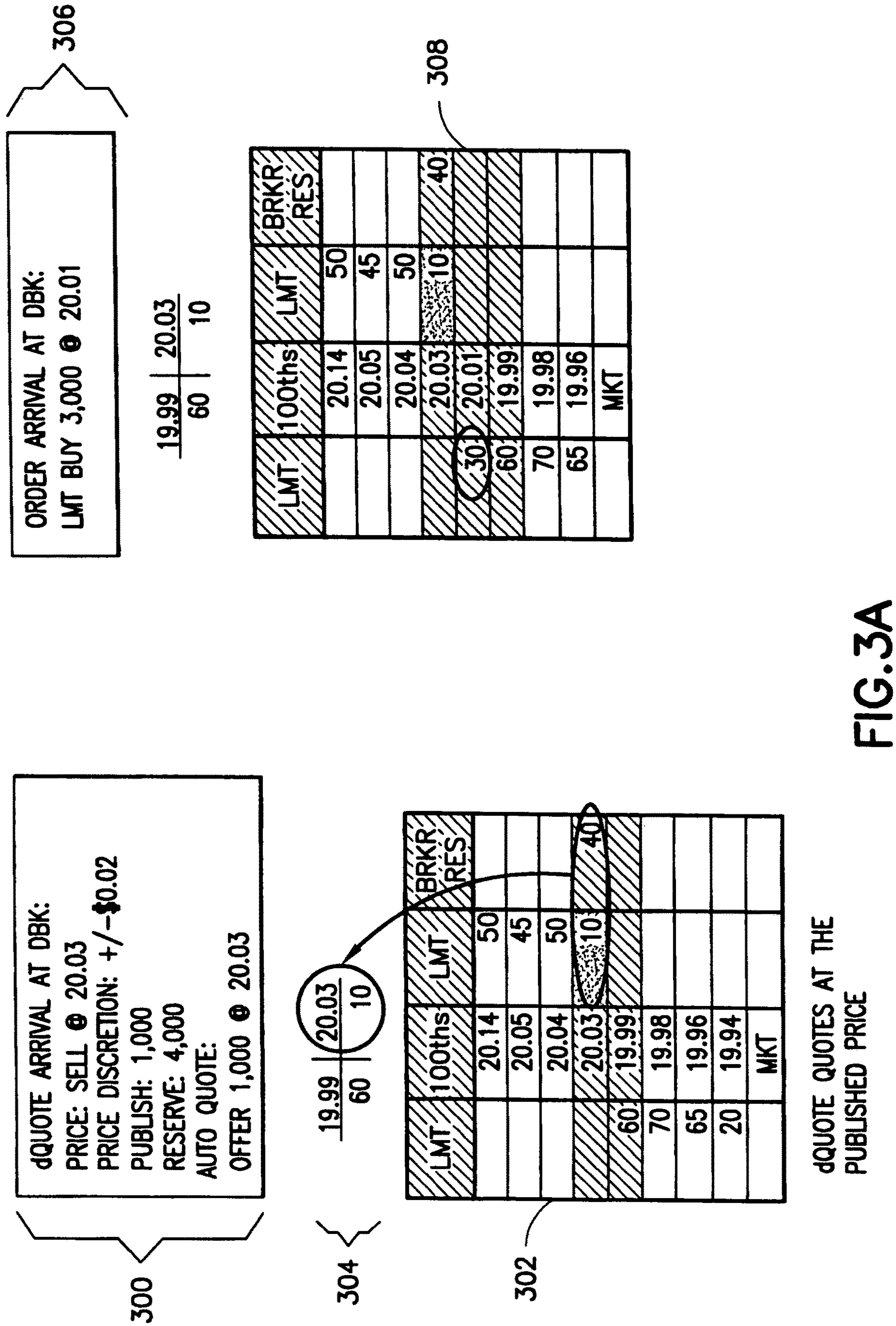
FIGS. 3-33 illustrate order transactions in various embodiments of the inventions.

FIGS. 3A and 3B illustrate a d-Quote trading against an incoming (quotable or marketable) limit order with the incoming limit order price within the discretionary price of the d-Quote. A broker enters a d-Quote (300) to sell 5,000 shares at $20.03, with price discretion of +/−$0.02, publish 1,000 shares, and 4,000 shares in reserve. Before entry of the d-Quote, the best offer to sell was $20.04 for 5,000 shares (302). When system 100 receives the d-Quote, it determines that the d-Quote is establishing a new best offer, and autoquotes the new best bid and offer (304) as 6,000 shares bid at $19.99 and 1,000 shares offered at $20.03. The 4,000 shares in reserve is not reflected in the best offer.

System 100 then receives a limit order to buy 3,000 shares at $20.01 (306, 308). Without the price discretion of the d-Quote, that new limit order to buy 3,000 shares at $20.01 would be simply entered into the display book as the new best bid. However, with the price discretion, system 100 determines that price of the incoming order ($20.01) is within the price discretion of the d-Quote ($20.03+/−0.02), and in FIG. 3B system 100 automatically executes the order at $20.01. The order is filled first from the reserve. In the example, the reserve was 4,000 shares and the order fill only required 3,000 shares, leaving 1,000 shares of reserve. This also means that none of the broker's published interest is needed to fill the order. As a result, the inside quote does not change and no auto quote is triggered.

Figure 4A:
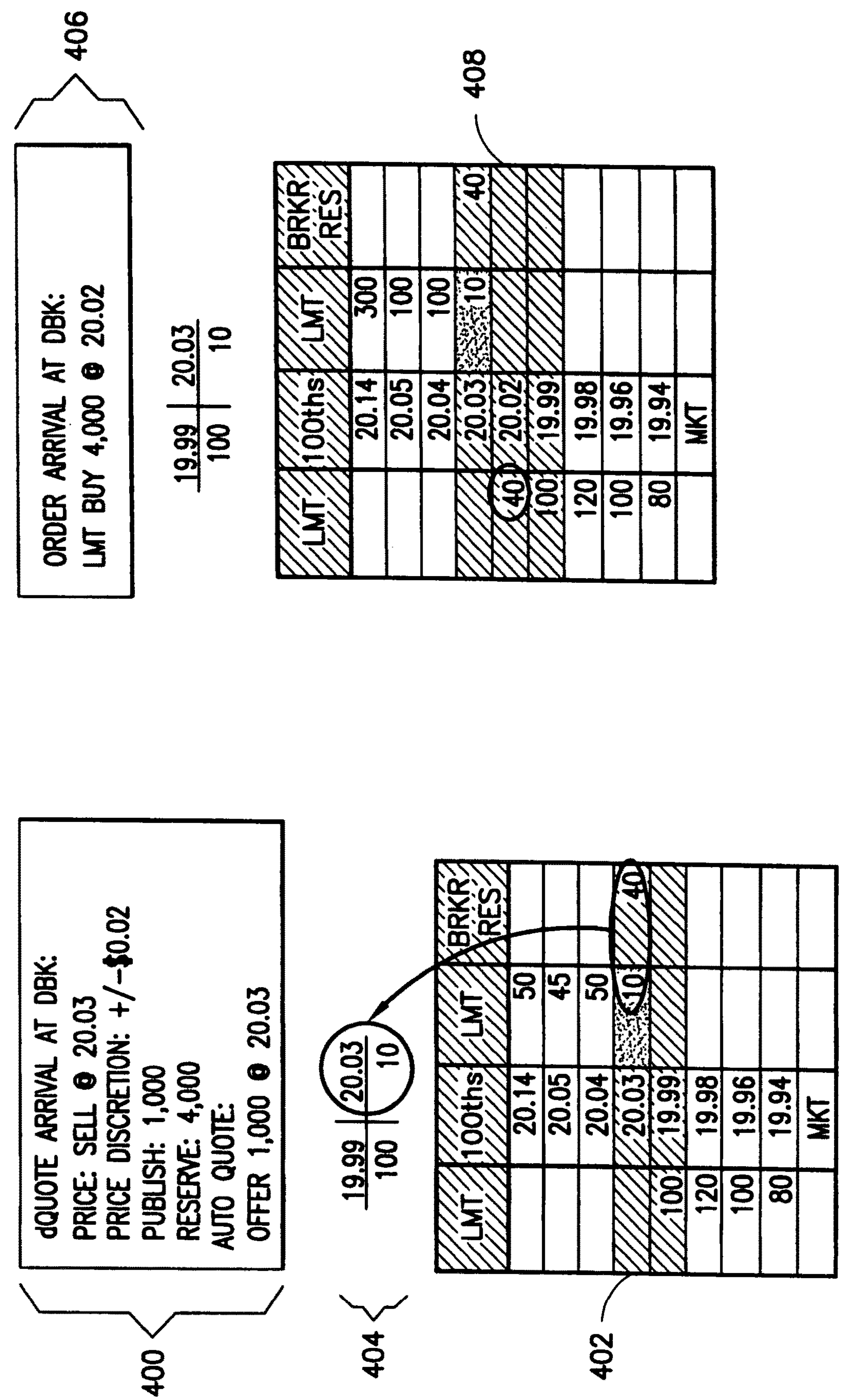

FIGS. 4A and 4B illustrate a d-Quote trade with an incoming (quotable or marketable) order at the lesser of the maximum discretion or the limit price. A broker enters a d-Quote (400) to sell 5,000 shares at $20.03, with price discretion of +/−$0.02, publish 1,000 shares, and 4,000 shares in reserve. As in FIG. 3, this establishes a new best offer, which is autoquoted (402, 404). System 100 then receives a limit order to buy 4,000 shares at $20.02 (406, 408), and determines that price of the incoming order ($20.02) is within the price discretion of the d-Quote ($20.03+/−0.02). In FIG. 4B system 100 automatically executes the order at $20.02. That is the limit price of the order, and the d-Quote trades at the lesser of the limit order price or the maximum discretion. The order is filled first from the reserve. In the example, the reserve was 4,000 shares and the order fill required 4,000 shares, leaving no shares of reserve. However, this also means that none of the broker's published interest is needed to fill the order. As a result, the inside quote does not change and no auto quote is triggered.

Figure 5A:
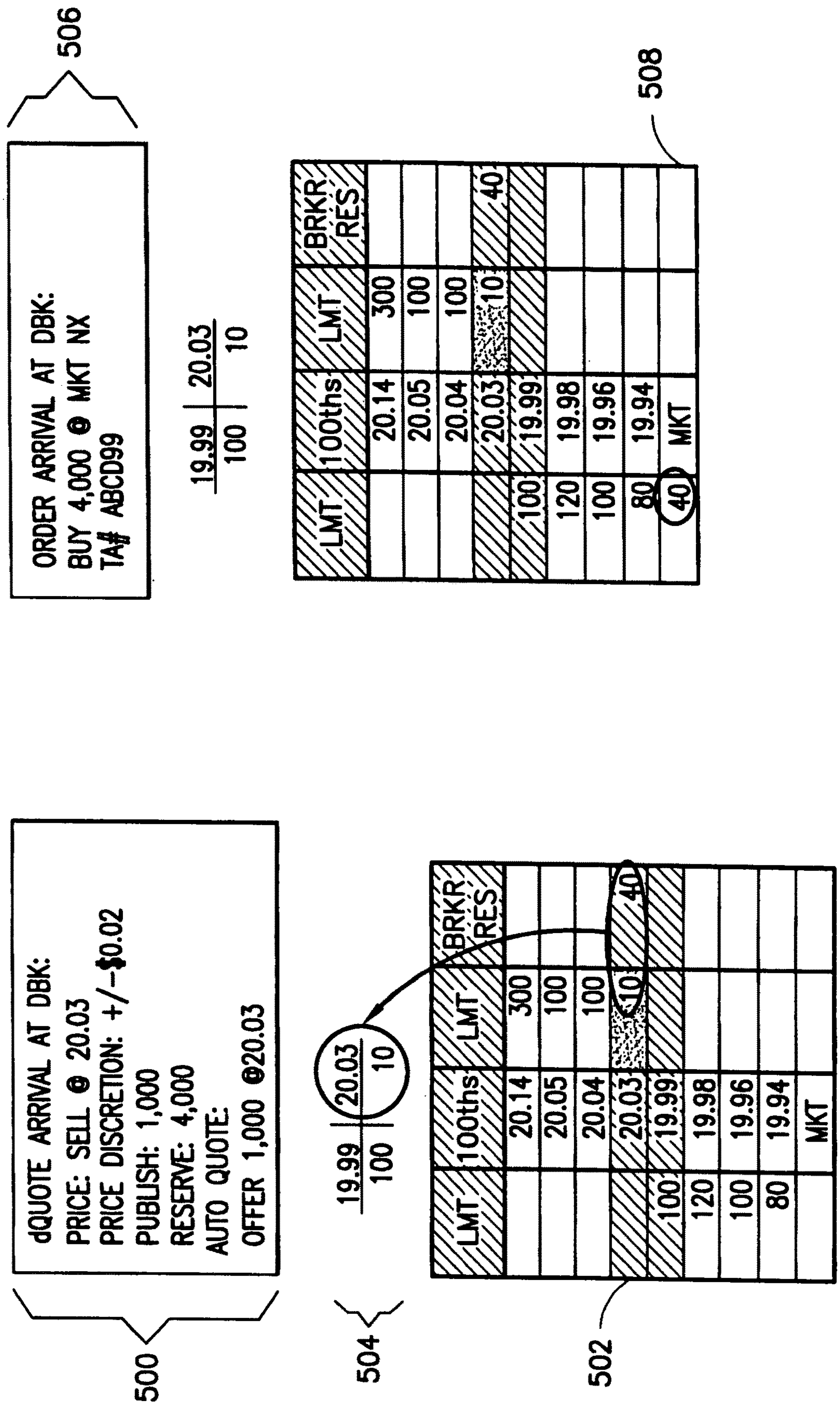

FIGS. 5A and 5B illustrate a d-Quote trade with an incoming market order at the best bid or offer ("BBO") if the d-Quote can be filled at the BBO. A broker enters a d-Quote (500) to sell 5,000 shares at $20.03, with price discretion of +/−$0.02, publish 1,000 shares, and 4,000 shares in reserve. As in FIG. 3, this establishes a new best offer, which is autoquoted (502, 504). System 100 then receives a market order to buy 4,000 shares (506, 508), and determines that the d-Quote is the only party at the offer and there is no need for discretion. In FIG. 4B system 100 automatically executes the order at $20.03, which is the best offer. The order is filled entirely from the reserve and leaves no shares of reserve. However, this also means that none of the broker's published interest is needed to fill the order. As a result, the inside quote does not change and no auto quote is triggered.

Figure 6:
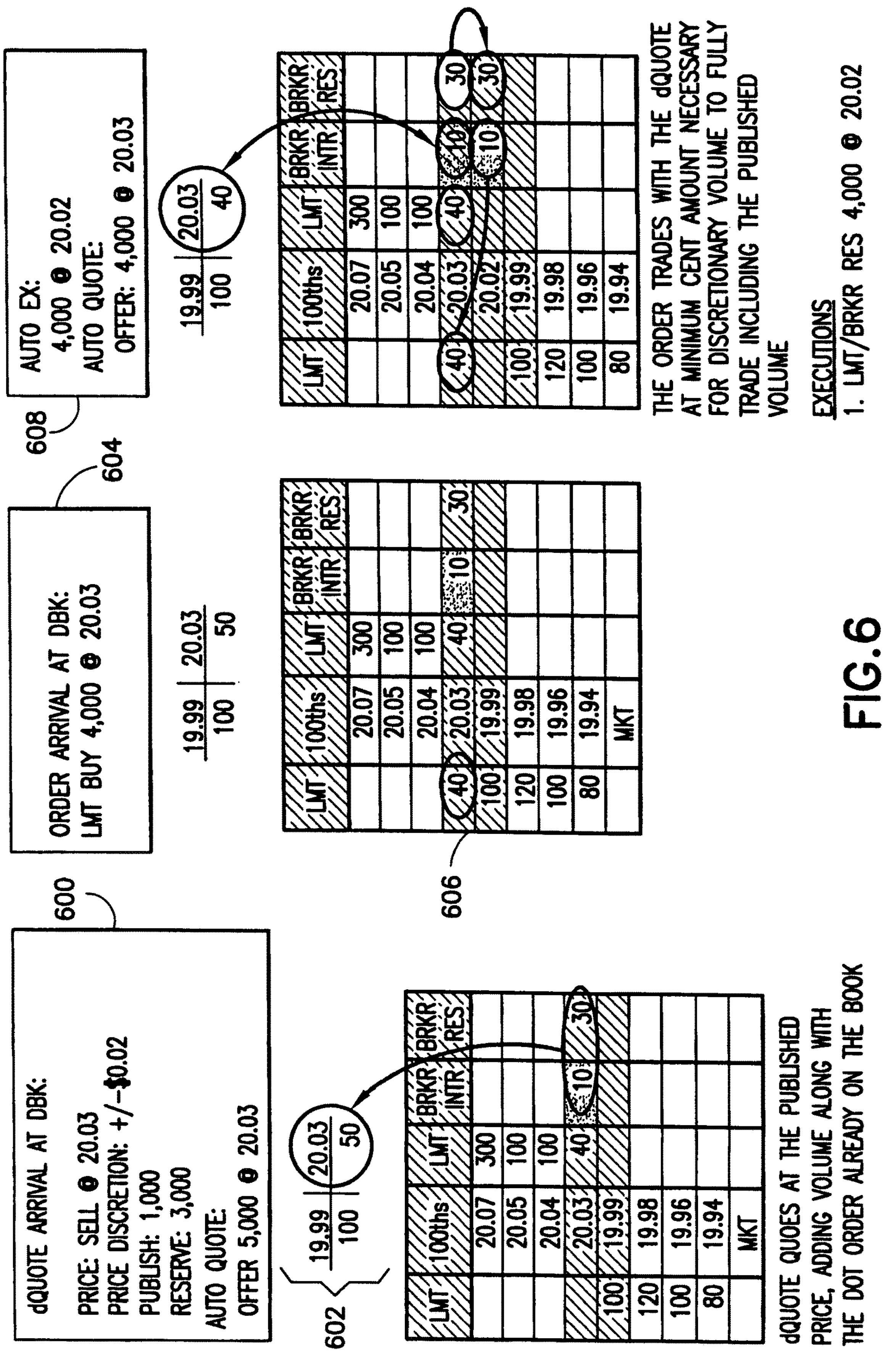

FIG. 6 illustrates an offer that includes a d-Quote and a DOT order on the book, and trade of an incoming marketable limit order against the d-Quote at a penny better than the offer. A broker enters a d-Quote (600) to sell 4,000 shares at $20.03, with price discretion of +/−$0.02, publish 1,000 shares, and 3,000 shares in reserve. There was already a DOT order to sell 4,000 shares on the display book at $20.03, which was the best offer. Therefore, the d-Quote adds 1,000 shares of volume to the DOT order, which is then autoquoted as the new best offer (602). System 100 then receives a marketable limit order to buy 4,000 shares at $20.03 (604, 606). Because system 100 determines that the d-Quote is not the only party at the offer, there is need for discretion. The d-Quote has 4,000 shares available for discretion, so system 100 automatically executes the limit order at $20.02 (608), which is one penny better than the best offer at $20.03. The 4,000 share order fill takes all of the d-Quote reserve (3,000 shares) and also all of the d-Quote published interest (1,000 shares). As a result, the inside quote must change, and the best offer is autoquoted.

Figure 7:
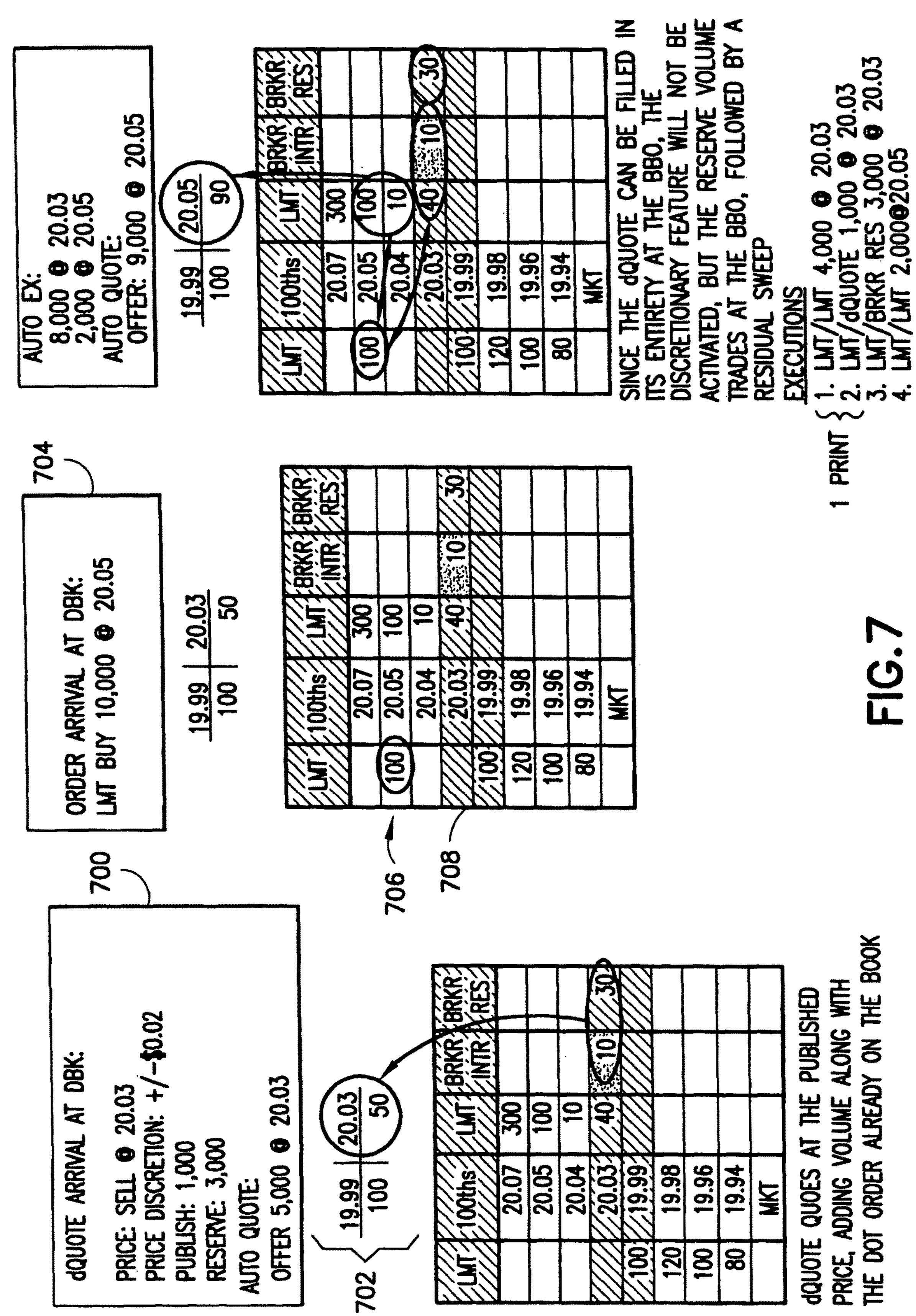

FIG. 7 illustrates an offer that includes a d-Quote and a DOT order on the book, and trade of an incoming crossing order with a sweep against the d-Quote. If the d-Quote can be filled at the BBO, then discretion is not active and the order trades at the BBO. A broker enters a d-Quote (700) to sell 4,000 shares at $20.03, with price discretion of +/−$0.02, publish 1,000 shares, and 3,000 shares in reserve. There was already a DOT order to sell 4,000 shares on the display book at $20.03, which was the best offer. Therefore, the d-Quote adds 1,000 shares of volume to the DOT order, which is then autoquoted as the new best offer (702). System 100 then receives a limit order to buy 10,000 shares at $20.05 (704, 706). This is a crossing order that has the potential to sweep the book because the best offer to sell is $20.03 (708). System 100 determines that the d-Quote can be filled in its entirety at the BBO, and the discretion feature is not activated. The reserve volume also trades at the BBO and any residual sweeps the book. The first 4,000 shares are executed against the DOT order at $20.03. The next 1,000 shares are executed against the published 1,000 shares of the d-Quote. The next 3,000 shares are executed against the broker reserve. This leaves 2,000 shares to sweep the book at $20.05. Embodiments for order sweep are described in application Ser. No. 11/183,279, published as 2006-0015447 A1, the disclosure of which is incorporated herein by reference. As a result, the inside quote must change, and the best offer is autoquoted.

Figure 8A:
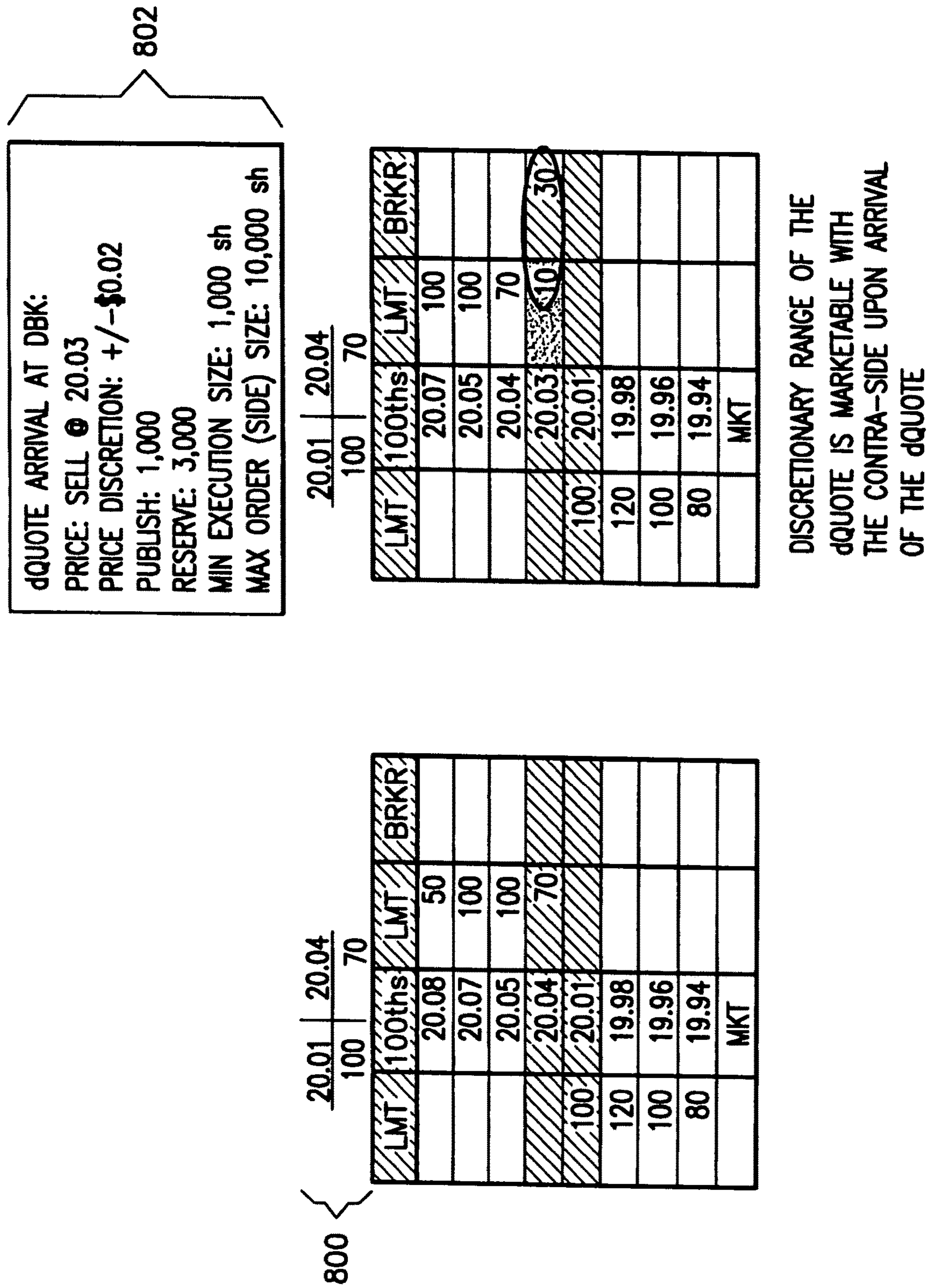
Figure 8B:
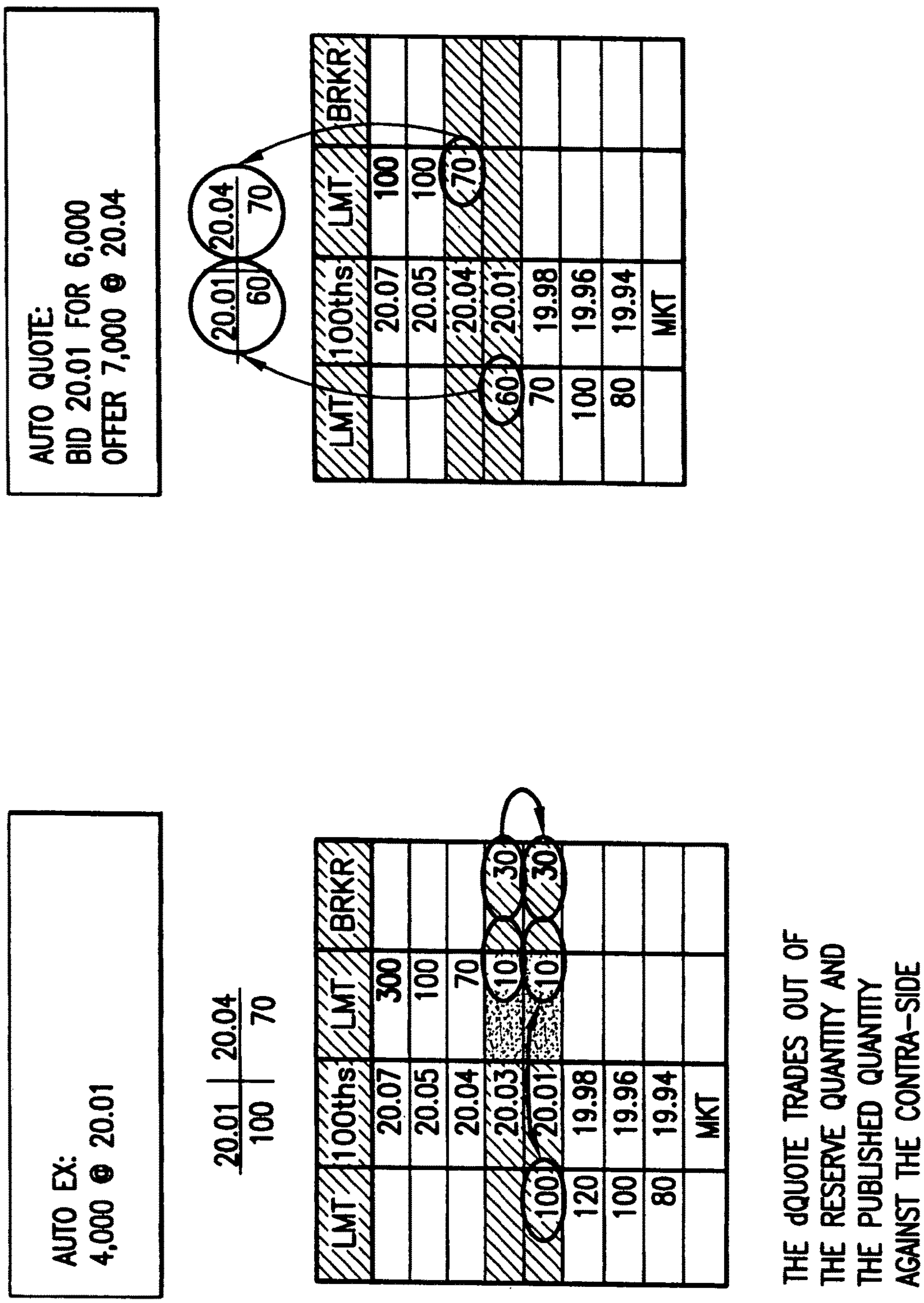

FIGS. 8A and 8B illustrate a d-Quote that is marketable at the discretionary price trading against the contra-side. The best bid is 10,000 shares at $20.01 and the best offer is 7,000 shares at $20.04 (800). A broker enters a d-Quote (802) to sell 4,000 shares at $20.03, with price discretion of +/−$0.02, publish 1,000 shares, and 3,000 shares in reserve. This would normally establish a new best offer at $20.03. However, in view of the discretion ($20.03+/−0.02) the d-Quote is marketable with the contra-side upon arrival, and in FIG. 8B, system 100 automatically executes the order at $20.01. The order takes all of the reserve and all of the published interest. As a result, the inside quote must change and auto quote is triggered.

Figure 9:
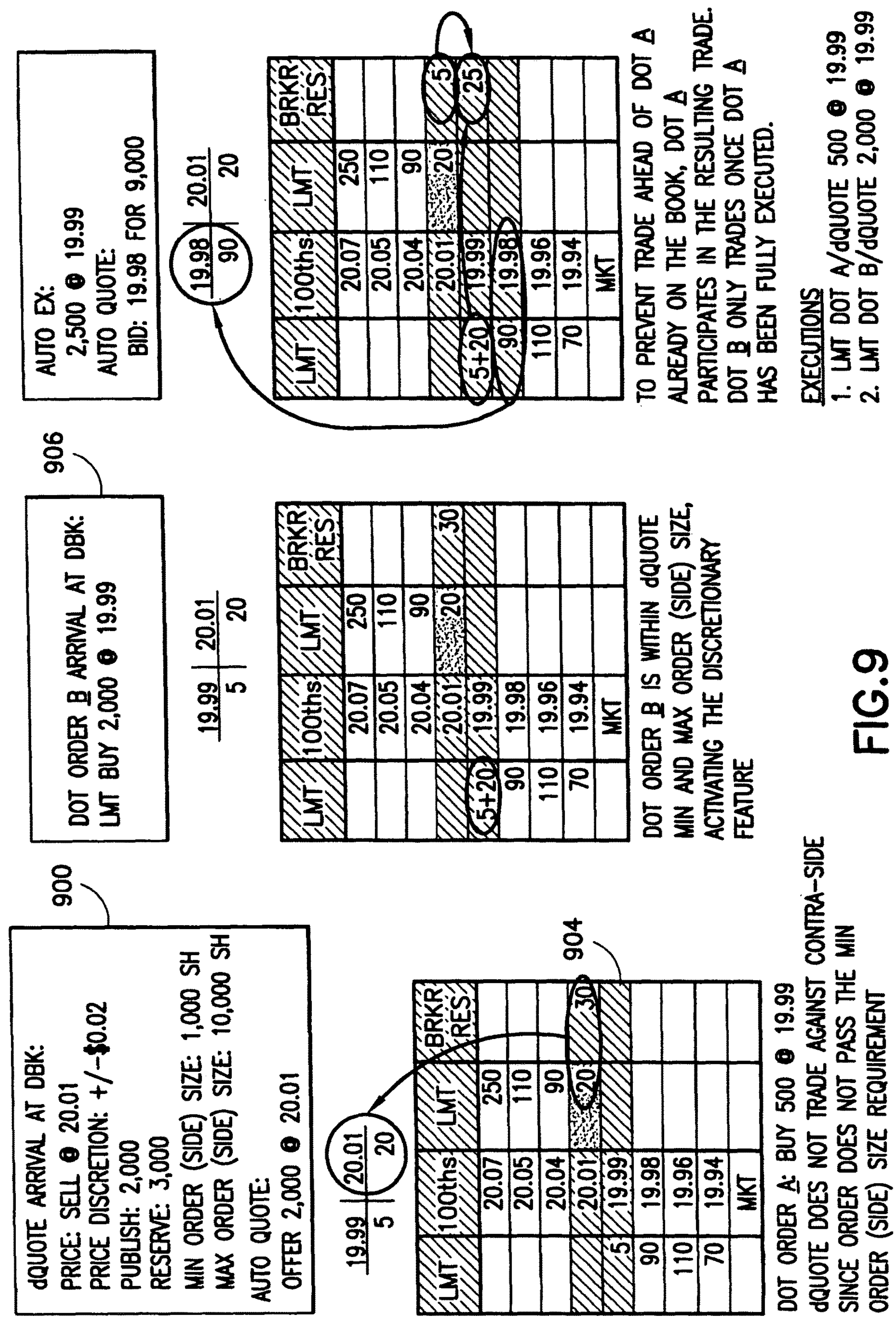

FIG. 9 illustrates an incoming order priced at the contra-side BBO, which is within the price discretion range of a d-Quote and triggers an execution of the entire contra-side against the d-Quote. A broker enters a d-Quote (900) to sell 5,000 shares at $20.01, with price discretion of +/−$0.02, publish 2,000 shares, and 3,000 shares in reserve. The d-Quote also includes a minimum order (side) size of 1,000 shares and a maximum order (side) size of 10,000 shares. The d-Quote establishes a new best offer, which is autoquoted. The best bid on the book is a DOT order to buy 500 at $19.99 (904). System 100 does not automatically execute against the DOT order because the size of 500 shares is less than the d-Quote minimum order (side) size of 1,000 shares. System 100 then receives a second DOT limit order to buy 2,000 shares at $19.99 (906), and determines that the size of the new order is within the d-Quote minimum and maximum (side) side limits. This activates the discretionary feature, and system 100 automatically executes both DOT orders at $19.99. To prevent a trade-ahead, system 100 first executes against the DOT order for 500 shares, and then against the DOT order for 2,000 shares only after the first order is fully executed. The order is filled entirely from the reserve and leaves 500 shares of reserve. Because the best bid was traded, the inside quote changes and auto quote is triggered.

Figure 10:
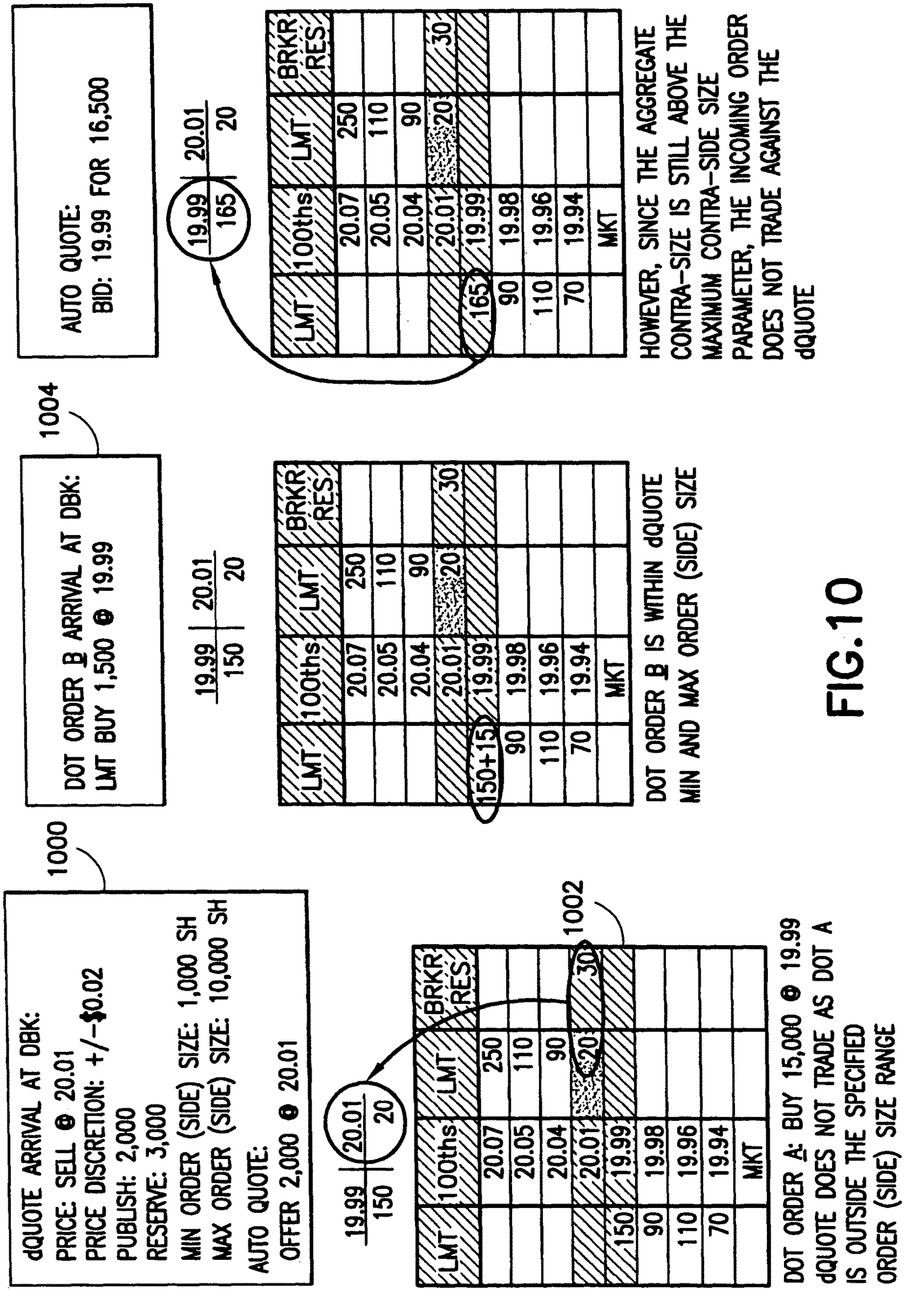

FIG. 10 illustrates no trade at the contra side that is within the price discretion range unless the aggregate contra-size passes both the minimum and maximum (side) size requirements. A broker enters a d-Quote (1000) to sell 5,000 shares at $20.01, with price discretion of +/−$0.02, publish 2,000 shares, and 3,000 shares in reserve. The d-Quote also includes a minimum order (side) size of 1,000 shares and a maximum order (side) size of 10,000 shares. The d-Quote establishes a new best offer, which is autoquoted. The best bid on the book is a DOT order to buy 15,000 at $19.99 (1002). System 100 does not automatically execute against the DOT order because the size of 15,000 shares is more than the d-Quote maximum order (side) size of 10,000 shares. System 100 then receives a second DOT limit order to buy 1,500 shares at $19.99 (1004), and determines that the size of the new order is within the d-Quote minimum and maximum (side) side limits. However, this does not activate the discretionary feature because the aggregate contra-size is still above the maximum contra-side size parameter of the d-Quote. For that reason, neither of the orders to buy at $19.99 will trade against the d-Quote, and system 100 triggers an auto quote.

Figure 11:
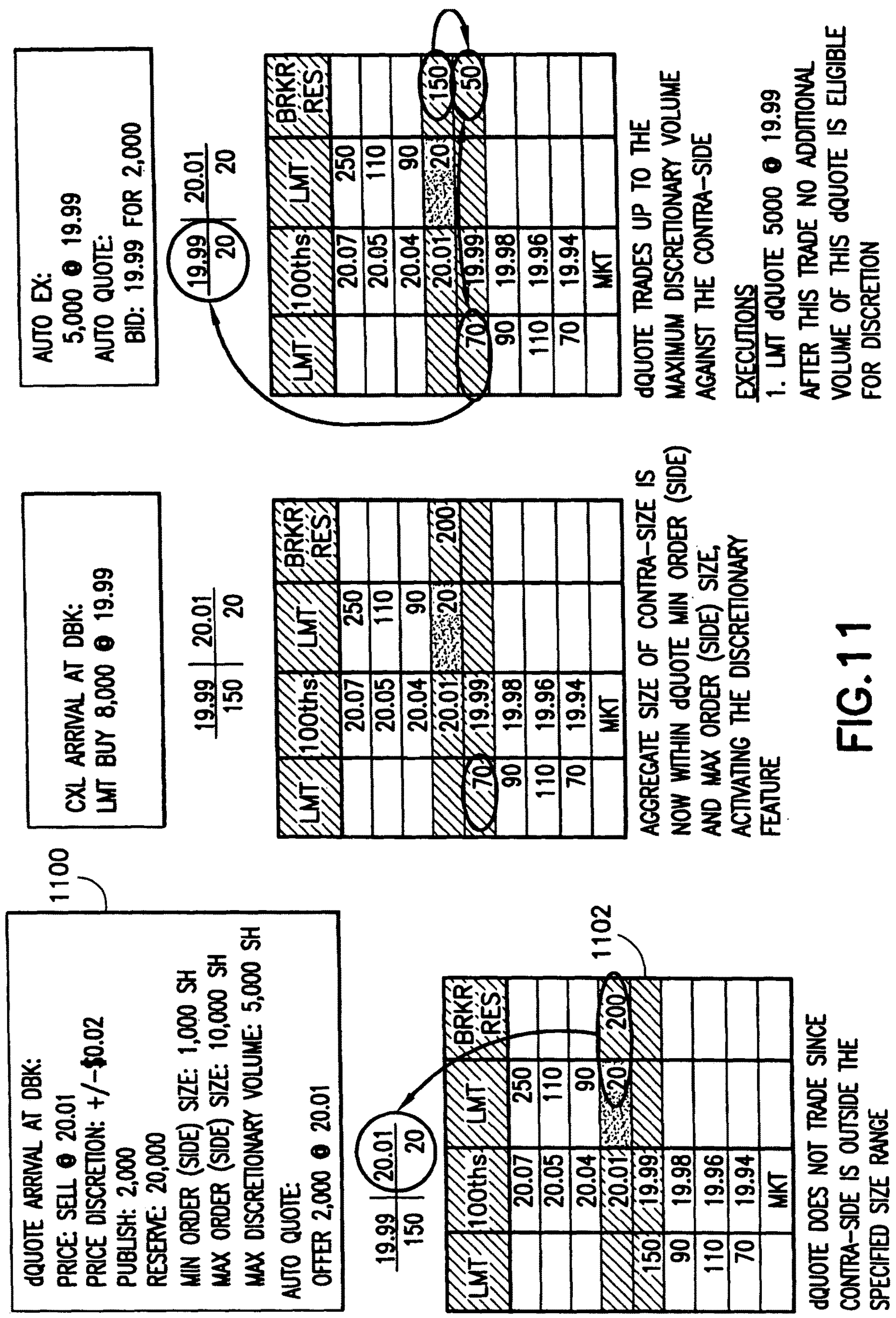

FIG. 11 illustrates trade of the d-Quote after a cancel so that the aggregate contra-side volume is between the d-Quote minimum and maximum discretionary volume. A broker enters a d-Quote (1100) to sell 22,000 shares at $20.01, with price discretion of +/−$0.02, publish 2,000 shares, and 20,000 shares in reserve. The d-Quote also includes a minimum order (side) size of 1,000 shares and a maximum order (side) size of 10,000 shares, and a maximum discretionary volume of 5,000 shares. The d-Quote establishes a new best offer, which is autoquoted. The best bid on the book is an order to buy 15,000 at $19.99 (1102). System 100 does not automatically execute against that order because the size of 15,000 shares is more than the d-Quote maximum order (side) size of 10,000 shares. System 100 then receives a cancel of 8,000 shares of a limit order at $19.99. System 100 determines that after the cancel, the aggregate size of the contra-side is within the d-Quote minimum and maximum (side) side limits. This activates the discretionary feature of the d-Quote. System 100 automatically executes 5,000 shares at $19.99. This is all that will automatically execute because the d-Quote has a maximum discretionary volume of 5,000 shares. After this execution, no additional volume of the d-Quote is eligible for discretion and the remaining volume of the d-Quote is treated as a normal e-Quote.

Figure 12A:
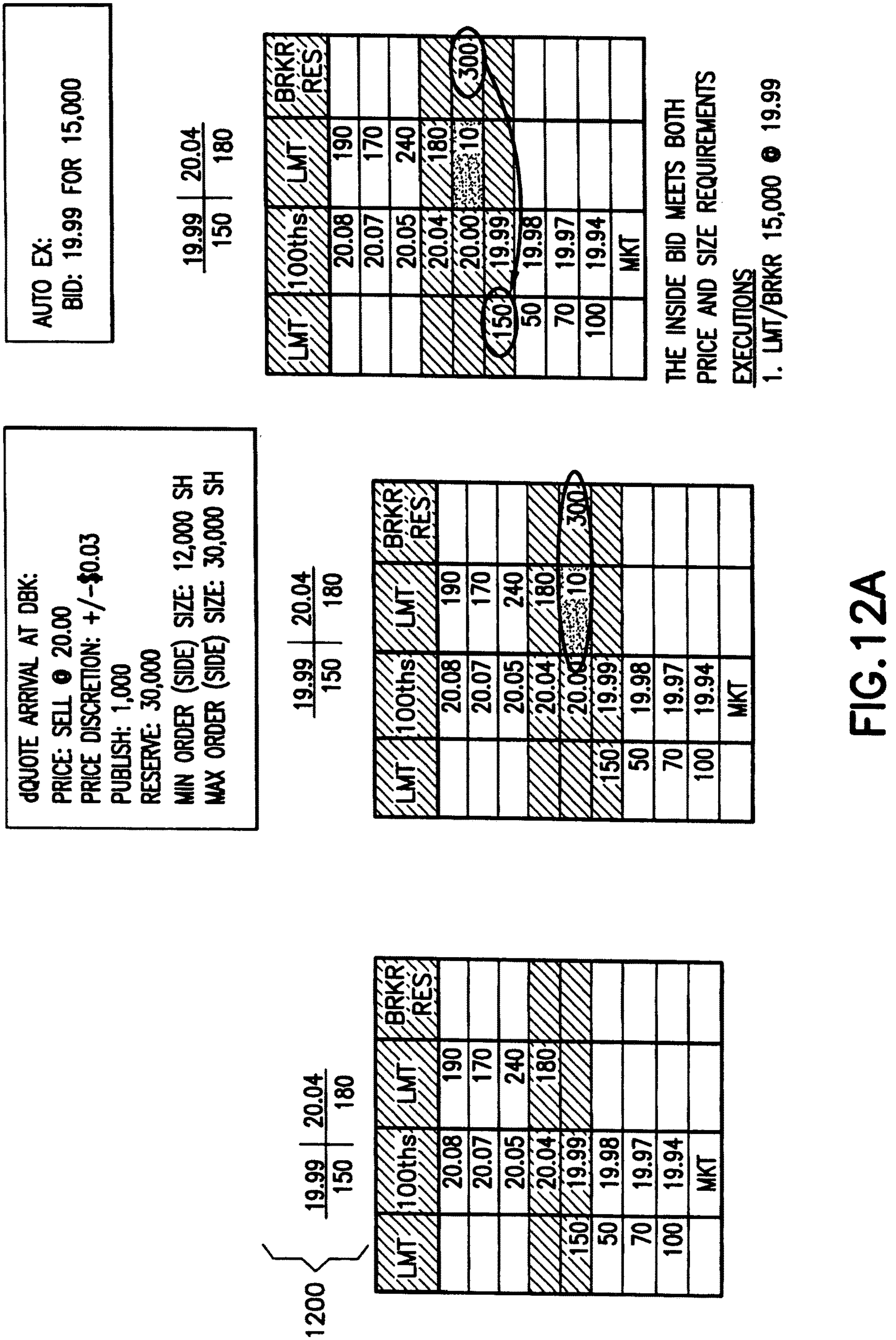
Figure 12B:
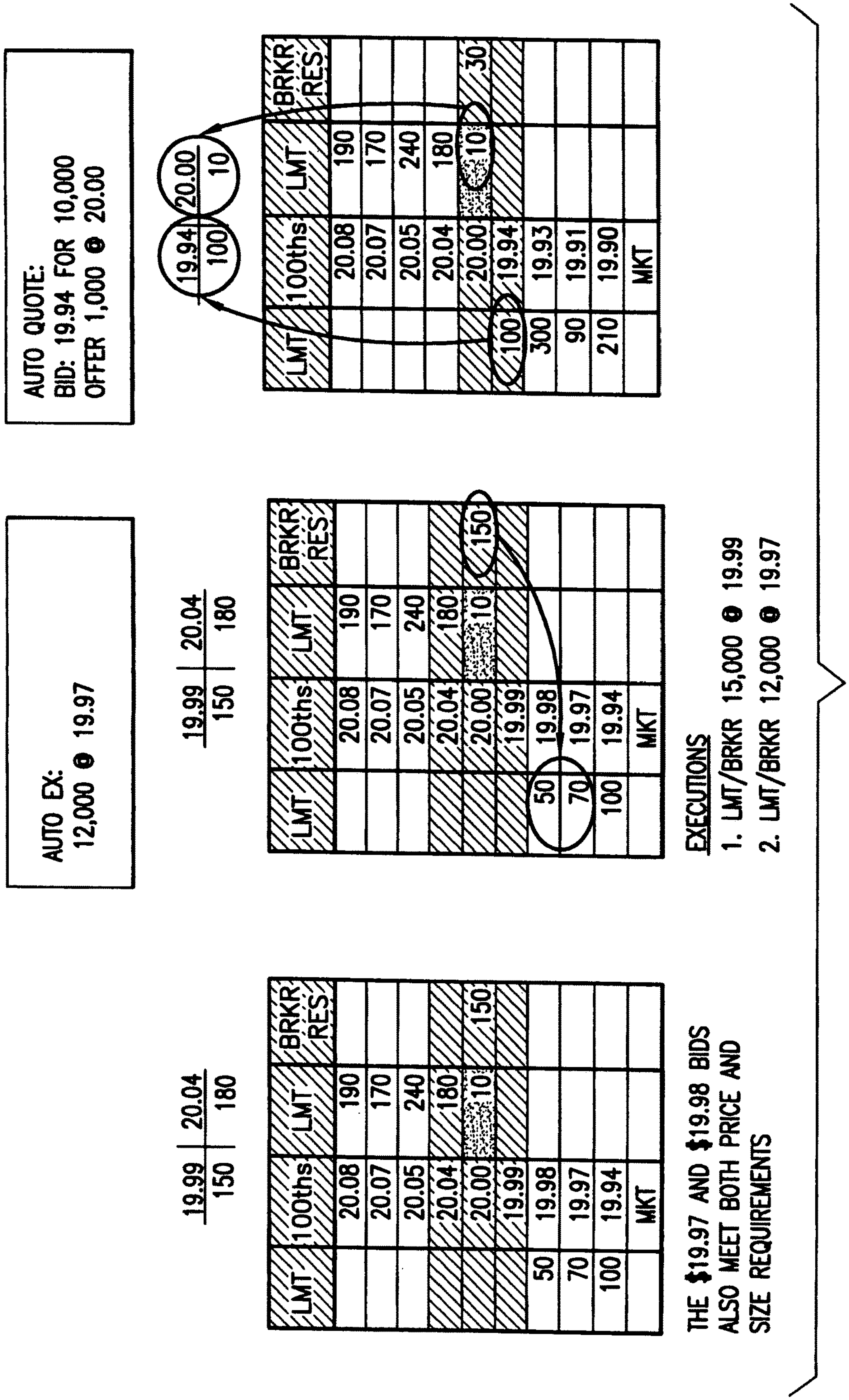

FIGS. 12A and 12B illustrate sweeps within the price discretion of a d-Quote as long as the aggregate contra-side volume meets the d-Quote size requirements. The best bid is 15,000 shares at $19.99 and the best offer is 18,000 shares at $20.04 (1200). A broker enters a d-Quote to sell 31,000 shares at $20.00, with price discretion of +/−$0.03, publish 1,000 shares, and 30,000 shares in reserve. The d-Quote also includes a minimum order (side) size of 12,000 shares and a maximum order (side) size of 30,000 shares. System 100 determines that the bid of 15,000 shares at $19.99 meets both the price and size requirement of the d-Quote, and automatically executes 15,000 shares at $19.99. The 15,000 shares are filled entirely from the reserve quantity, leaving 15,000 in reserve. System 100 also determines that the bids at $19.98 and $19.97 are also within the price and size requirements of the d-Quote, and sweeps, executing 12,000 shares at $19.97. System 100 then autoquotes the remainder of the d-Quote at $20.00.

Figure 13:
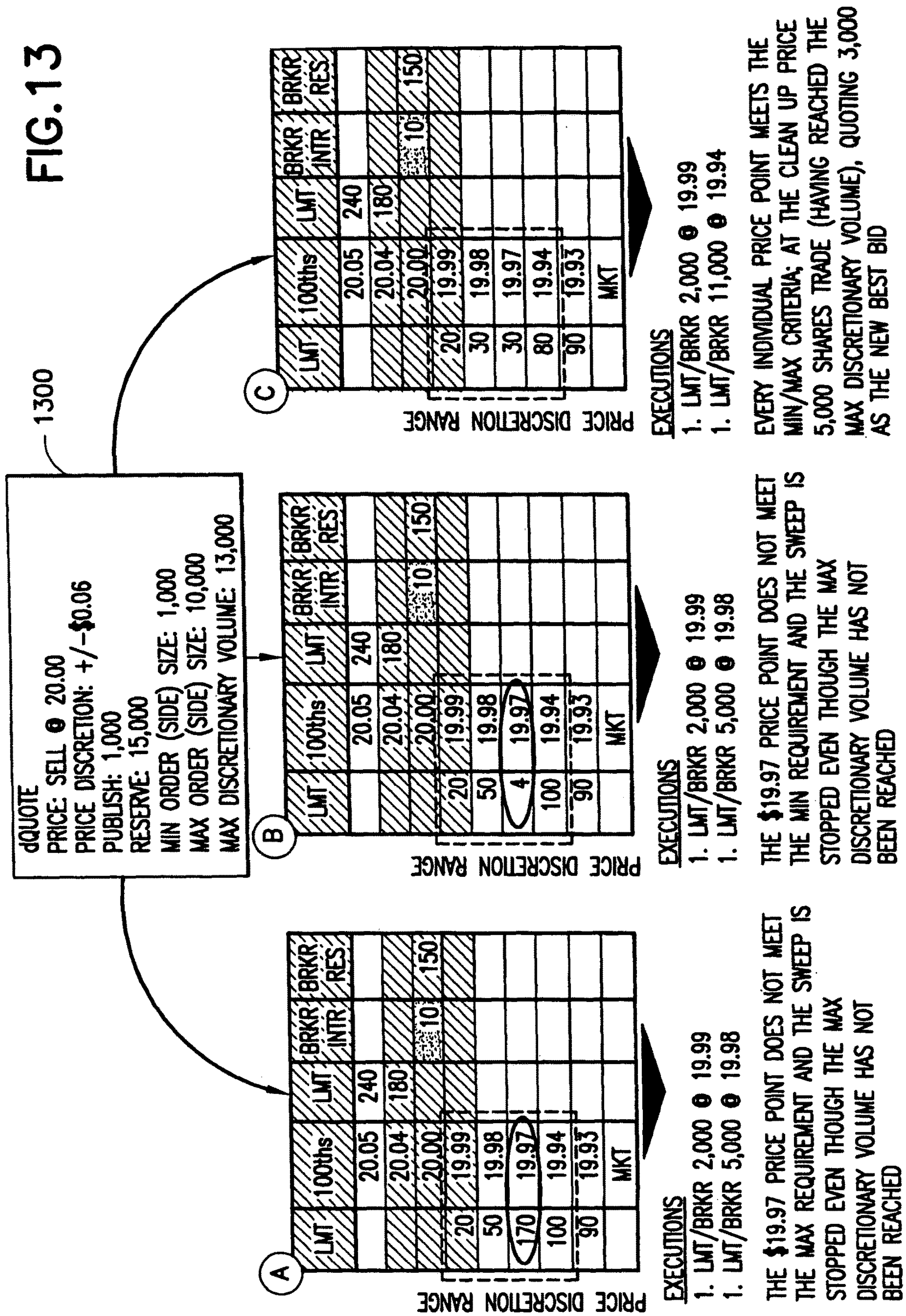

FIG. 13 illustrates sweep of a d-Quote as far as price allows, with evaluation of minimum and maximum criteria at each price point within the range and comparison to the maximum discretionary volume. A broker enters a d-Quote (1300) to sell 16,000 shares at $20.00, with price discretion of +/−$0.06, publish 1,000 shares, and 15,000 shares in reserve. The d-Quote also includes a minimum order (side) size of 1,000 shares and a maximum order (side) size of 10,000 shares, and a maximum discretionary volume of 13,000 shares. With a limit order book as in A, system 100 will first execute 2,000 shares at $19.99, and then 5,000 shares at $19.98. The sweep stops before the $19.97 price because at 17,000 shares it is greater than the 10,000 share maximum order (side) size of the d-Quote. With a limit order book as in B, system 100 will first execute 2,000 shares at $19.99, and then 5,000 shares at $19.98. The sweep stops before the $19.97 price because at 400 shares it is less than the 1,000 share minimum order (side) size of the d-Quote. With a limit order book as in C, system 100 will first execute 2,000 shares at $19.99, and then sweep to execute 11,000 shares at $19.94. As in C, each individual price point of $19.98, $19.97 and $19.94 meets the minimum/maximum size criteria. 5,000 share of the 8,000 shares at $19.94 execute in the sweep, leaving 3,000 shares which is auto-quoted as the new best bid.

Figure 14:
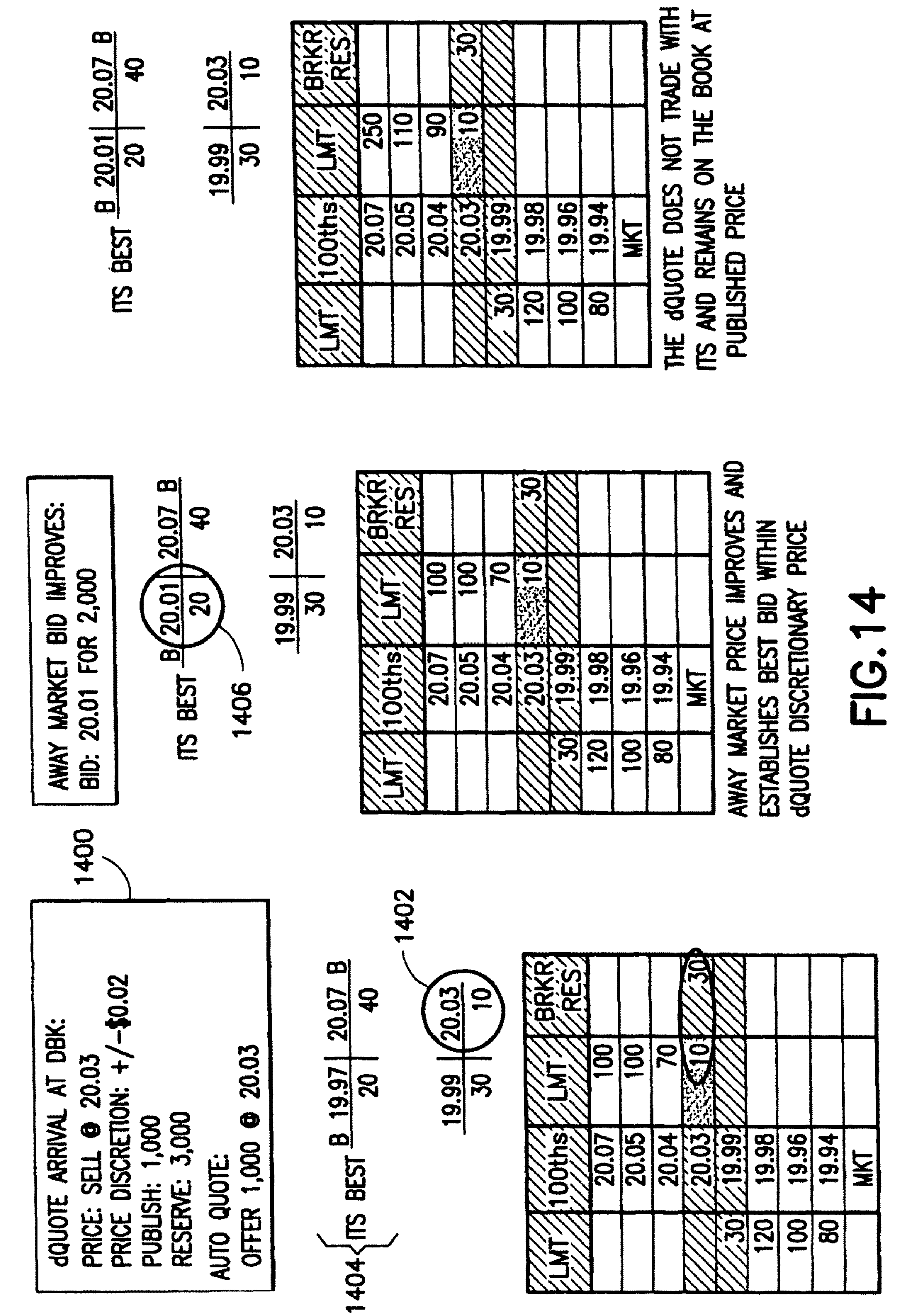

FIG. 14 illustrates a best bid/offer at an away market within the price discretion of a d-Quote, but the d-Quote is not shipped to the away market. A broker enters a d-Quote (1400) to sell 4,000 shares at $20.03, with price discretion of +/−$0.02, publish 1,000 shares, and 3,000 shares in reserve. Before entry of the d-Quote, the best offer to sell at this market was $20.04 for 7,000 shares. Because the d-Quote is establishing a new best offer, system 100 auto-quotes 1,000 shares offered at $20.03 (1402). The best bid and offer at an away market is 2,000 shares bid at $19.97 and 4,000 shares offered at $20.07 (1404). The away market improves to 2,000 shares bid at $20.01 (1406). This establishes the best bid at the away market, not the local market. The best bid of $20.01 at the away market is also within the price discretion of the d-Quote ($20.03+/−0.02). However, system 100 does not ship the d-Quote to the away market to trade, instead leaving the d-Quote on the local display book at the published price.

Figure 15:
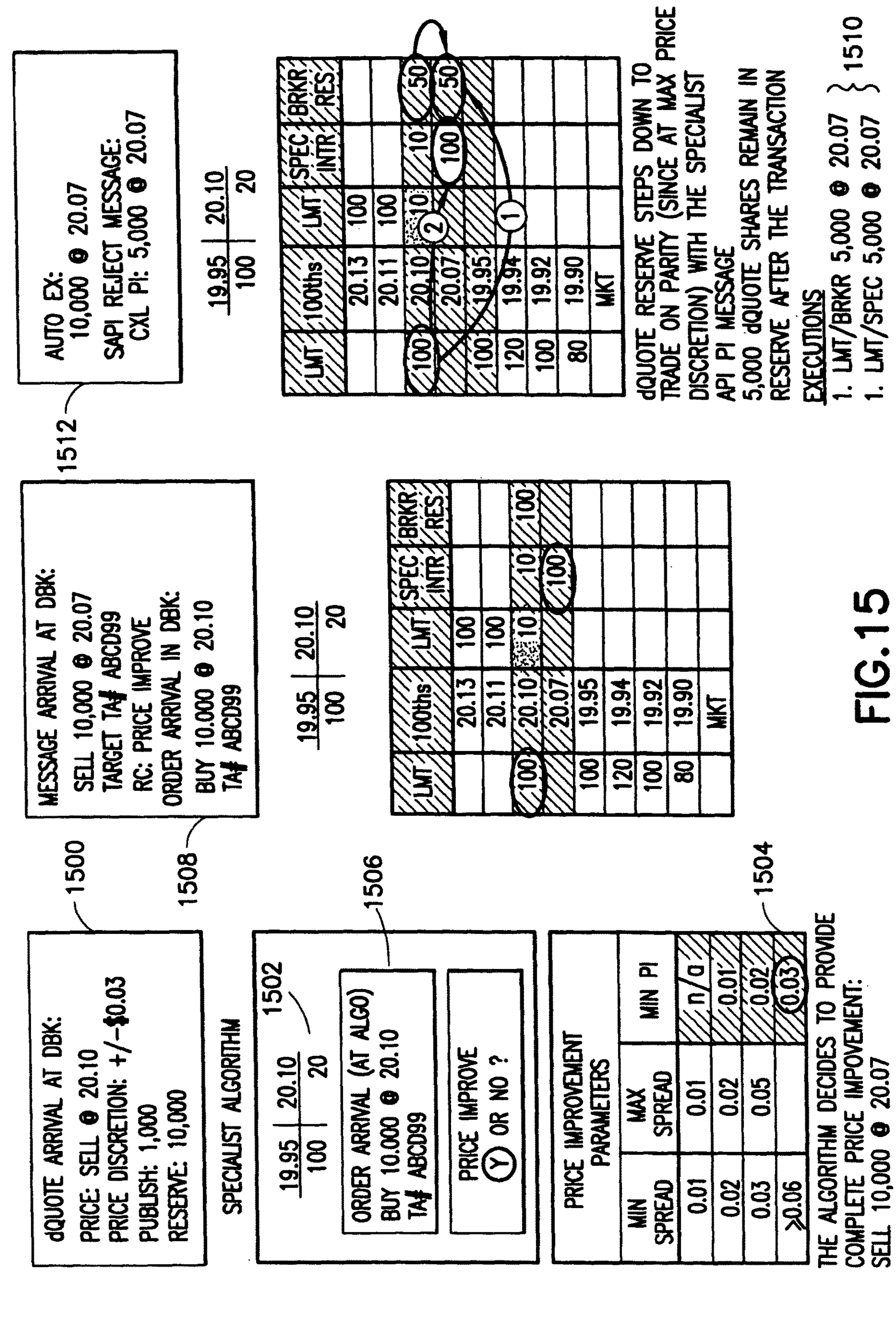

FIG. 15 illustrates a specialist API Price Improvement message that trades on parity with the d-Quote if the maximum discretion is the same as the price of the API message. A broker enters a d-Quote (1500) to sell 1,000 shares at $20.10, with price discretion of +/−$0.03, publish 1,000 shares, and 10,000 shares in reserve. The specialist has also entered interest to sell 1,000 shares at $20.10. Thus, system 100 autoquotes the best offer as 2,000 shares at $20.10 (1502). The specialist API algorithm is also set to provide price improvement based on the spread. Here, the spread is $0.15, so the specialist algorithm is set to provide a minimum of $0.03 of price improvement (1504). System 100 receives an order to buy 10,000 shares at $20.10, turn around number ABCD99 (1506). Based on the spread and algorithm price improvement, the specialist algorithm sends a targeted order to sell 10,000 at $20.07 against turn around number ABCD99 (1508), which arrives at the display book at the same time as the order to buy 10,000 at $20.10. System 100 autoexecutes 10,000 shares at $20.07. The execution is filled 5,000 shares each by the d-Quote and the specialist (1510). This is because $20.07 is within the price discretion of the d-Quote so the d-Quote and specialist price improvement trade on parity. Since the order is entirely filled, the remaining 5,000 shares of the specialist price improvement message is cancelled (1512).

Figure 16A:
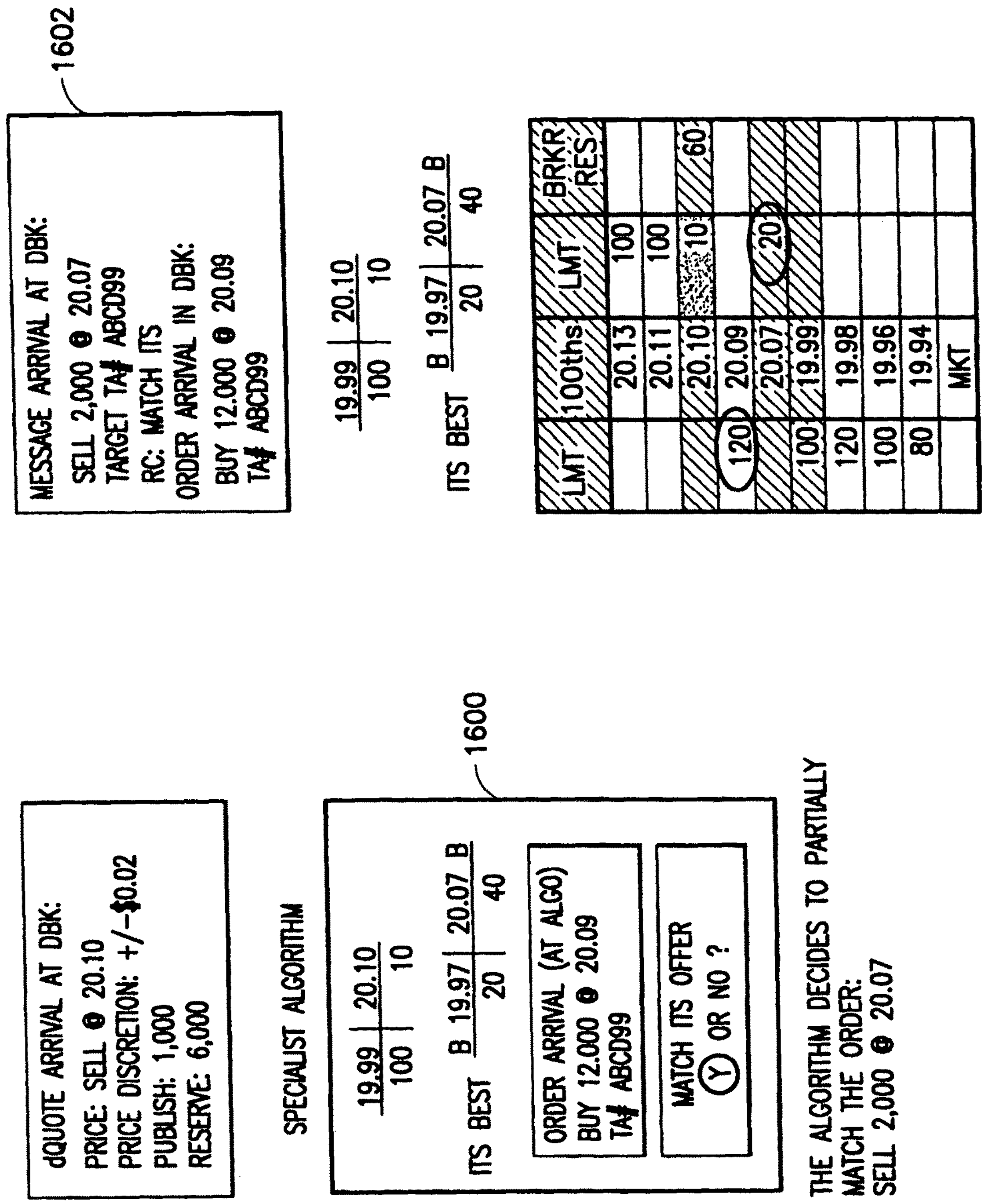
Figure 16B:
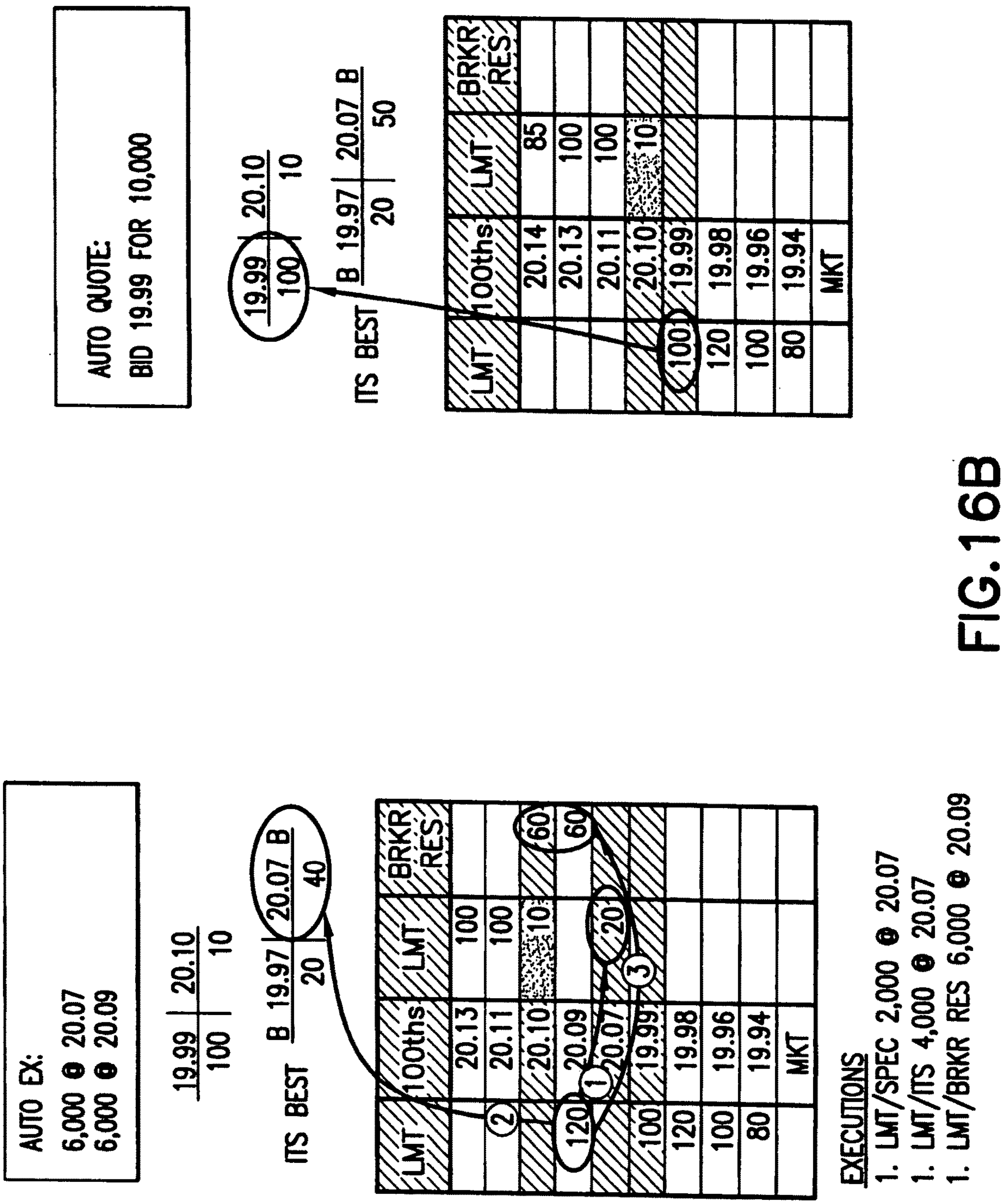

FIGS. 16A and 16B illustrate specialist price improvement that is better than the maximum price discretion of a d-Quote, with the residual trading with the d-Quote. A broker enters a d-Quote to sell 7,000 shares at $20.10, with price discretion of +/−$0.02, publish 1,000 shares, and 6,000 shares in reserve. The local market best offer is 1,000 shares at $20.10. The away market best offer is 4,000 shares at $20.07. The specialist API algorithm is also set to match an away market offer up to 2,000 shares (1600). System 100 receives a limit order to buy 12,000 shares at $20.09 with TA #ABCD99, and the specialist algorithm sends a price match message to sell 2,000 shares at $20.07 targeted to TA #ABCD99, which arrives at the display book with the limit order to buy (1602). System 100 automatically executes 2,000 shares against the specialist at $20.07 and ships 4,000 shares to the away market for execution at $20.07, leaving 6,000 shares of the order remaining for execution. The d-Quote did not participate at $20.07 because that is outside its price discretion. However, the limit order price of $20.09 is within the price discretion of the d-Quote, so system 100 automatically executes 6,000 shares against the d-Quote reserve.

Figure 17:
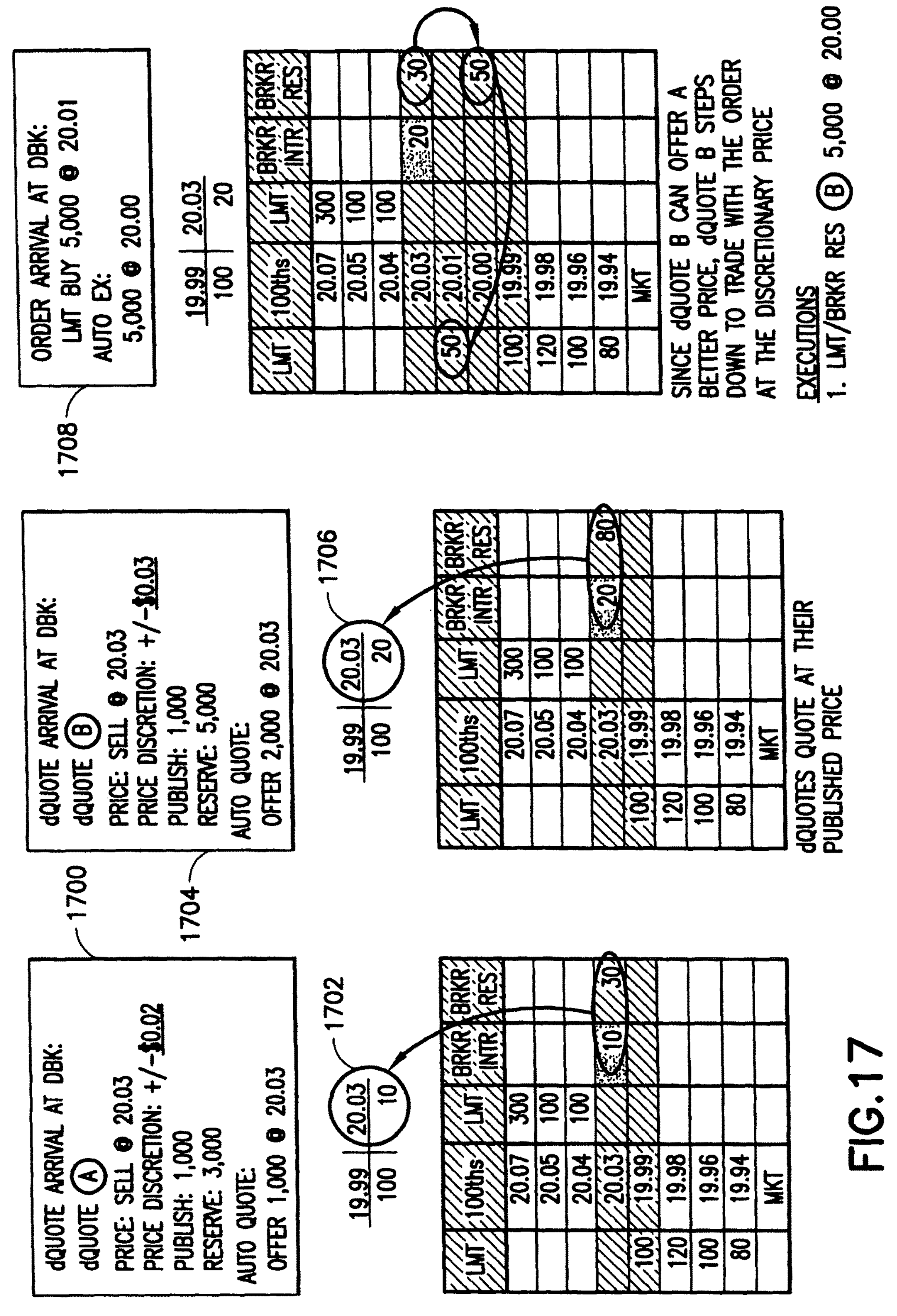

FIG. 17 illustrates two d-Quotes at the BBO trading against an incoming order at the maximum discretion price, or price necessary for the more aggressive d-Quote to trade in full. A first broker enters a d-Quote (A) to sell 4,000 shares at $20.03, with price discretion of +/−$0.02, publish 1,000 shares, and 3,000 shares in reserve (1700). This establishes the best offer, which is autoquoted (1702). A second broker enters a d-Quote (B) to sell 6,000 shares at $20.03, with price discretion of +/−$0.03, publish 1,000 shares, and 5,000 shares in reserve (1704). Because this d-Quote is also at the best offer, it is added to the published offer and autoquoted (1706). System 100 receives a limit order to buy 5,000 shares at $20.01 (1708). Although the price of the limit order is within the price discretion of both d-Quotes, the limit order is price improved and executed at $20.00 entirely against the 5,000 shares of reserve in the more aggressive priced d-Quote (B).

Figure 18:
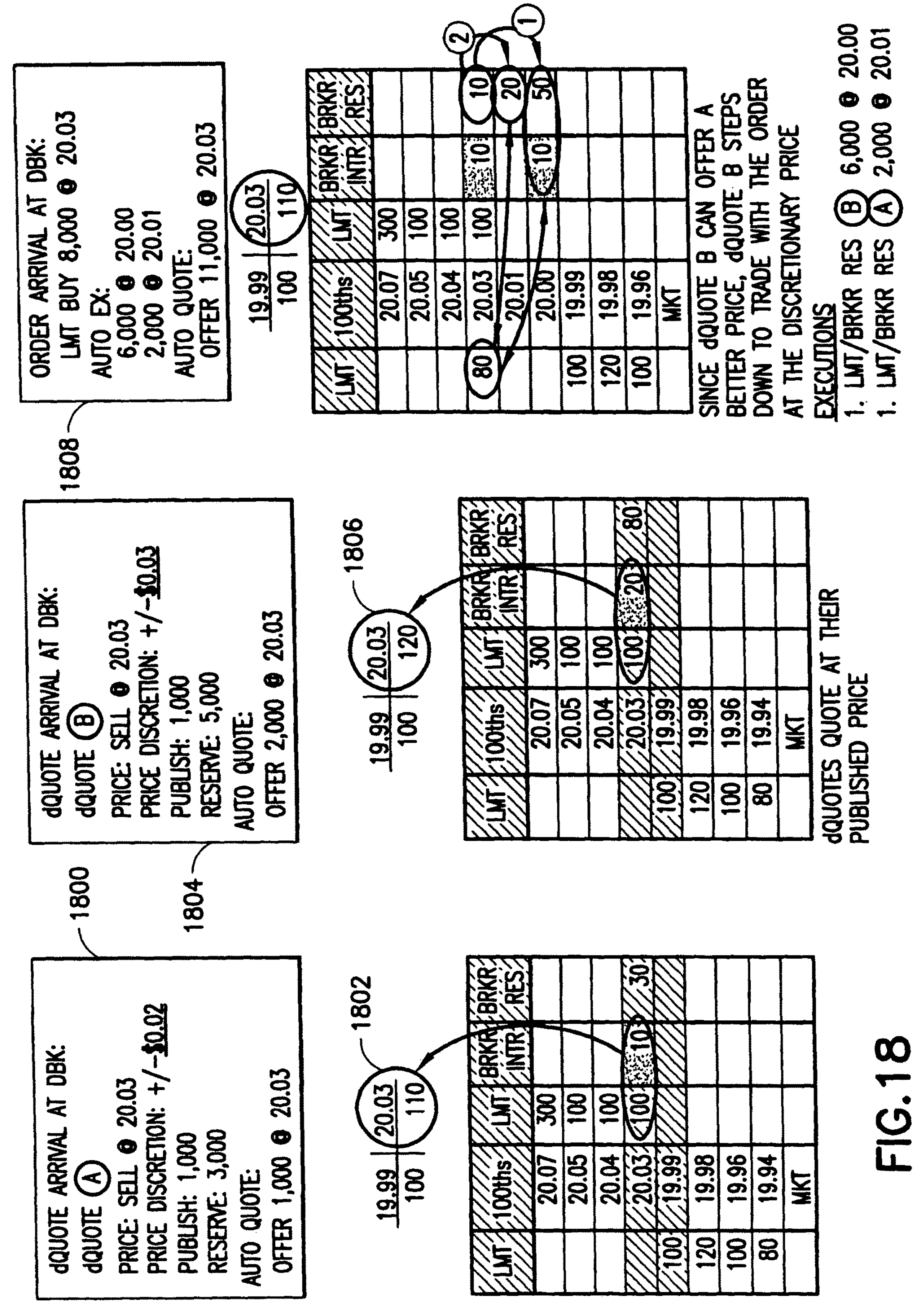

FIG. 18 illustrates two d-Quotes at the BBO trading against an incoming order at the maximum discretion price, with residual trading at the second maximum discretion price. A first broker enters a d-Quote (A) to sell 4,000 shares at $20.03, with price discretion of +/−$0.02, publish 1,000 shares, and 3,000 shares in reserve (1800). This is added to an existing offer for 10,000 shares at $20.03, which is autoquoted (1802). A second broker enters a d-Quote (B) to sell 6,000 shares at $20.03, with price discretion of +/−$0.03, publish 1,000 shares, and 5,000 shares in reserve (1804). Because this d-Quote is also at the best offer, it is added to the published offer and autoquoted (1806). System 100 receives a limit order to buy 8,000 shares at $20.03 (1808). The price of the limit order is at the best offer and also within the price discretion of both d-Quotes. However, the price discretion of d-Quote B is greater than the price discretion of d-Quote A, so d-Quote B steps down to trade all 6,000 shares at its maximum discretion price of $20.01. This leaves 2,000 share of the limit order to buy, which is executed against 2,000 of d-Quote A reserve at $20.01, which is the maximum discretion of d-Quote A.

Figure 19A:
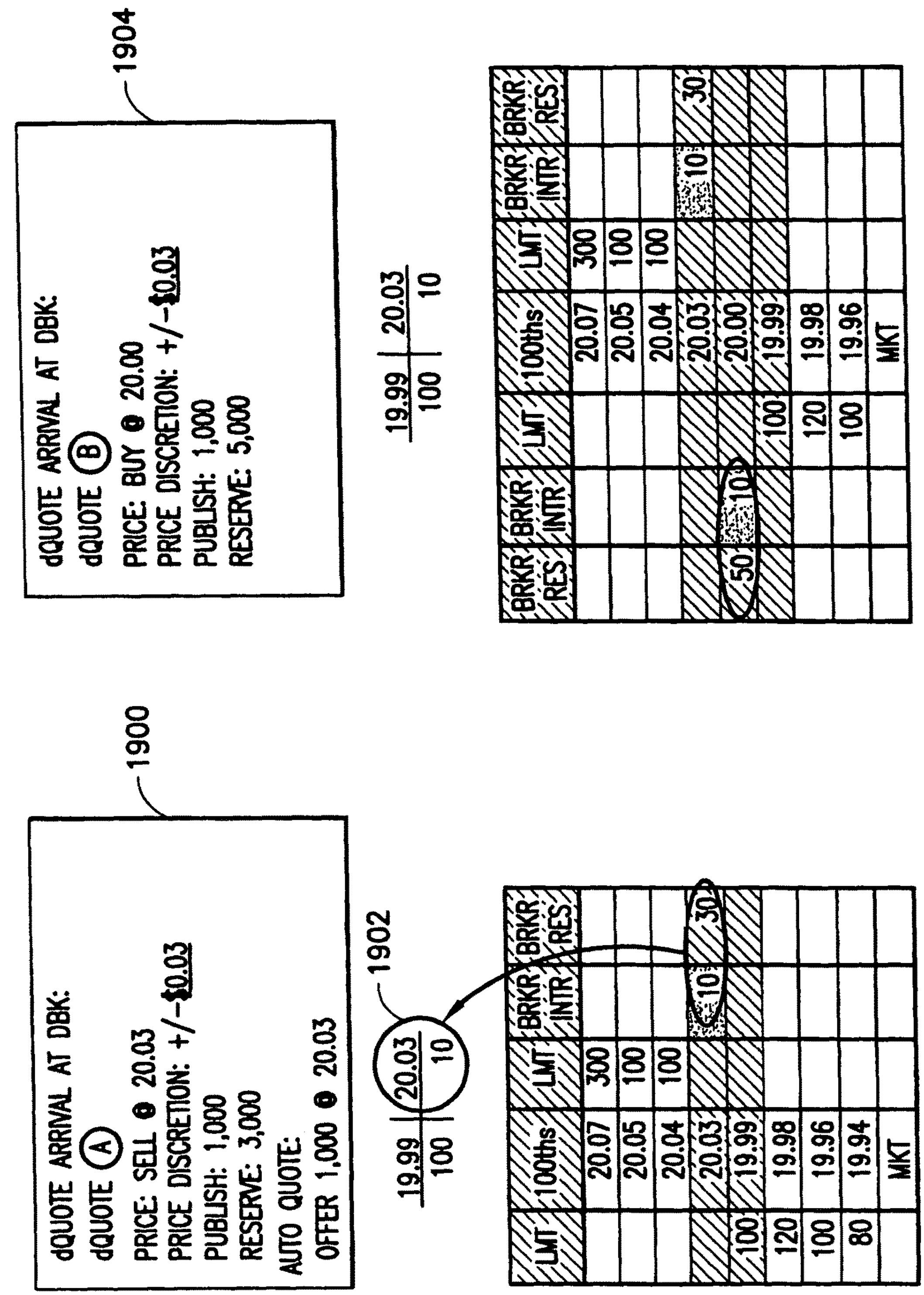
Figure 19B:
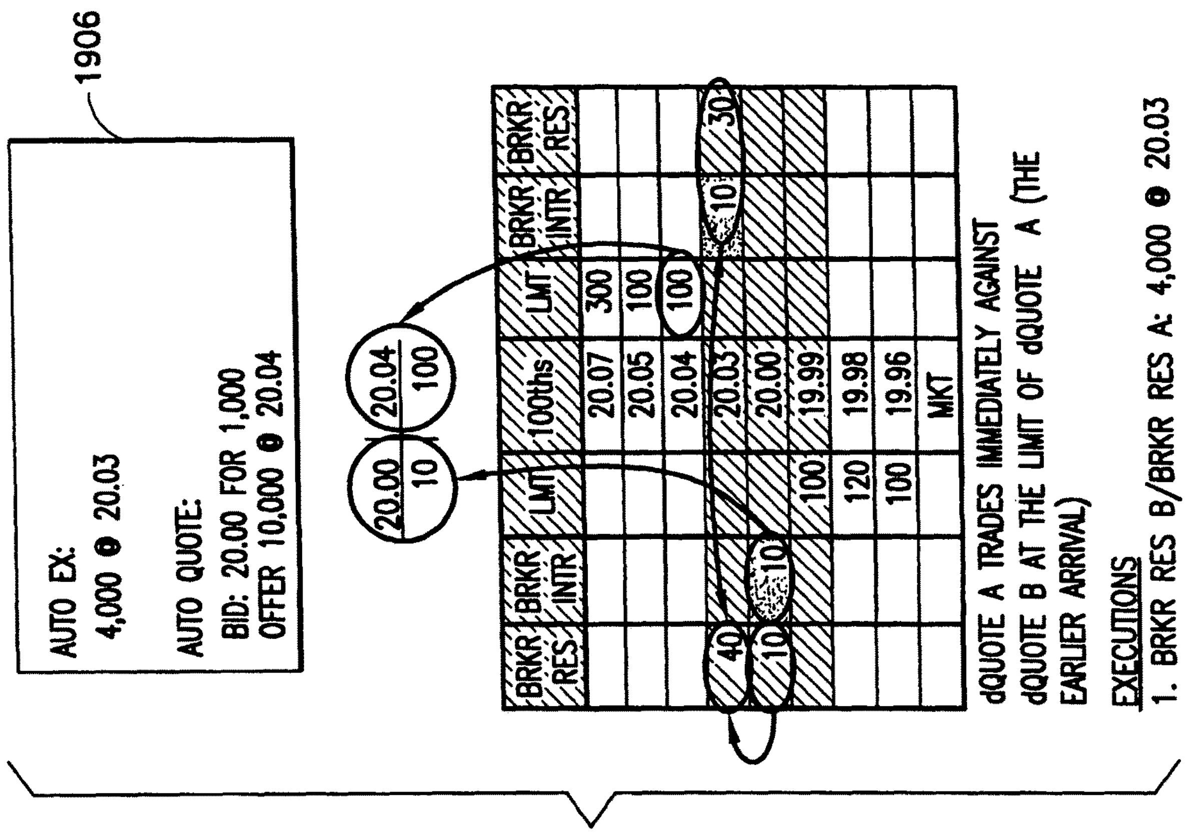

FIGS. 19A and 19B illustrate two d-Quotes at opposite sides of the market trading upon arrival of the later d-Quote at the earlier d-Quote price. A first broker enters a d-Quote (A) to sell 4,000 shares at $20.03, with price discretion of +/−$0.03, publish 1,000 shares, and 3,000 shares in reserve (1900). This is the best offer and is autoquoted (1902). A second broker enters a d-Quote (B) to buy 6,000 shares at $20.00, with price discretion of +/−$0.03, publish 1,000 shares, and 5,000 shares in reserve (1904). Both d-Quotes are within the price discretion of the other, and in FIG. 19B, system 100 automatically executes all 4,000 shares of d-Quote A at $20.03, which is the limit price of d-Quote A, the first d-Quote to arrive (1906). System 100 then autoquotes to reflect the new best bid and offer.

Figure 20A:
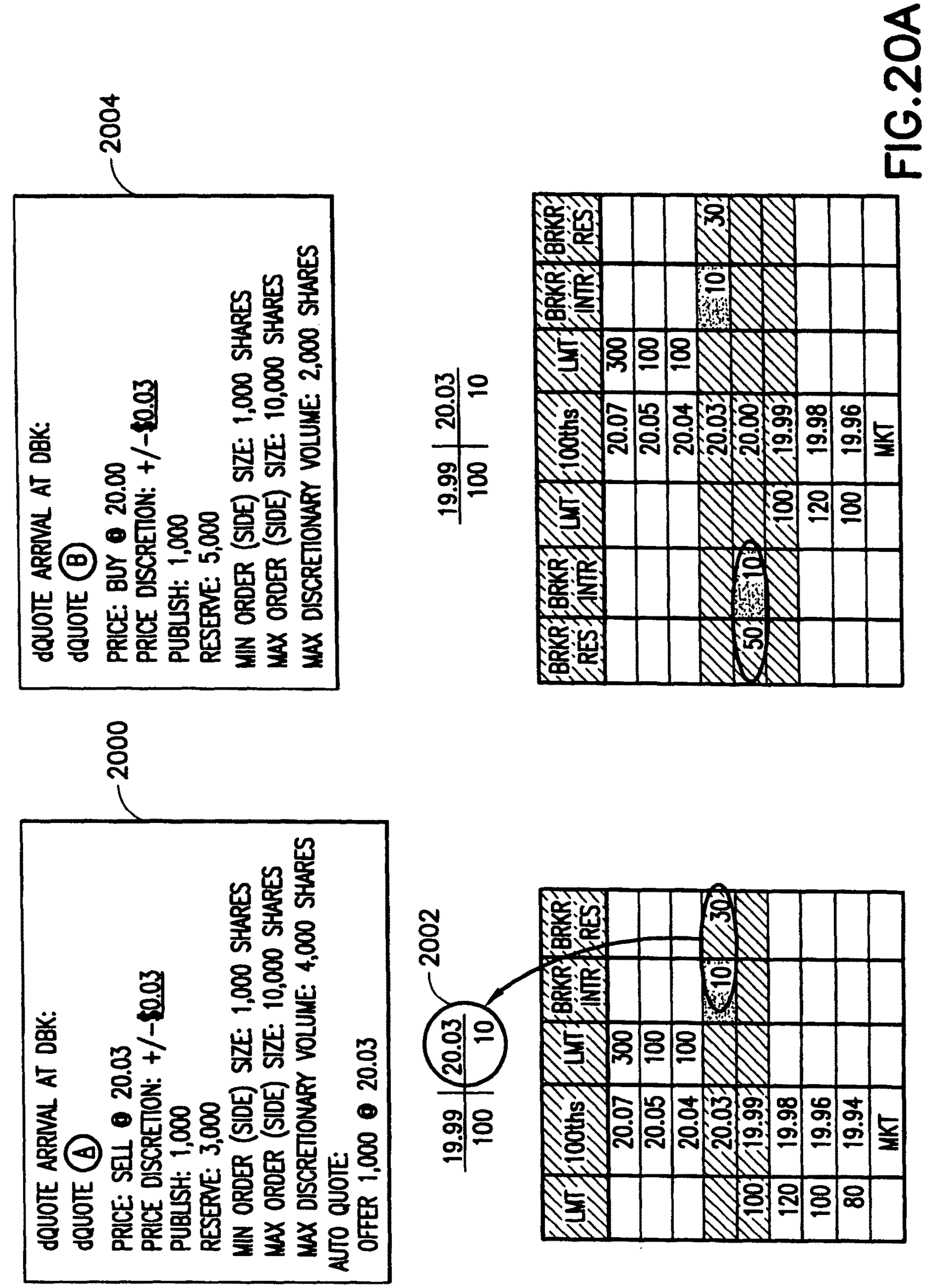
Figure 20B:
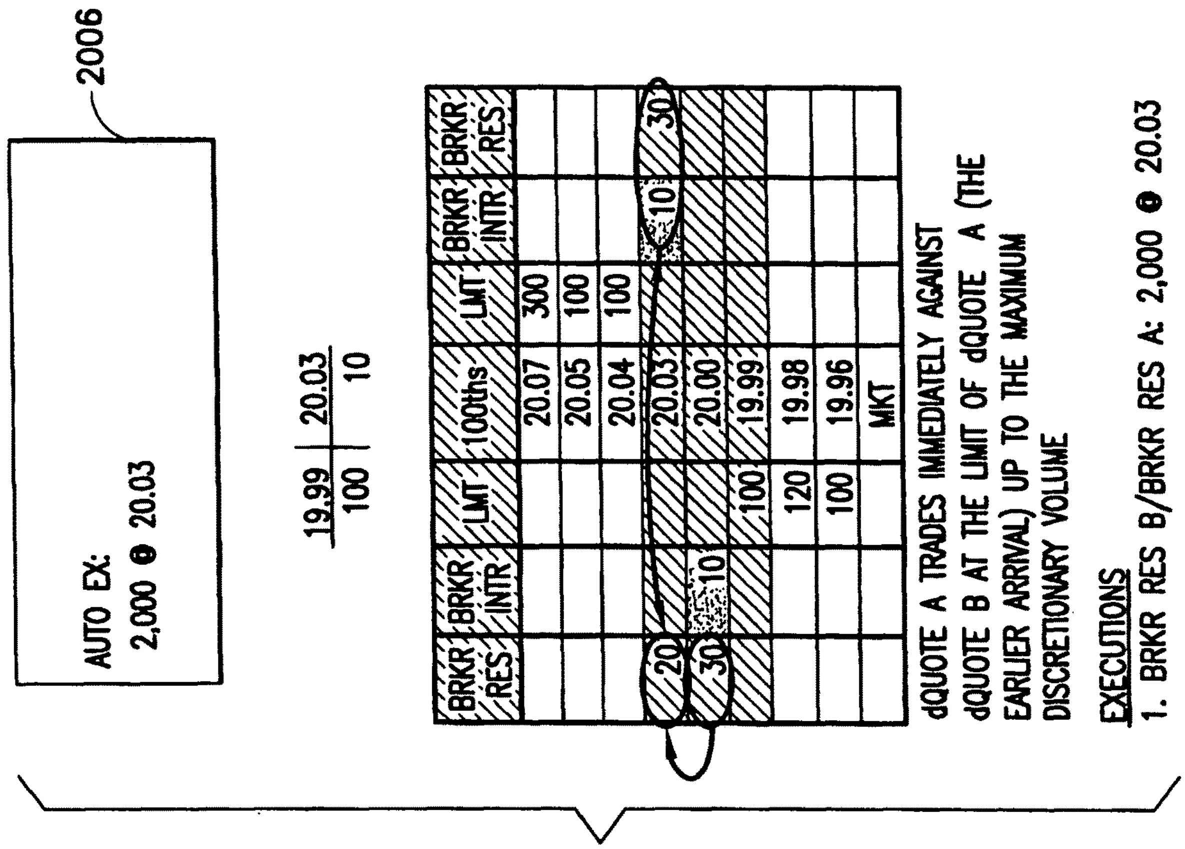
Figure 20C:
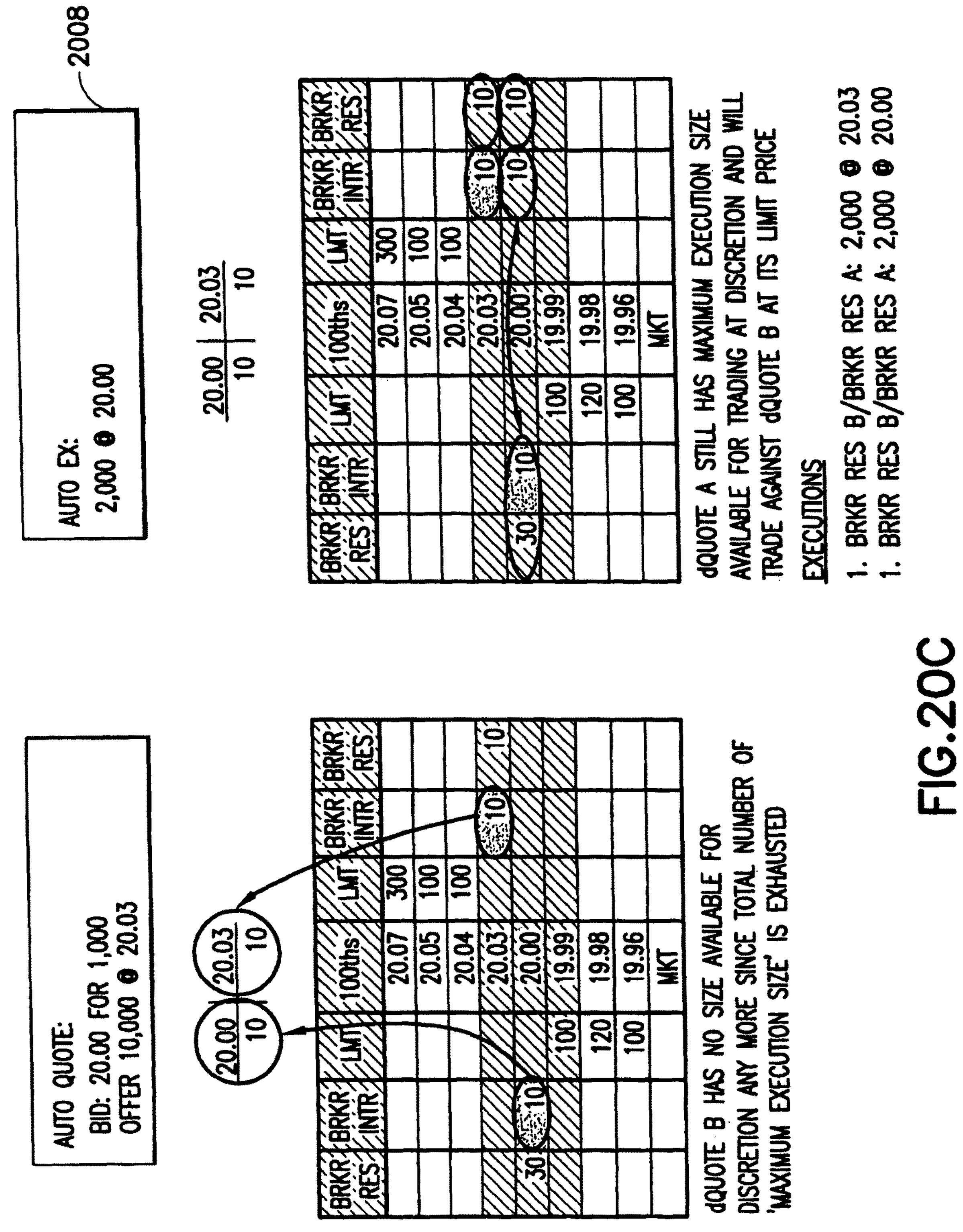
Figure 20D:
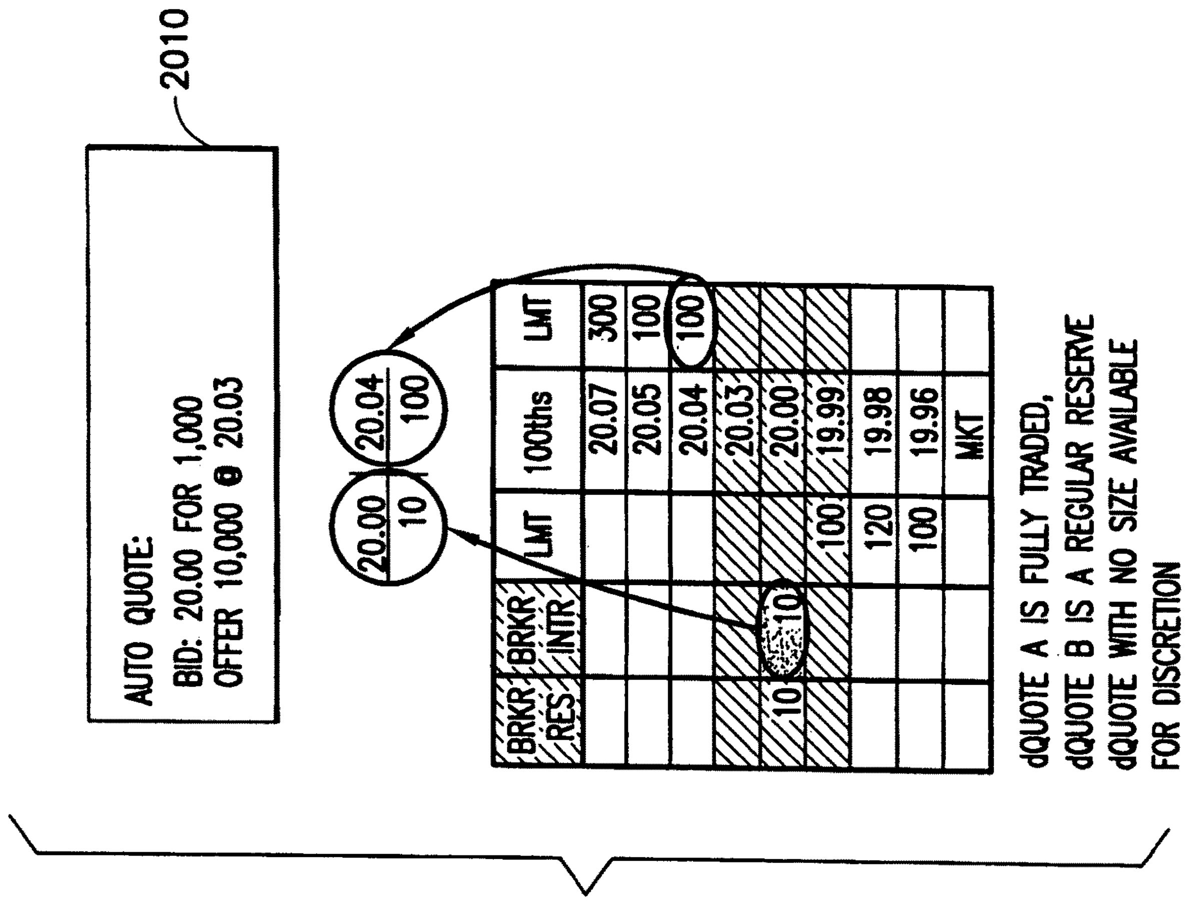

FIGS. 20A-20D illustrate two d-Quotes at opposite sides of the market trading upon arrival of the later d-Quote at the first d-Quote price up to the maximum discretionary volume. A first broker enters a d-Quote (A) to sell 4,000 shares at $20.03, with price discretion of +/−$0.03; publish 1,000 shares; 3,000 shares in reserve; 1,000 shares minimum order (side) size; 10,000 shares maximum order (side) size; and 4,000 shares maximum discretionary volume (2000). This is the best offer and is autoquoted (2002). A second broker enters a d-Quote (B) to buy 6,000 shares at $20.00, with price discretion of +/−$0.03; publish 1,000 shares; 5,000 shares in reserve; 1,000 shares minimum order (side) size; 10,000 shares maximum order (side) size; and 2,000 shares maximum discretionary volume (2004). Both d-Quotes are within the price discretion of the other, and in FIG. 20B, system 100 automatically executes 2,000 shares of d-Quote A at the limit price of d-Quote A, which was the first to arrive (2006). 2,000 shares is the maximum discretion volume of d-Quote B. In FIG. 20C, system 100 autoquotes the new best bid and offer. After the execution, d-Quote B has no discretionary volume remaining, but d-Quote A still has the maximum discretionary volume remaining since the first execution was done at $20.03, which is d-Quote A's limit price. System 100 automatically executes the remaining 2,000 shares of d-Quote A at $20.00, which is d-Quote B's limit price (2008). In FIG. 20D, system 100 then autoquotes the new best bid and offer (2010). d-Quote A is fully traded, and there is no remaining discretionary volume for d-Quote B, which becomes a regular reserve e-Quote.

Figure 21A:
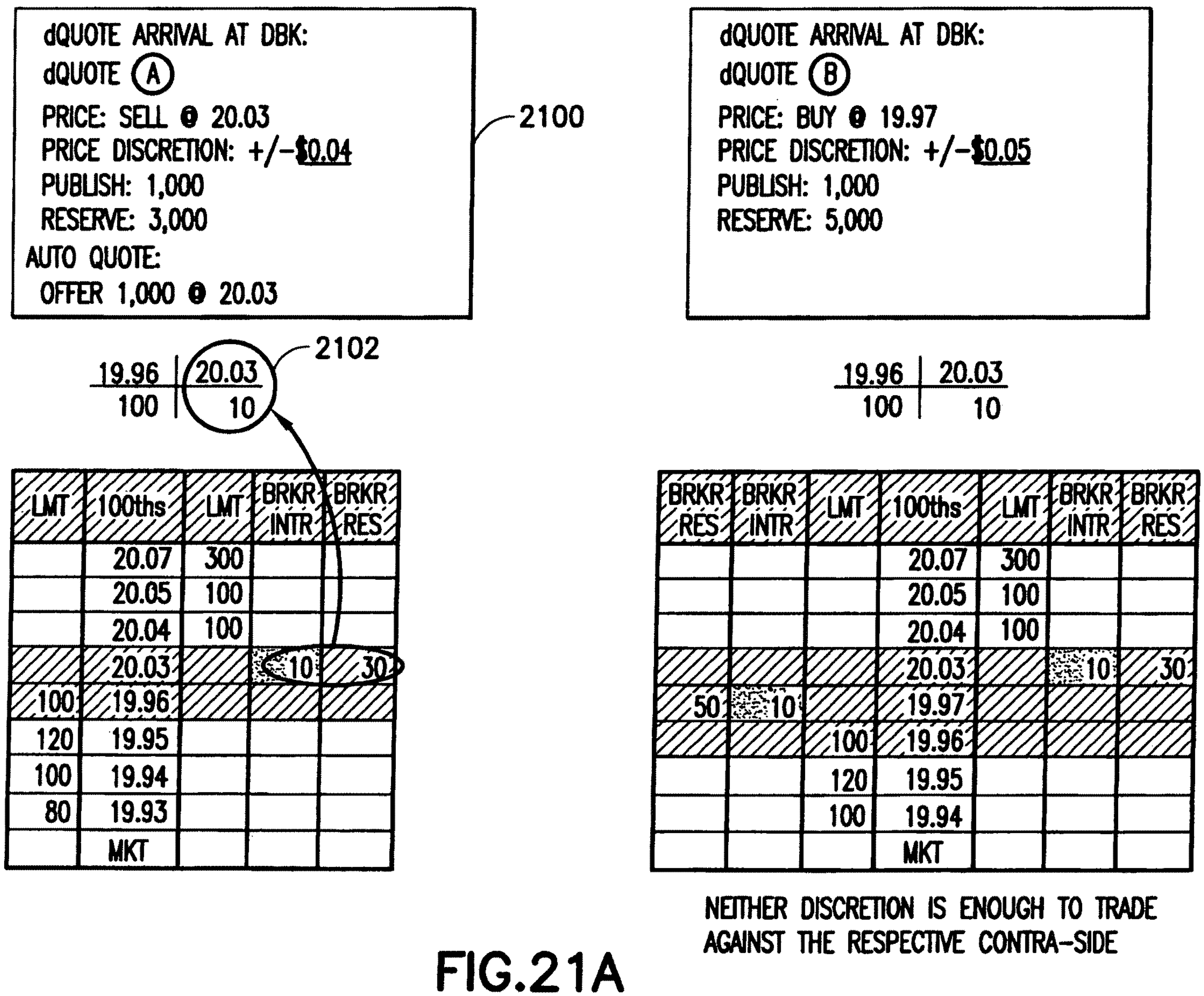
Figure 21B:
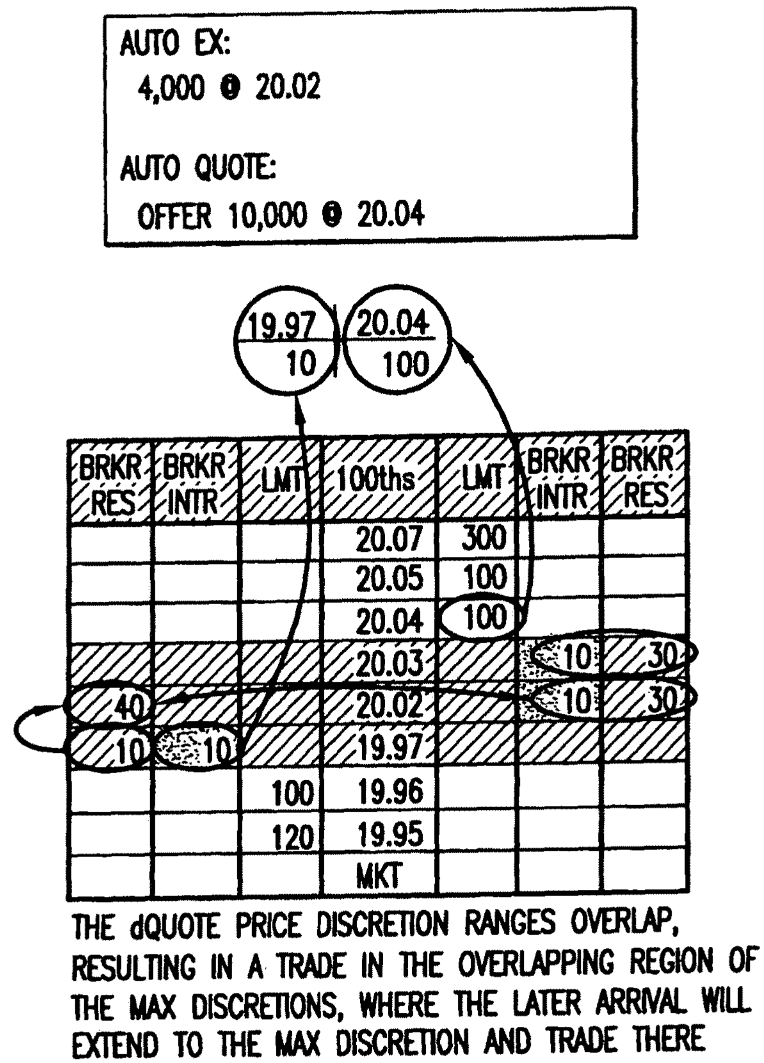

FIGS. 21A and 21B illustrate two d-Quotes at opposite sides that do not have enough discretion to trade with the respective contra-side, but in the middle, they trade at the maximum discretion of the later arrival. A first broker enters a d-Quote (A) to sell 4,000 shares at $20.03, with price discretion of +/−$0.04; publish 1,000 shares; and 3,000 shares in reserve (2100). This is the best offer and is autoquoted (2102). A second broker enters a d-Quote (B) to buy 6,000 shares at $19.97, with price discretion of +/−$0.05; publish 1,000 shares; and 5,000 shares in reserve. Neither d-Quote limit is within the price discretion of the other, however the price discretion ranges overlap. In FIG. 21B, system 100 automatically executes 4,000 shares at $20.02. The execution price of $20.02 is the maximum discretion ($19.97+0.05) of the later arriving d-Quote.

Figure 22A:
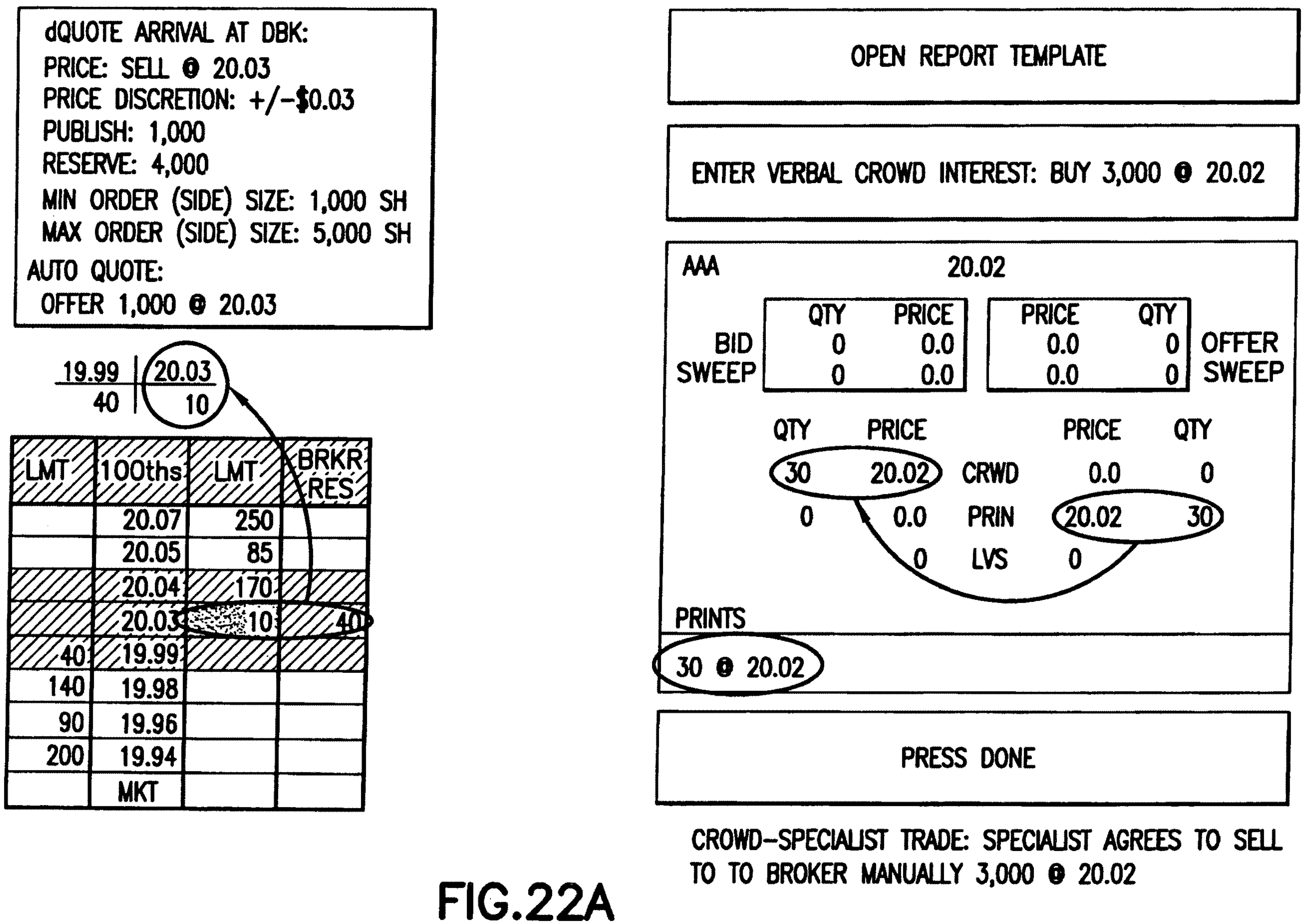

FIGS. 22A and 22B illustrate a d-Quote that does not participate at its discretionary price in a manual trade. A broker enters a d-Quote to sell 5,000 shares at $20.03, with price discretion of +/−$0.03; publish 1,000 shares; 4,000 shares in reserve; 1,000 shares minimum order (side) size; and 5,000 shares maximum order (side) size. This is the best offer and is autoquoted. A broker in the crowd expresses verbal interest to buy 3,000 shares at $20.02 and the specialist agrees to sell 3,000 shares to the broker manually at $20.02. In this circumstance, the d-Quote does not participate in the manual execution although the manual execution price is within the price discretion of the d-Quote.

Pegging

As indicated above, in order for a d-Quote to participate and exercise its discretionary pricing, the limit price must be at the BBO. With a slower market, this may not be particularly difficult. However, with faster and automated markets, it may be difficult for the broker to maintain the d-Quote at the BBO, causing the broker to miss the market. A pegging feature helps to resolve this problem.

A pegged e-Quote or d-Quote is entered at its limit price and will join the BBO if the limit and BBO are the same. A pegged e-Quote or d-Quote is also entered at its limit price and establishes the BBO if the limit price is better than the BBO. If the limit price of the pegged e-Quote or d-Quote is worse than the BBO, then the e-Quote or d-Quote immediately pegs to the better priced BBO, discretionary pricing and ceiling price allowing, as soon as the pegged d-Quote arrives at the display book. When a pegged d-Quote is at the BBO and a new order establishes a new BBO, within the d-Quote's ceiling price, the d-Quote is automatically pegged to the new BBO. When a pegged d-Quote is at the BBO and is at its ceiling or floor price and gets bettered, the d-Quote becomes a normal e-Quote priced away from the BBO. The pegged d-Quote only pegs to interest on the display book below (above) its price ceiling (floor) unless at the limit price. A pegged d-Quote can not trade beyond its ceiling price. A pegged e-Quote or d-Quote pegs to the next available interest on the display book when the interest at the BBO cancels. When display book interest falls below the pegged e-Quote or d-Quote limit price (through cancels) the e-Quote or d-Quote becomes the BBO.

Figure 23:
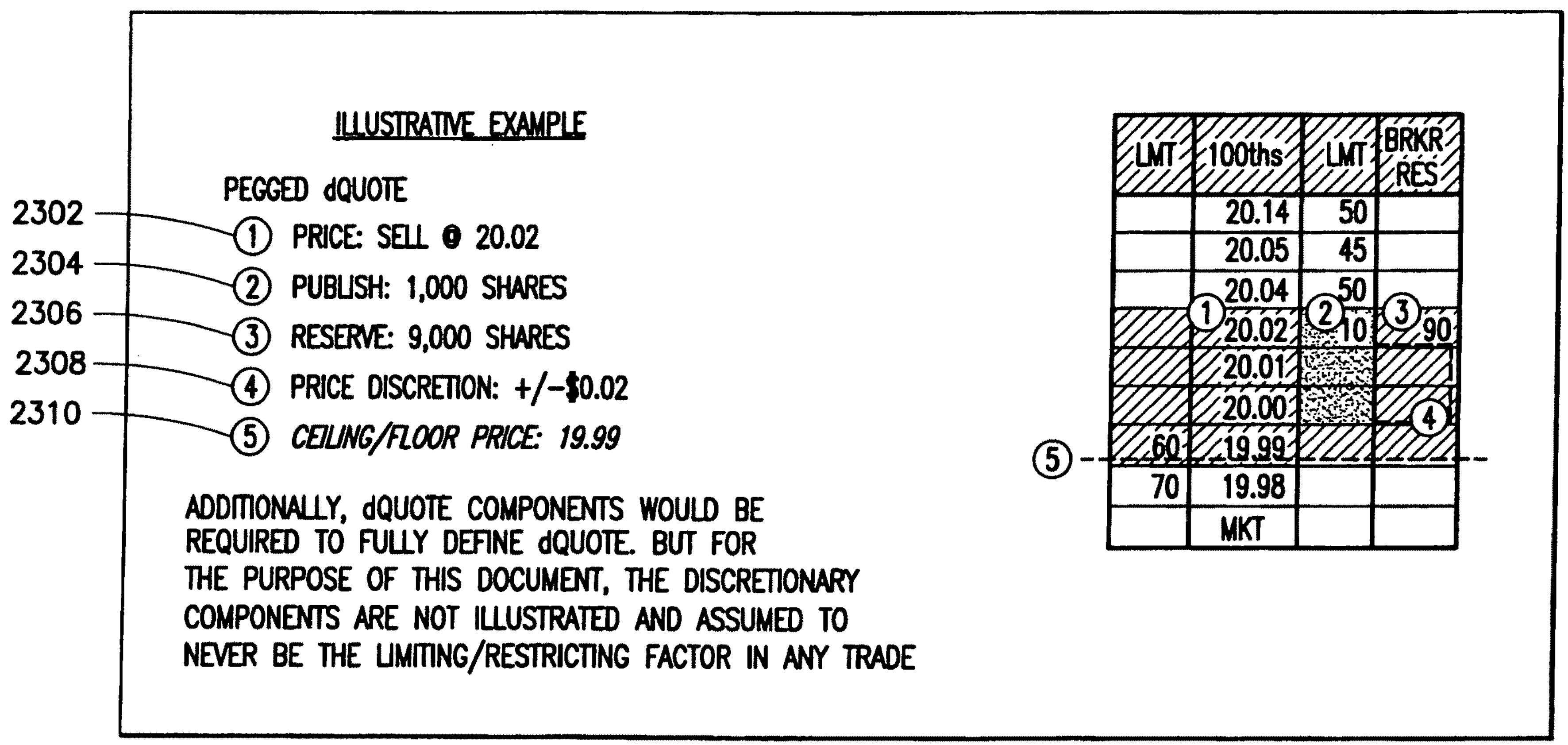

FIG. 23 illustrates an example pegged d-Quote. It has a price (2302), a quantity of shares to publish (2304) and a quantity of shares in reserve (2306) that is not published. It also has price discretion (2308) and a ceiling/floor price (2310). Other features of a d-Quote, which have been discussed above, such as minimum (side) size, maximum (side) size and maximum discretion volume might be applicable, but are not illustrated.

Figure 24:
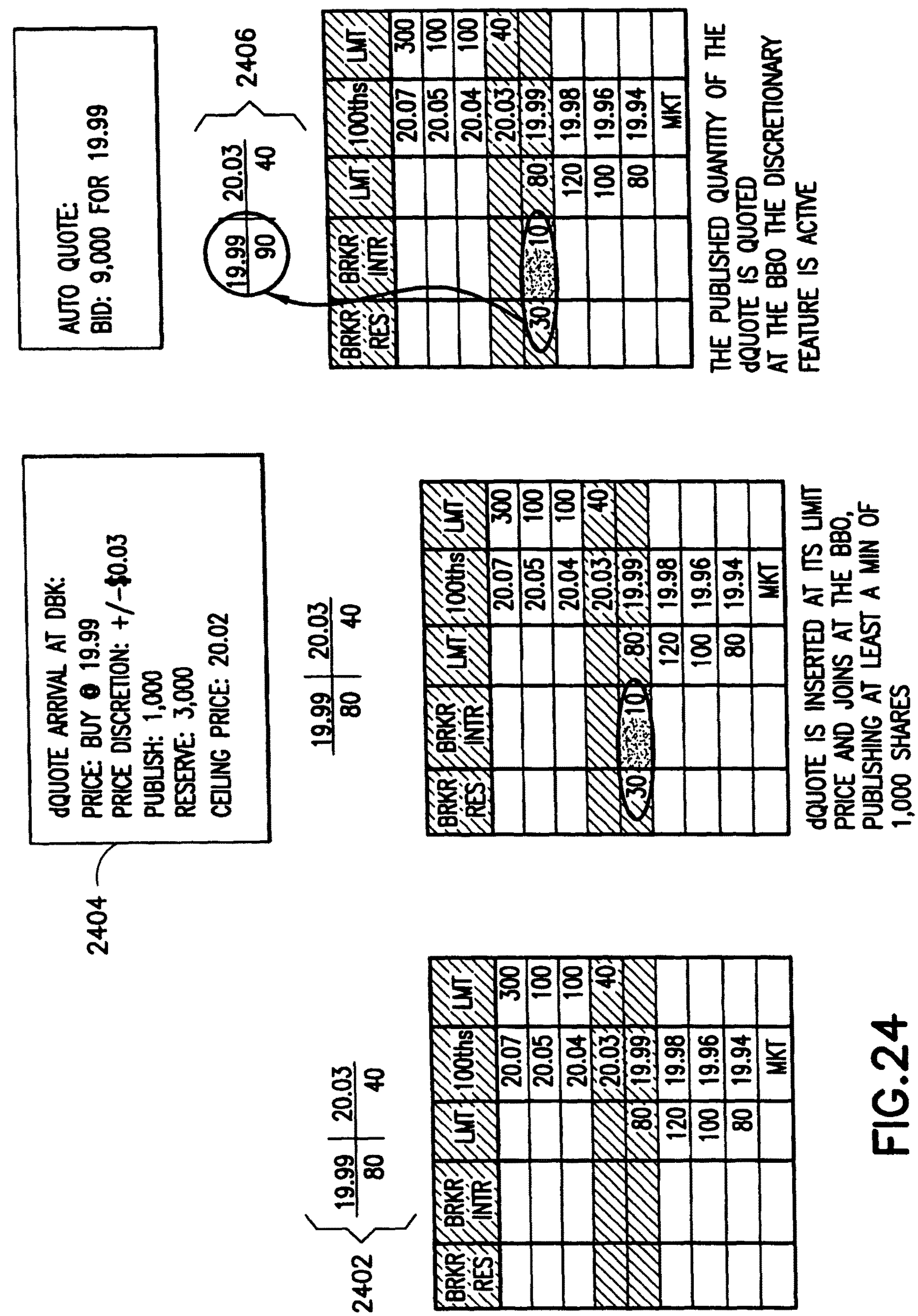

FIG. 24 illustrates a pegged d-Quote that is inserted in the display book at its limit price and joins the BBO. The display book reflects a bid of 8,000 shares at $19.99 and an offer of 4,000 shares at $20.03 (2402). A broker enters a pegged d-Quote to buy 4,000 shares at $19.99, with 1,000 shares published; 3,000 shares in reserve; and a ceiling price of $20.02 (2404). The pegged d-Quote limit price of $19.99 is the same as the best bid price of $19.99 so the pegged d-Quote joins the other orders at that price and system 100 automatically quotes the new quantity (2406).

Figure 25:
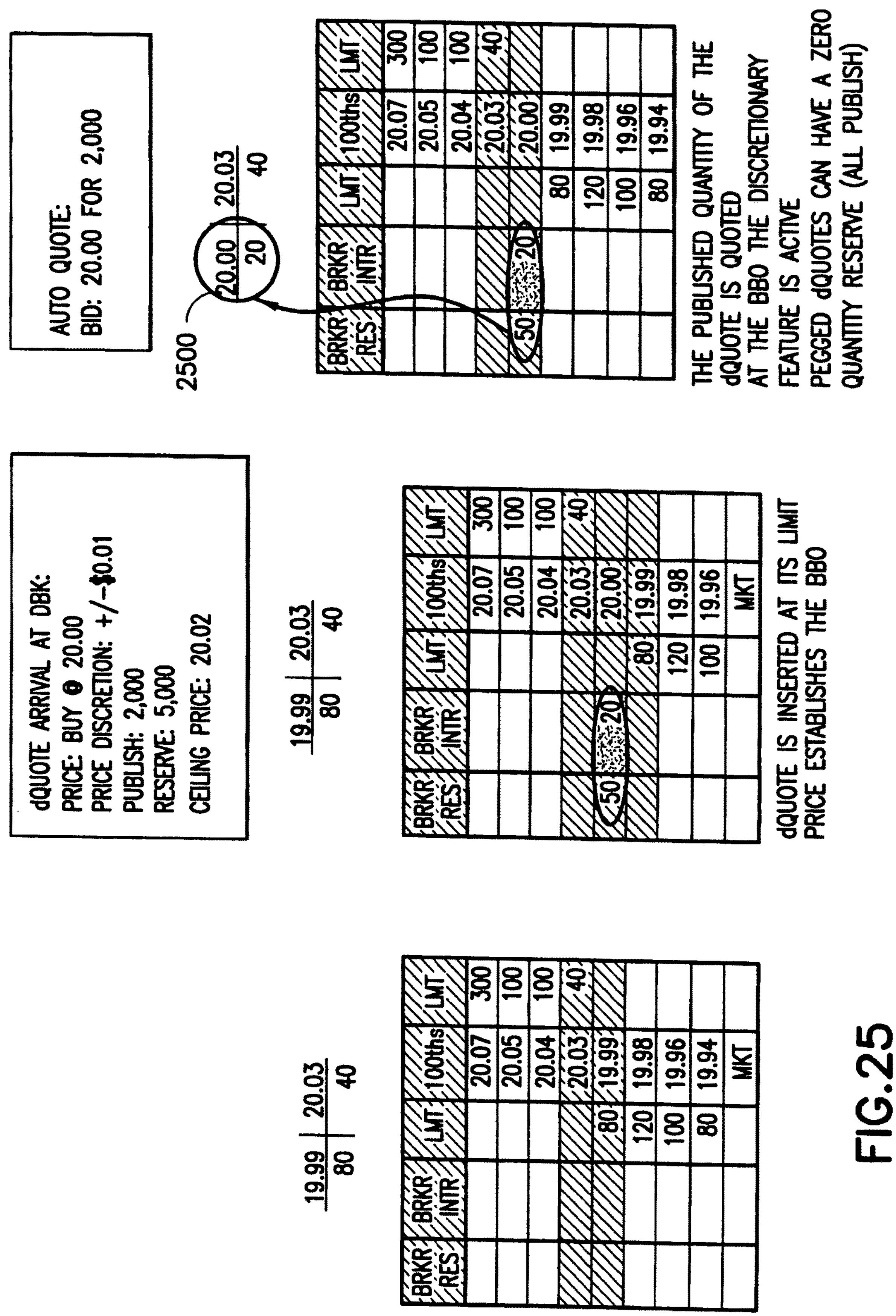

FIG. 25 illustrates a pegged d-Quote that becomes the BBO at its limit price. The display book reflects a-bid of 8,000 shares at $19.99 and an offer of 4,000 shares at $20.03. A broker enters a pegged d-Quote to buy 7,000 shares at $20.00, with 2,000 shares published; 5,000 shares in reserve; and a ceiling price of $20.02. The pegged d-Quote limit price of $20.00 is better than the best bid price of $19.99 so the pegged d-Quote becomes the new best bid, and system 100 automatically quotes the new bid (2500).

Figure 26:
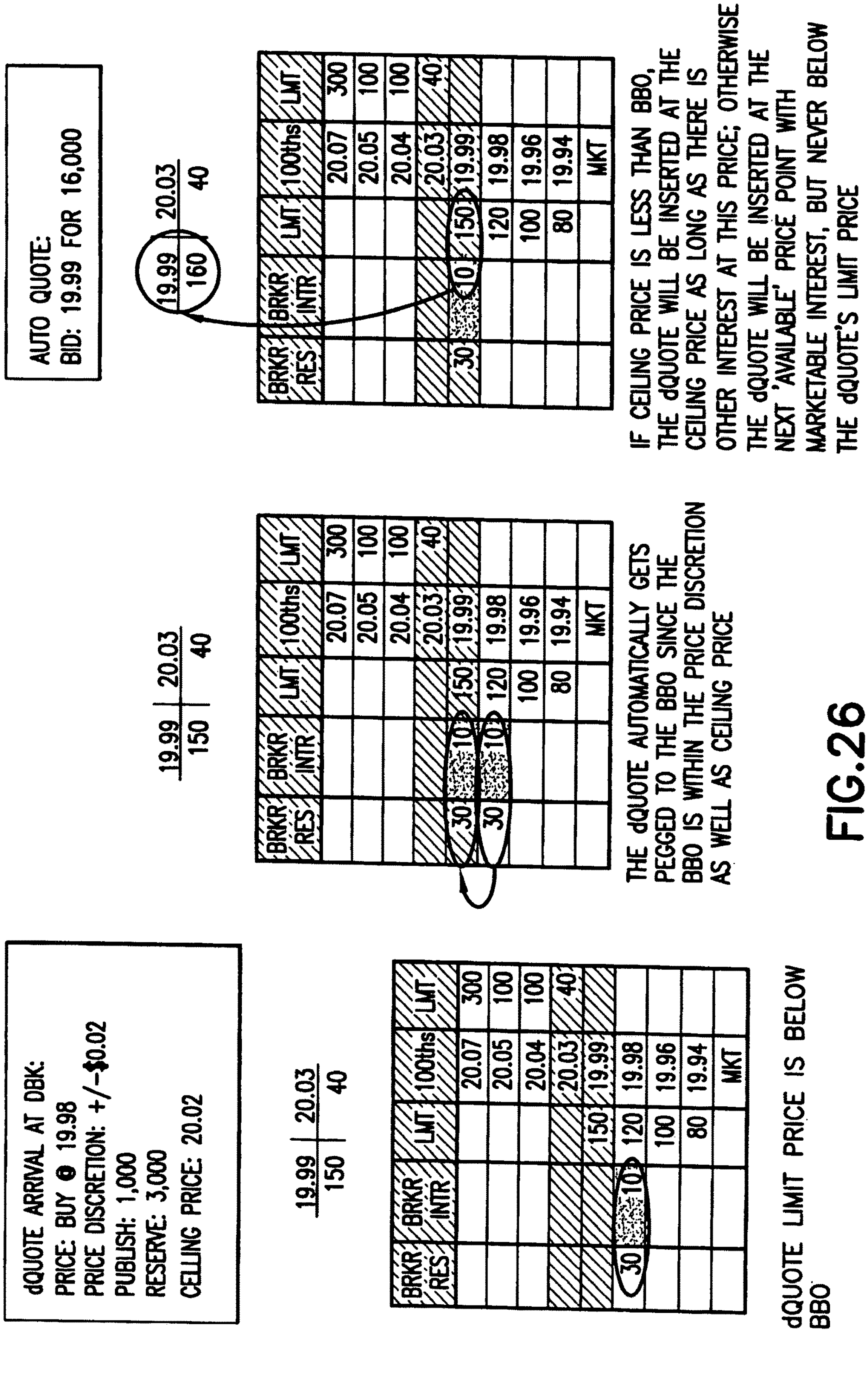

FIG. 26 illustrates a pegged d-Quote that arrives at the display book with a price that is worse than the BBO but is within the ceiling/floor price, so is pegged to the BBO. The display book reflects a bid of 15,000 shares at $19.99 and an offer of 4,000 shares at $20.03. A broker enters a pegged d-Quote to buy 4,000 shares at $19.98, with 1,000 shares published; 3,000 shares in reserve; and a ceiling price of $20.02. The pegged d-Quote limit price of $19.98 is worse than (below) the best bid price of $19.99 so the pegged d-Quote is automatically pegged to the BBO since the BBO is still within the ceiling price of $20.02. System 100 automatically quotes the new bid quantity.

Figure 27:
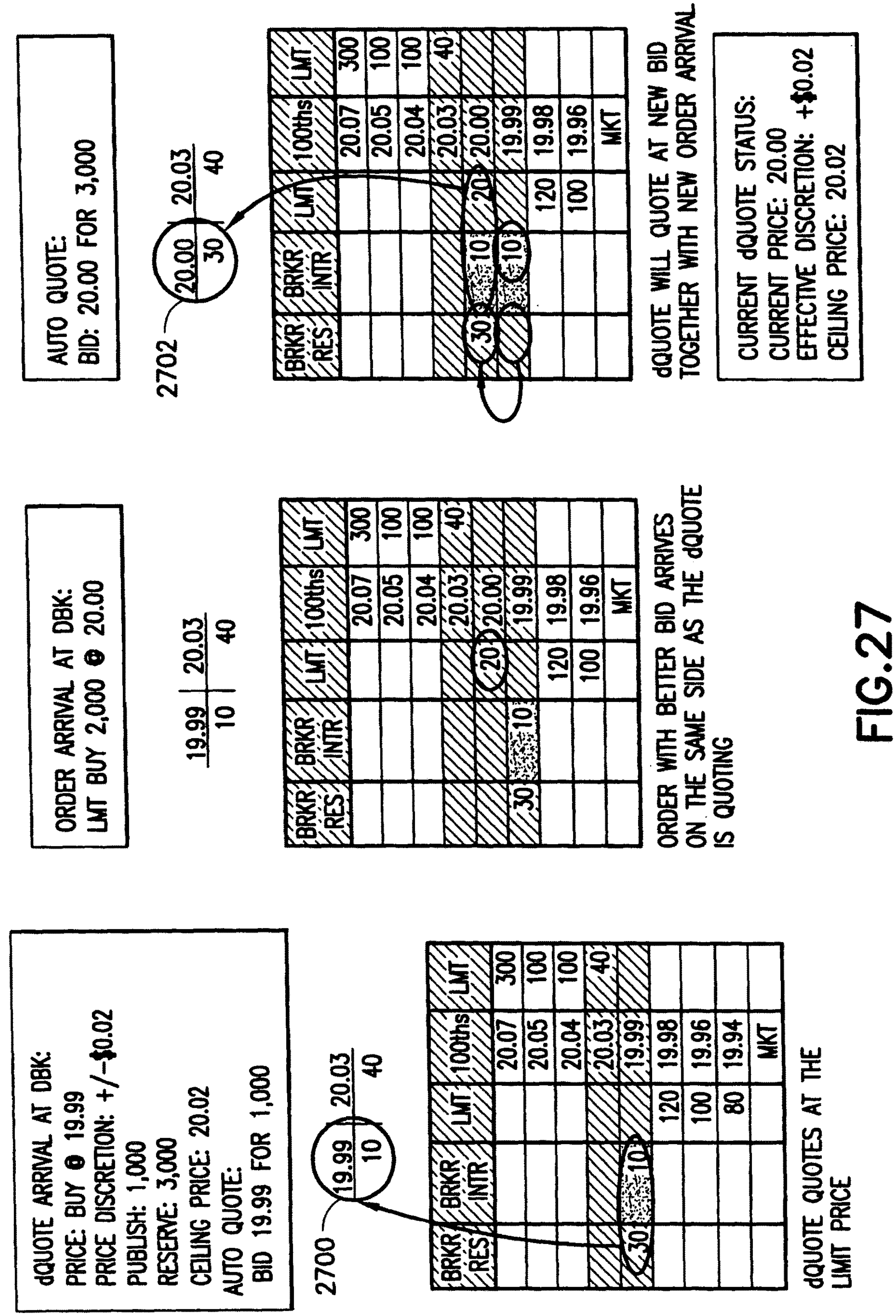

FIG. 27 illustrates automatic pegging of a d-Quote when a new order establishes a new BBO. The display book reflects a bid of 12,000 shares at $19.98 and an offer of 4,000 shares at $20.03. A broker enters a pegged d-Quote to buy 4,000 shares at $19.99, with 1,000 shares published; 3,000 shares in reserve; and a ceiling price of $20.02. The pegged d-Quote limit price of $19.99 is better than the best bid price of $19.98 so the pegged d-Quote becomes the new best bid, and system 100 automatically quotes the new bid (2700). System 100 receives a limit order to buy 2,000 shares at $20.00, which is a better bid than the pegged d-Quote. System 100 automatically pegs the d-Quote to the new bid price of $20.00 and autoquotes the new bid (2702).

Figure 28:
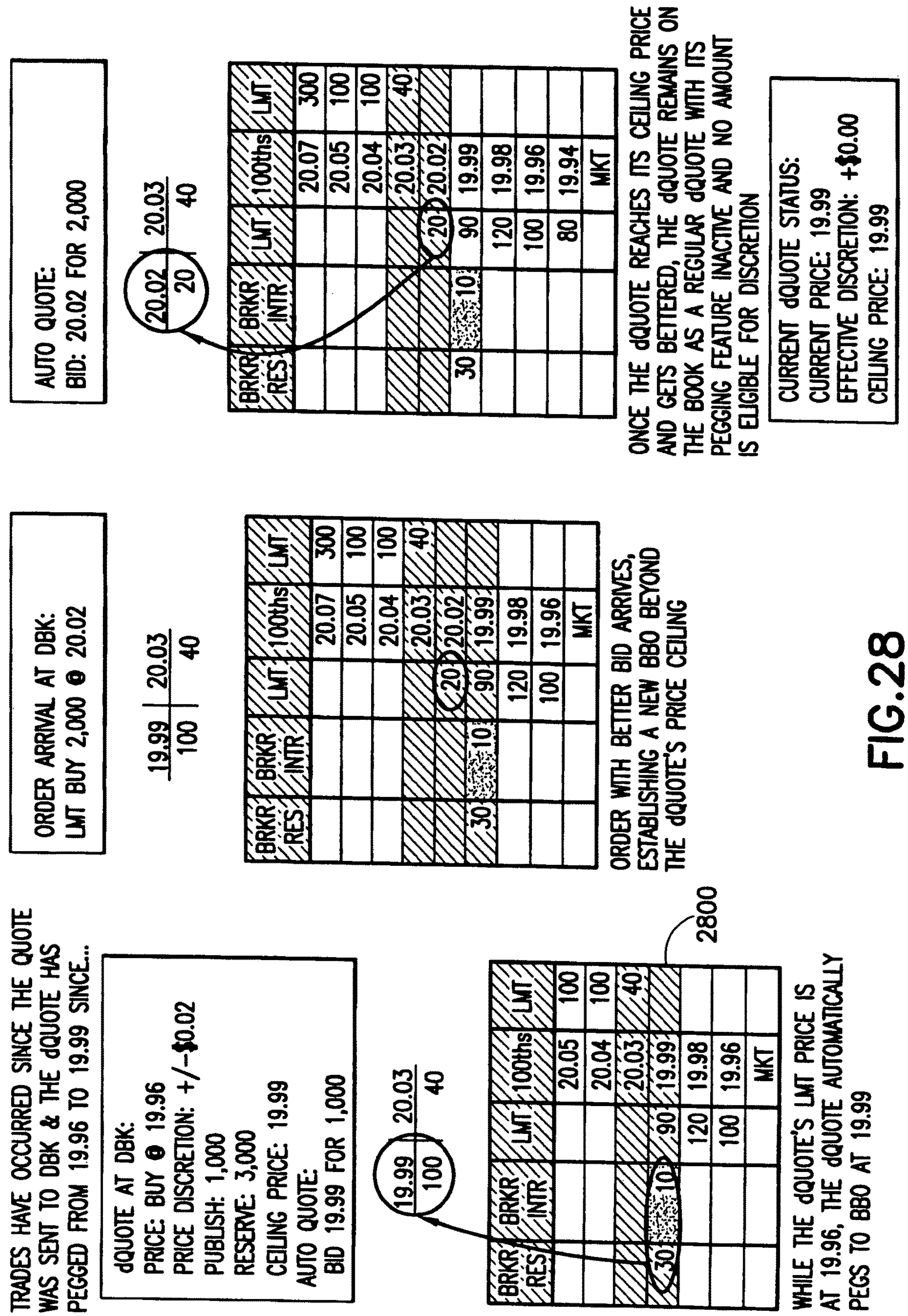

FIG. 28 illustrates a pegged d-Quote that reaches its ceiling price and get bettered. A broker enters a pegged d-Quote to buy 4,000 shares at $19.96, with 1,000 shares published; 3,000 shares in reserve; and a ceiling price of $19.99. Subsequent trades occur and the pegged d-Quote pegs from $19.96 to $19.99 (2800). System 100 receives a limit order to buy 2,000 shares at $20.02, which is a better bid and establishes a new BBO that is beyond the pegged d-Quote price ceiling. System 100 autoquotes the new bid, and the pegged d-Quote becomes a regular e-Quote on the display book. However, its pegging feature is not active and there is no amount eligible for discretion.

Figure 29:
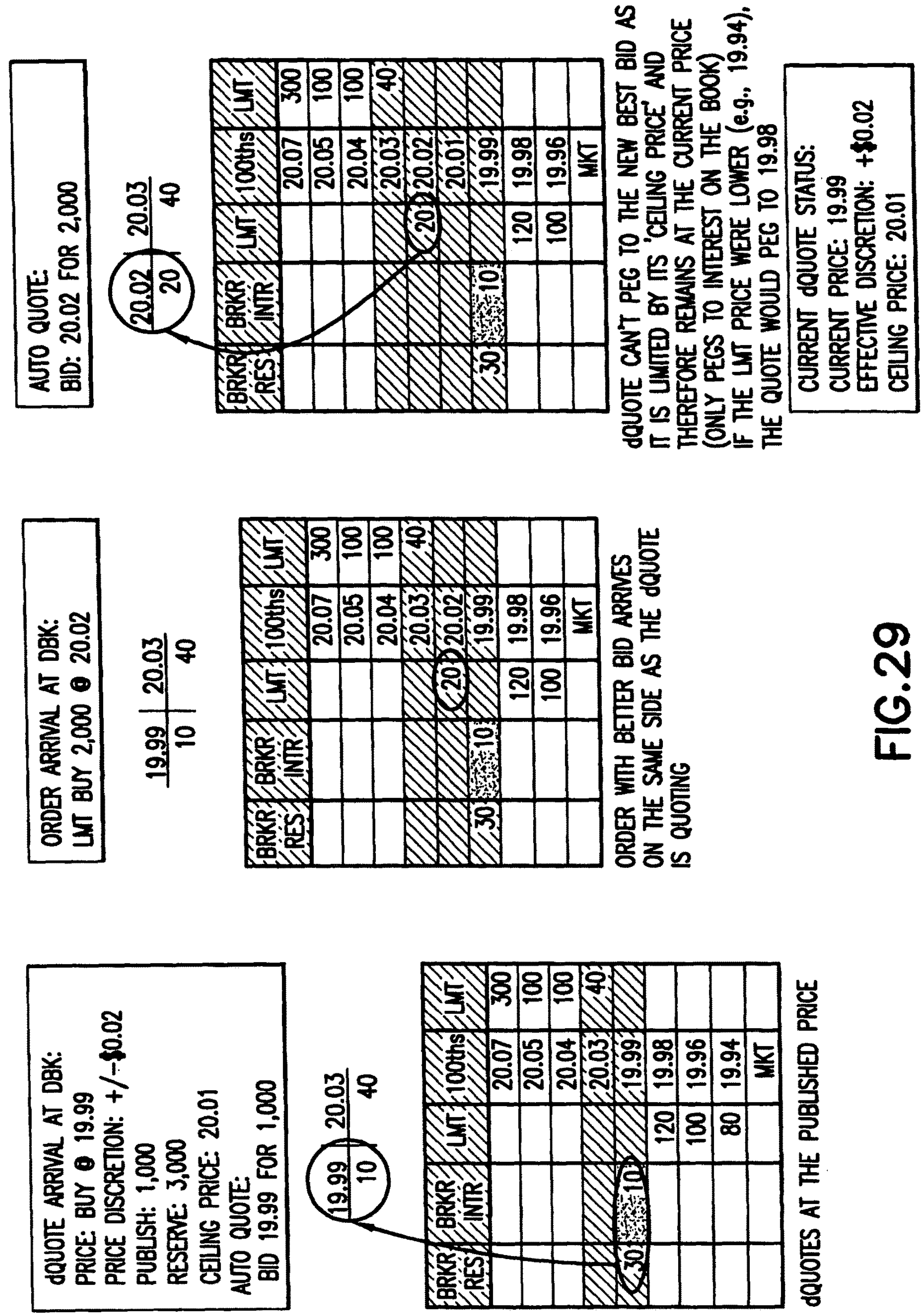

FIG. 29 illustrates a pegged d-Quote that does not peg to a new limit order because it is above the ceiling price. A broker enters a pegged d-Quote to buy 4,000 shares at $19.99, with 1,000 shares published; 3,000 shares in reserve; and a ceiling price of $20.01. The pegged d-Quote limit price of $19.99 is better than the best bid price of $19.98 so the pegged d-Quote becomes the new best bid and system 100 automatically quotes the new bid. System 100 receives a limit order to buy 2,000 shares at $20.02, which is a better bid than the pegged d-Quote. However, system 100 does not automatically peg the d-Quote to the new bid price of $20.02 because that price is above the pegged d-Quote ceiling price of $20.01.

Figure 30A:
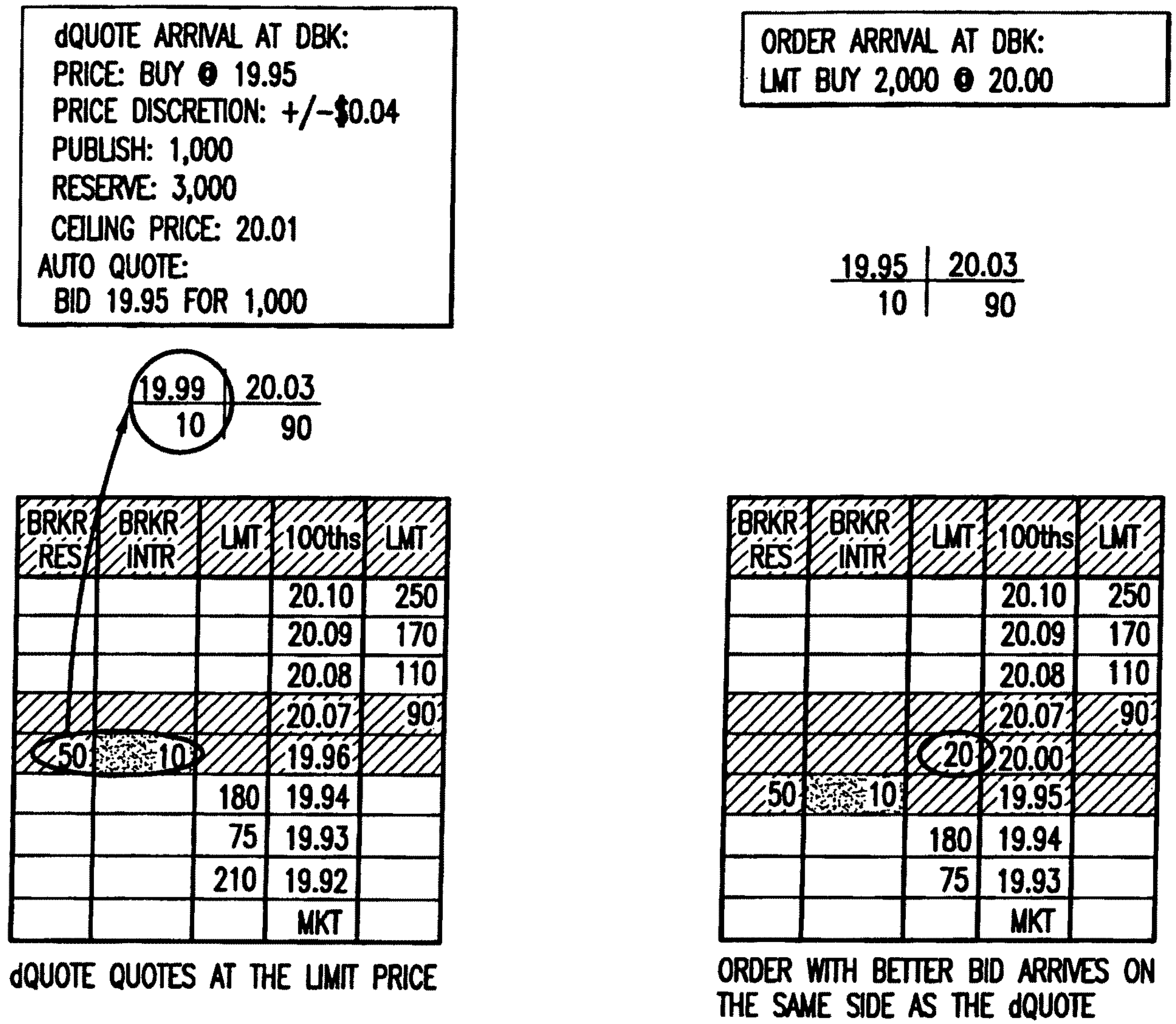
Figure 30B:
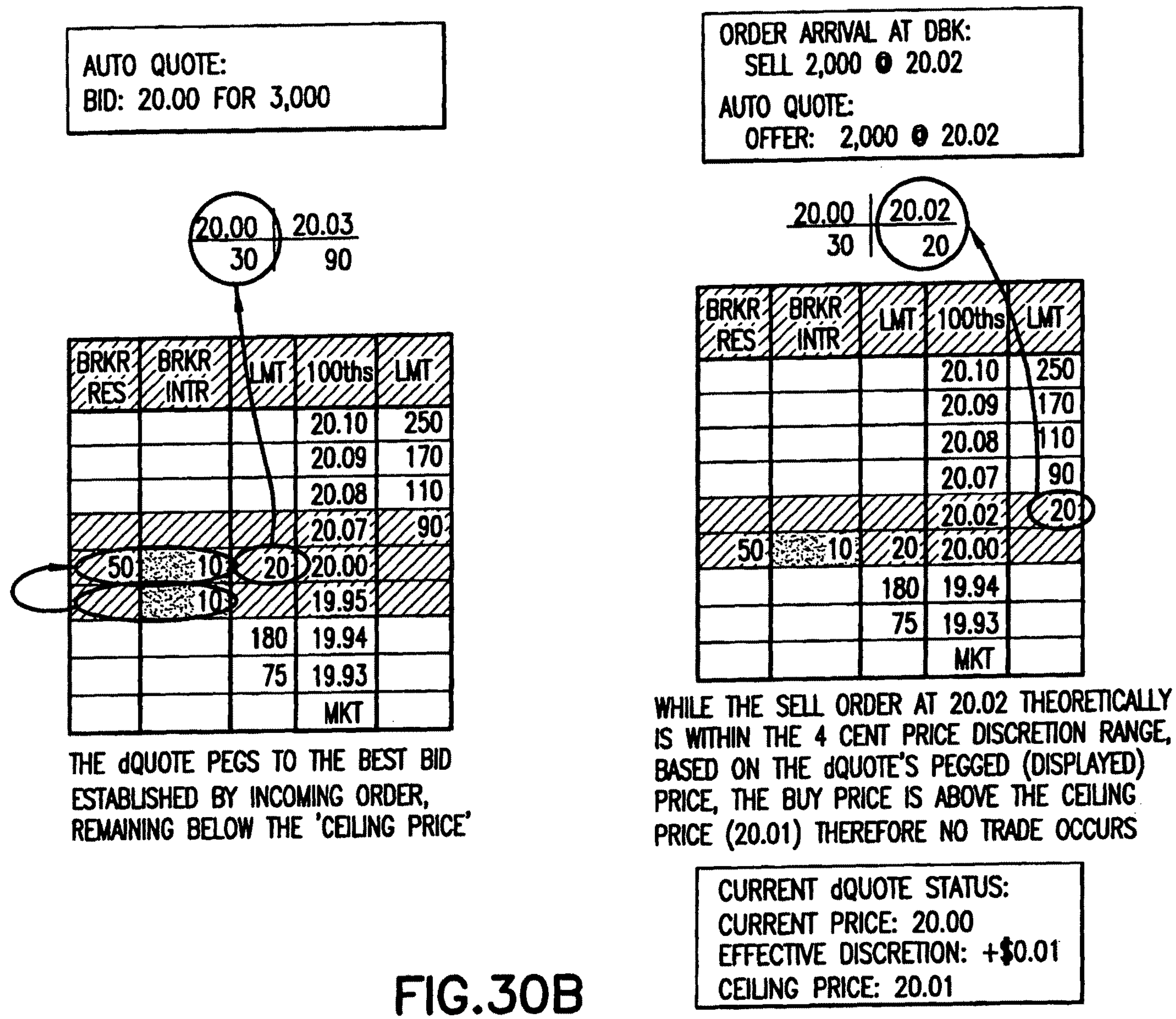

FIGS. 30A and 30B illustrate a pegged d-Quote that does not trade above its ceiling price. A broker enters a pegged d-Quote to buy 4,000 shares at $19.95, with 1,000 shares published; 3,000 shares in reserve; and a ceiling price of $20.01. The pegged d-Quote limit price is better than the best bid price so the pegged d-Quote becomes the new best bid and system 100 automatically quotes the new bid. System 100 receives a limit order to buy 2,000 shares at $20.00, which is a better bid than the pegged d-Quote. System 100 automatically pegs the d-Quote to the new bid price of $20.00 because that price is below the pegged d-Quote ceiling price of $20.01. System 100 receives a limit order to sell 2,000 shares at $20.02, but the order is not automatically executed against the pegged d-Quote. The pegged d-Quote had a price discretion of +$0.04, but when at or near the ceiling price the discretion is limited to the ceiling price. Here, since the d-Quote is pegged to the BBO at $20.00 and the ceiling price is $20.01 there is only $0.01 of + discretion available, and no trade occurs.

Figure 31:
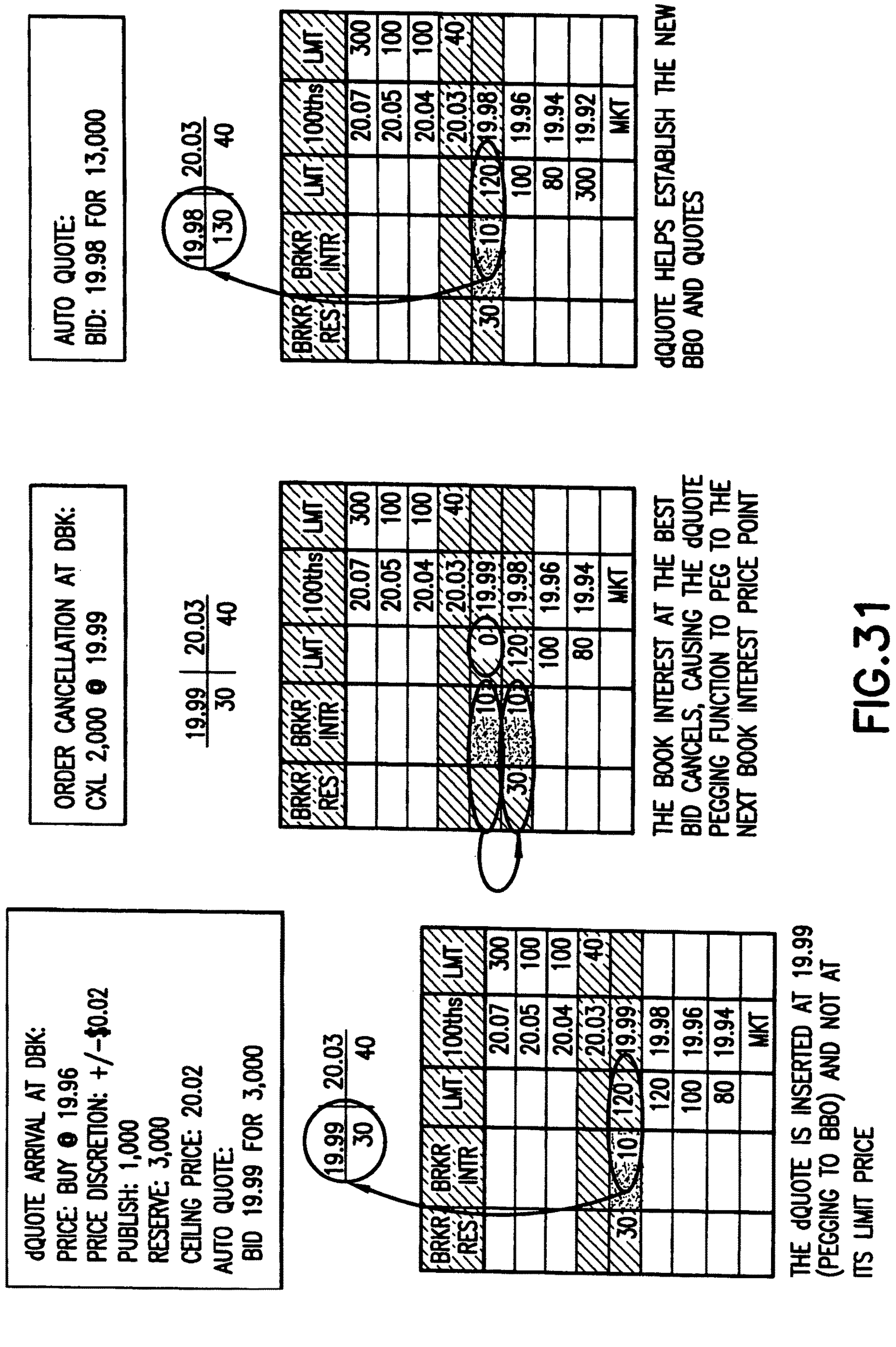

FIG. 31 illustrates a pegged d-Quote at the BBO that pegs to the next available interest on the display book when the interest at the BBO cancels. The display book reflects a bid of 2,000 shares at $19.99 and an offer of 4,000 shares at $20.03. A broker enters a pegged d-Quote to buy 4,000 shares at $19.96, with 1,000 shares published; 3,000 shares in reserve; and a ceiling price of $20.02. The pegged d-Quote limit price is automatically pegged to the bid of $19.99 and joins the other orders at that price. System 100 receives an order cancel of the 2,000 shares at $19.99, leaving the pegged d-Quote as the only interest at $19.99. This causes system 100 to peg the d-Quote to the next book interest price point of $19.98. The 1,000 shares for publication are added to the 12,000 shares on the book at $19.98 and published as the new bid.

Figure 32:
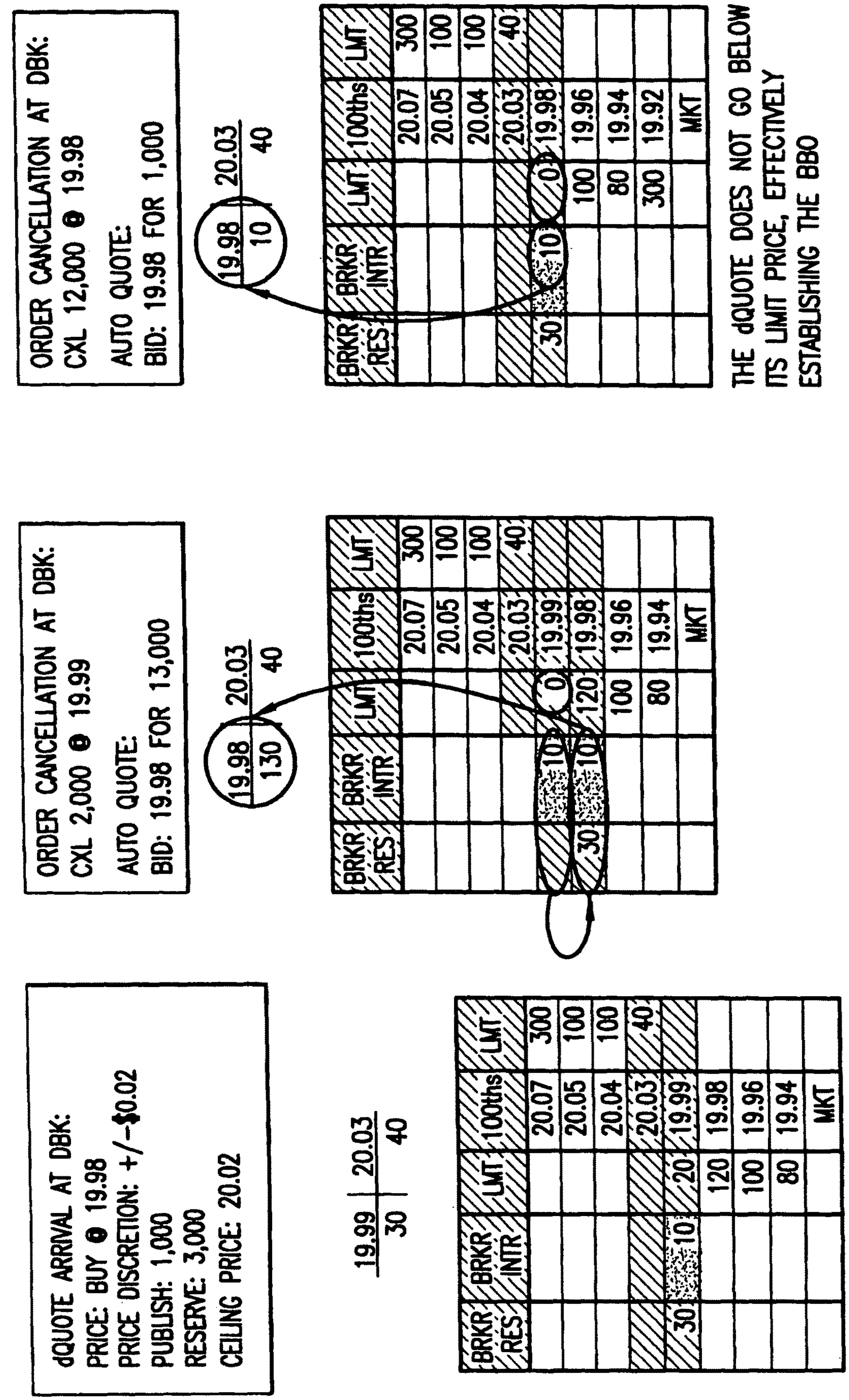

FIG. 32 illustrates a pegged d-Quote that remains on the display book at its limit price even though all other orders at the price cancel. A broker enters a pegged d-Quote to buy 4,000 shares at $19.98, with 1,000 shares published; 3,000 shares in reserve; and a ceiling price of $20.02. The pegged d-Quote limit price is automatically pegged to the bid of $19.99 joining the other orders at that price and system 100 autoquotes. System 100 receives an order cancel for 2,000 shares at $19.99 which leaves the pegged d-Quote alone at the best bid, so the pegged d-Quote pegs to the next available interest on the book at $19.98, which is again autoquoted. System 100 receives an order cancel for 12,000 shares at $19.98, which again leaves the pegged d-Quote alone at the best bid. However, in this instance, system 100 leaves the pegged d-Quote at that price because that is the limit price of the pegged d-Quote and establishes the BBO.

Figure 33:
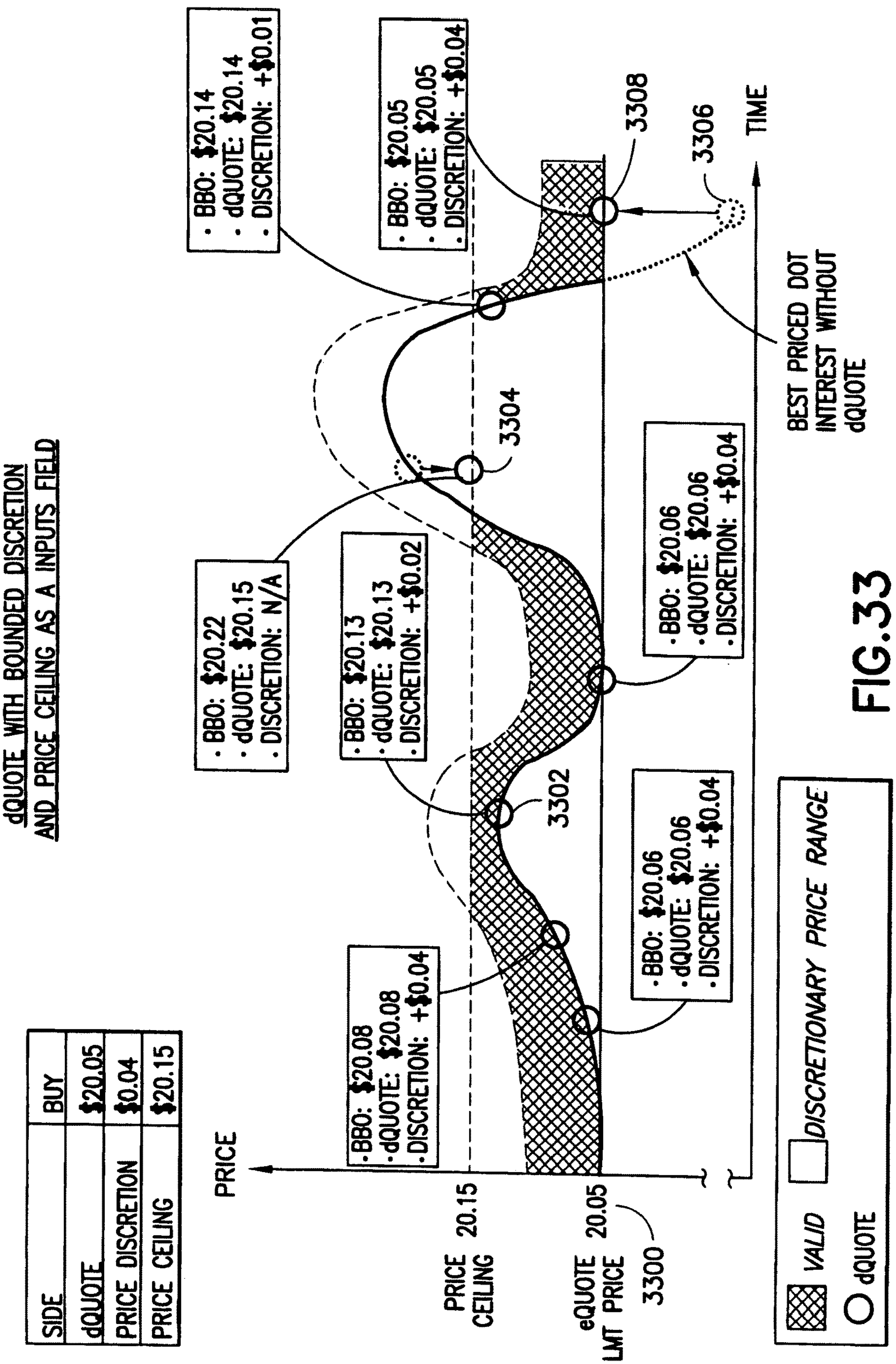

FIG. 33 illustrates features of pegged d-Quotes as the best bid moves in price. In the illustration, the pegged d-Quote is an order to buy at $20.05 with price discretion +/−$0.04, and a ceiling price of $20.15. When entered (3300), the best bid is $20.05 and the pegged d-Quote joins the best bid at that price. As the best bid increases, the pegged d-Quote will continue to peg to the best bid, assuming it is not completely traded. However at some point, the + price discretion will run into the ceiling price, limiting the amount of + price discretion to the ceiling price (3302). If the best bid goes above the ceiling price (3304), the pegged d-Quote becomes a regular e-Quote until the best bid falls below the ceiling price. If the best bid falls below the pegged d-Quote price (3306), then the pegged d-Quote becomes the best bid price (3308).

The description above along with FIGS. 1-33 explain various embodiments of the inventions in the context an order display book. In the following description, various embodiments of the inventions are described and illustrated using flow charts.

Figure 34A:
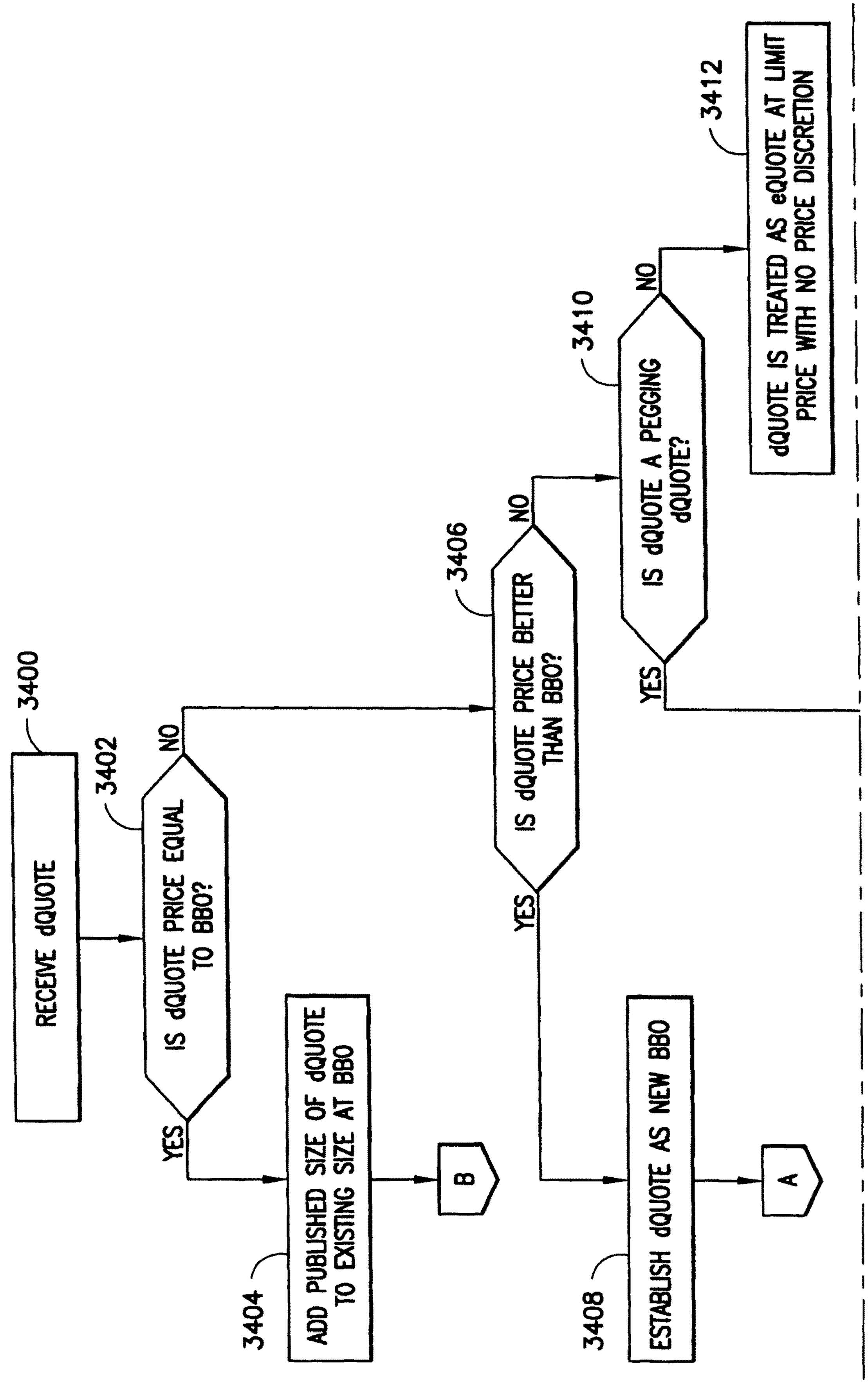
FIGS. 34-38 illustrates steps in methods of various embodiments of the inventions.
Figures 34, 34B:
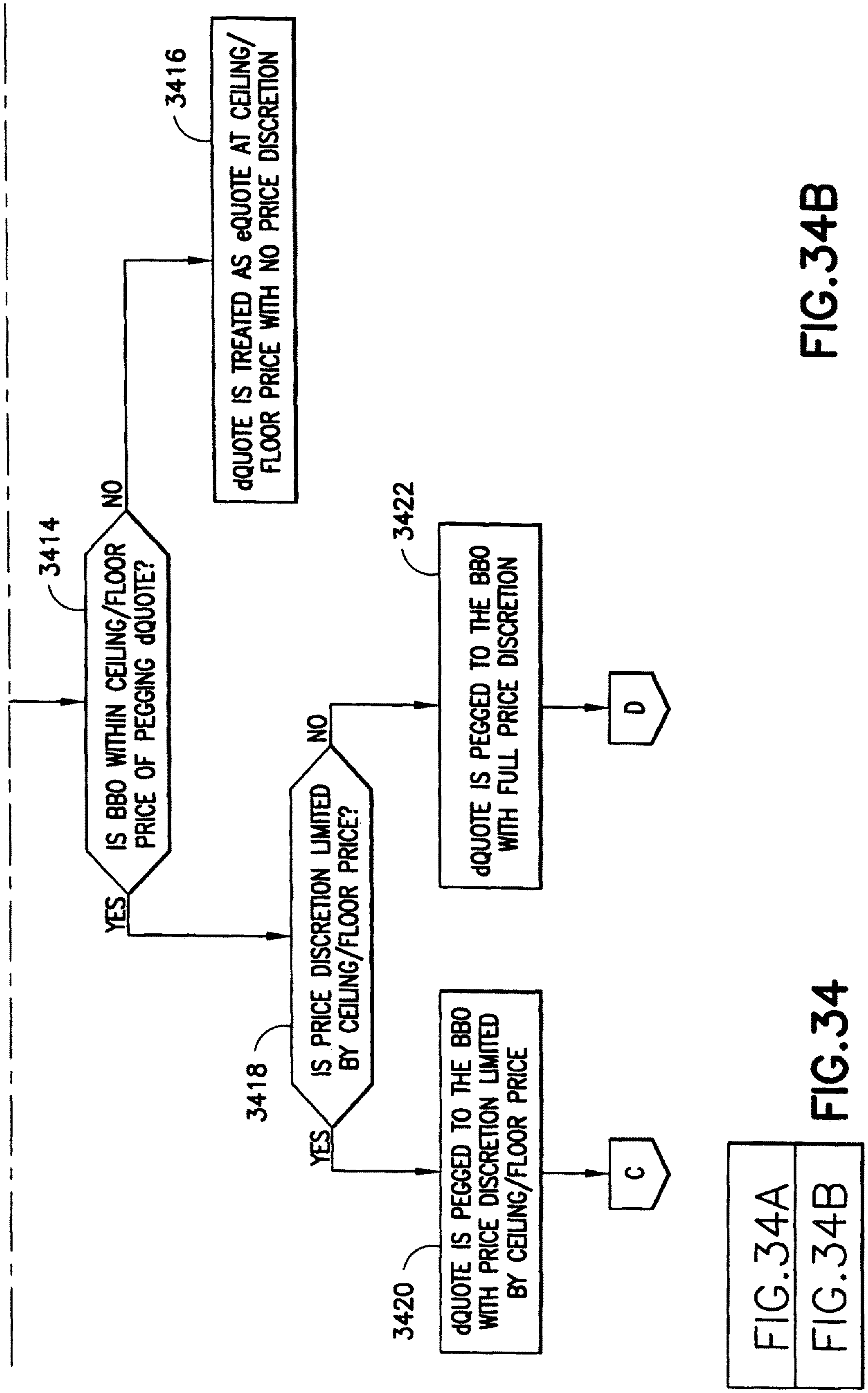

In FIG. 34, at step 3400, system 100 receives a d-Quote, and at step 3402, determines whether the d-Quote price is equal to the best bid or offer (BBO). If the d-Quote price is equal to the BBO, then at step 3404 the published size of the d-Quote is added to the existing size at the BBO.

If at step 3402, system 100 determines that the d-Quote price is not equal to the BBO, then at step 3406, system 100 determines whether the d-Quote price is better than the BBO, and if the d-Quote price is better than the BBO, then at step 3408, system 100 establishes the d-Quote price as the new BBO.

If at step 3406, system 100 determines that the d-Quote price is not better than the BBO, then at step 3410, system 100 determines whether the d-Quote is a pegging d-Quote. If system 100 determines that the d-Quote is not a pegging d-Quote, then at step 3412, system 100 treats the d-Quote as a regular e-Quote at the limit price with no price discretion.

If at step 3410, system 100 determines that the d-Quote is a pegging d-Quote, then at step 3414, system 100 determines whether the BBO is within any ceiling/floor price of the pegging d-Quote. If the BBO is not within any ceiling/floor price of the pegging d-Quote, then at step 3416, system 100 treats the d-Quote as a regular e-Quote at the ceiling/floor price with no price discretion.

If at step 3414, system 100 determines that the BBO is within any ceiling/floor price of the pegging d-Quote, then at step 3418, system 100 determines whether any price discretion of the d-Quote is limited by the ceiling/floor price. If price discretion of the d-Quote is limited by the ceiling/floor price, then at step 3420, system 100 pegs the d-Quote to the BBO with price discretion limited by the ceiling/floor price.

If at step 3418, system 100 determines that price discretion of the d-Quote is not limited by the ceiling/floor price, then at step 3422, system 100 pegs the d-Quote to the BBO with full price discretion.

Figure 35A:
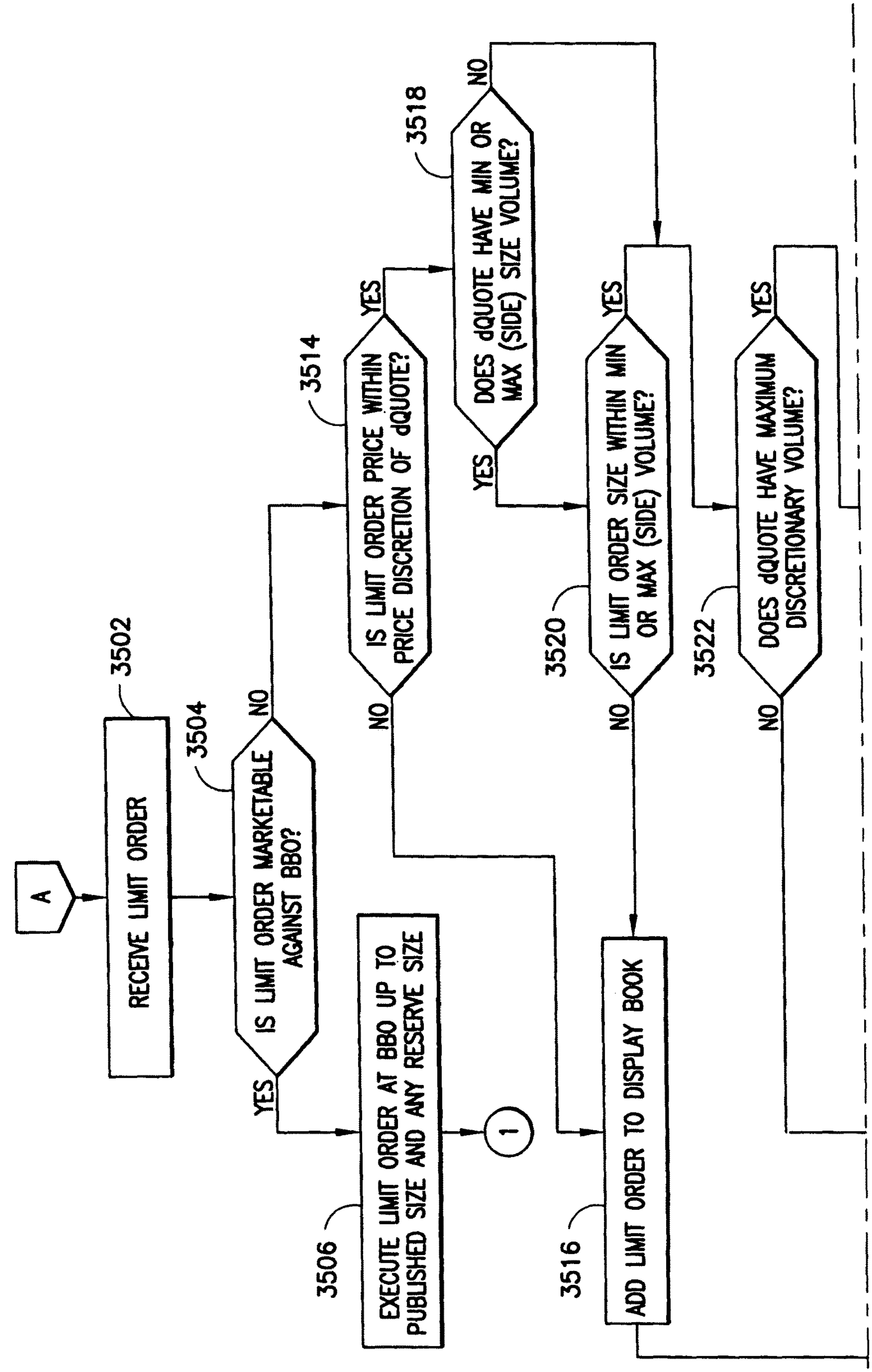
Figures 35, 35B:
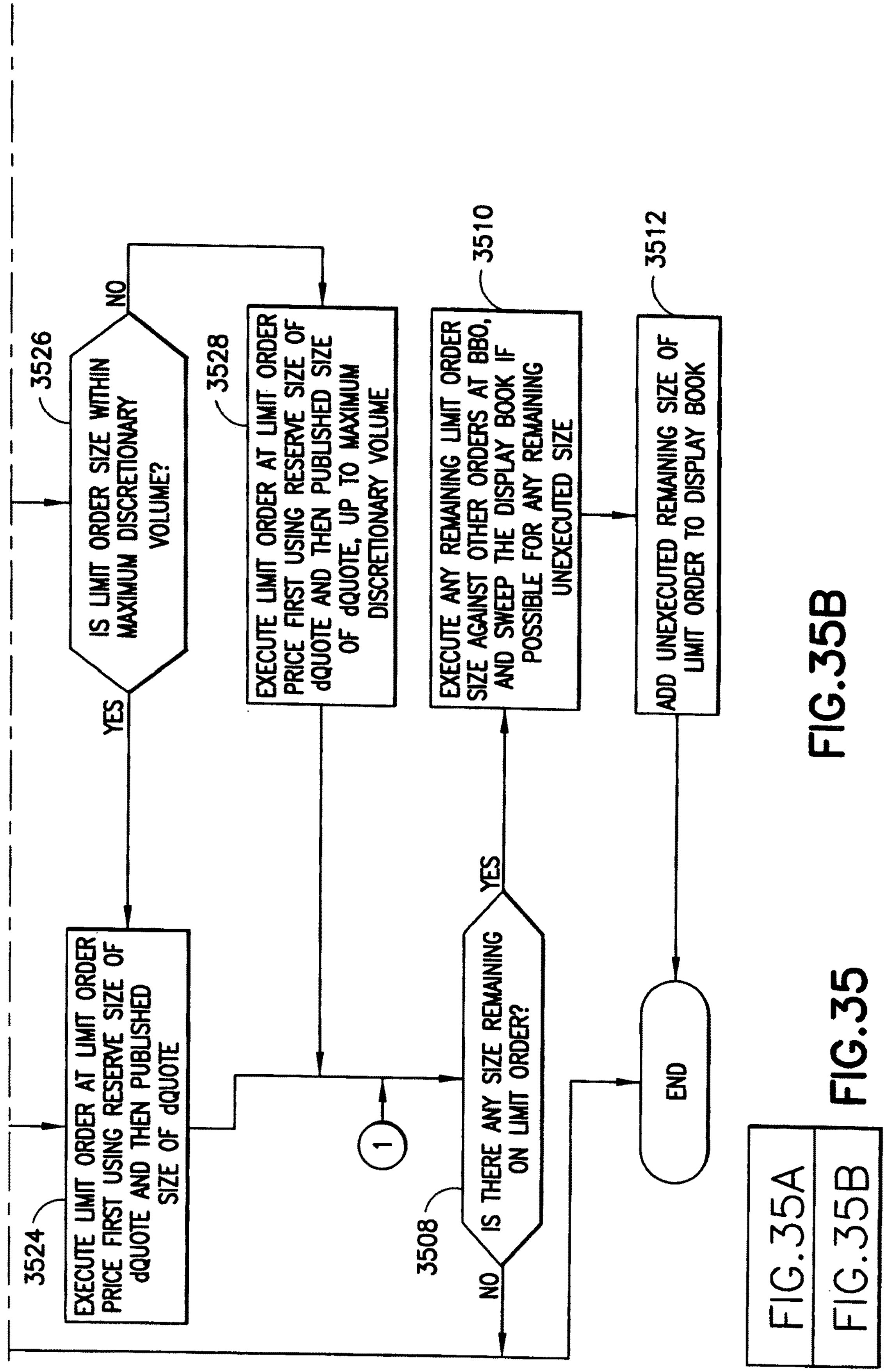
Figure 36A:
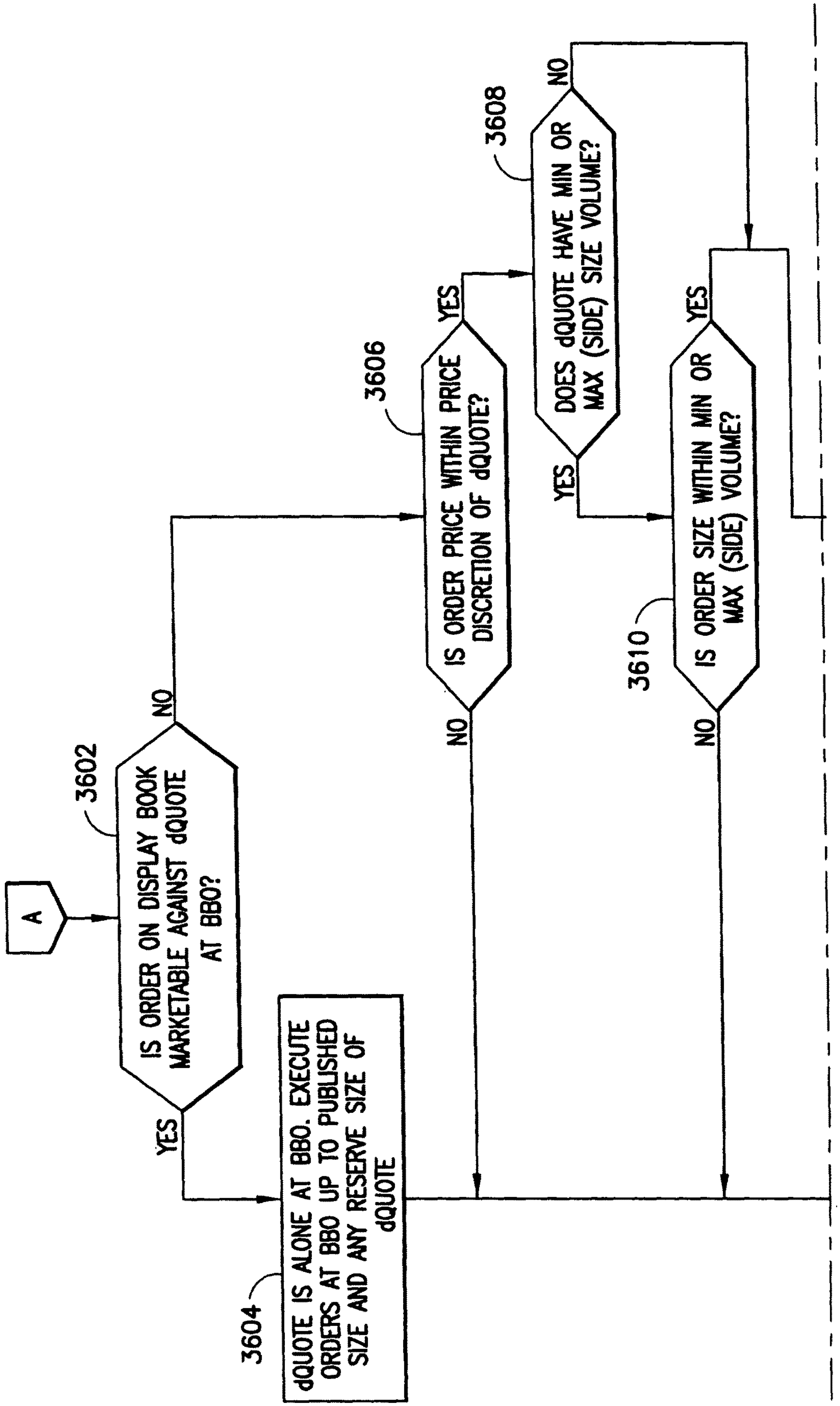
Figure 36B:
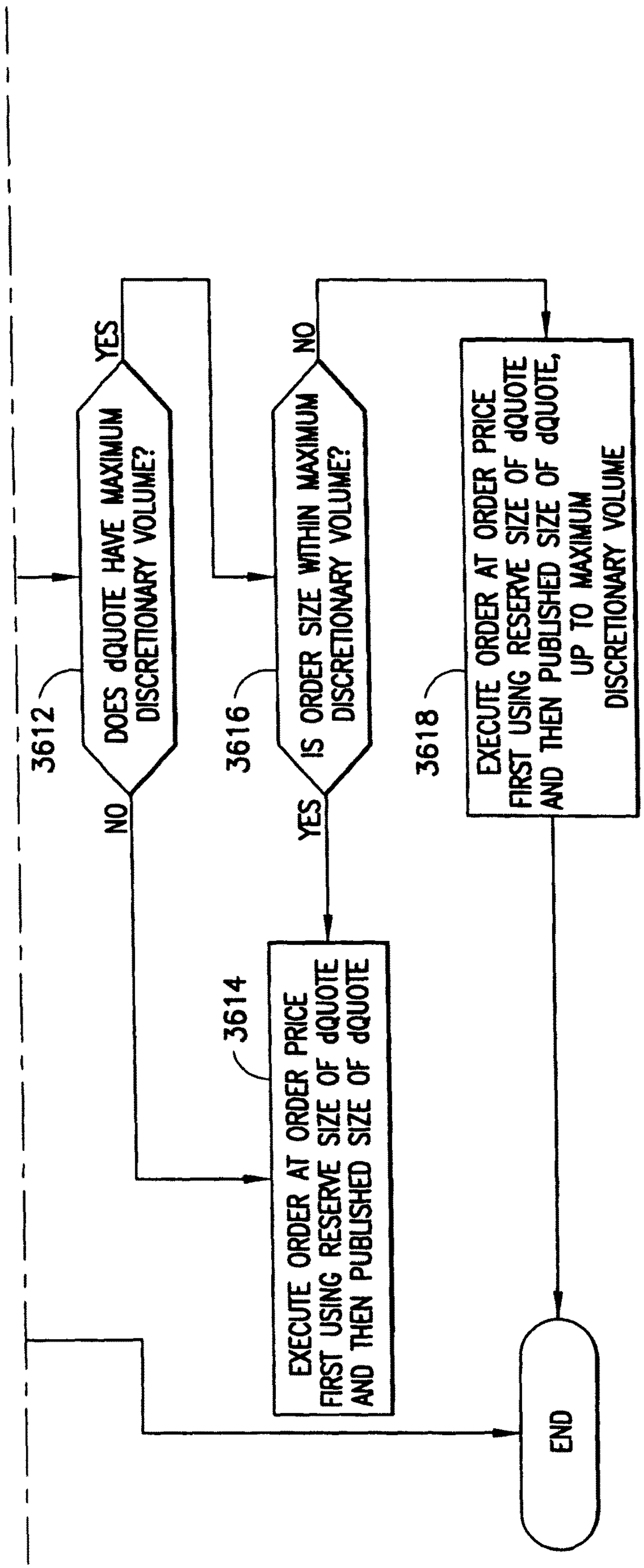
Figure 36:
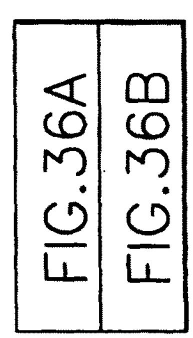
Figure 37:
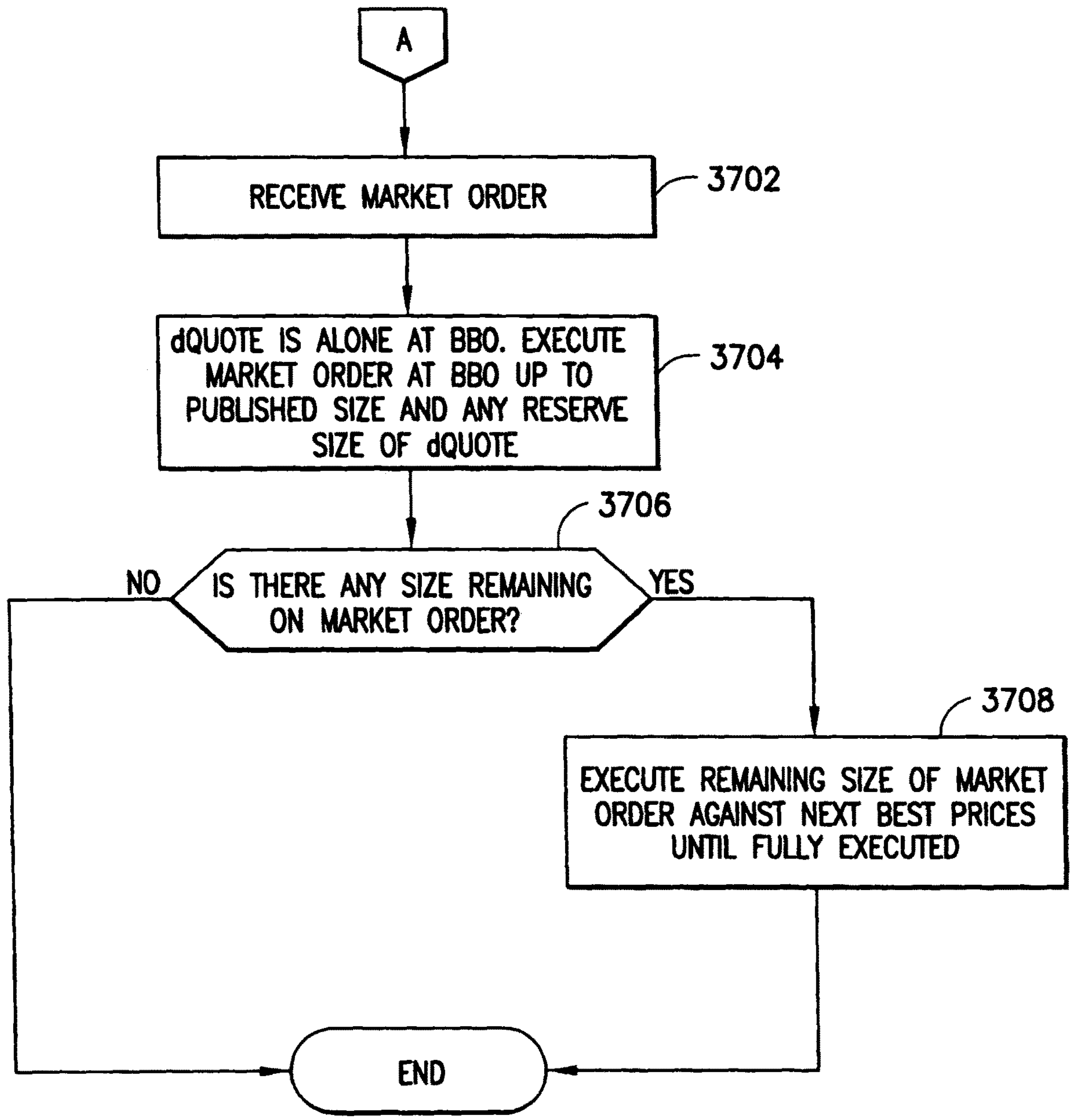

If at step 3408, system 100 establishes the d-Quote is a new BBO, then system 100 has a number of possible actions, some of which are illustrated in FIGS. 35-37.

Referring to FIG. 35, at step 3502, system 100 receives a limit order. At step 3504, system 100 determines whether the limit order is marketable against the BBO. A limit order is marketable against the BBO if it is priced at the BBO, or priced better than the BBO. FIG. 6 illustrates a marketable limit order priced at the BBO, and FIG. 7 illustrates a marketable limit order priced better than the BBO. If at step 3504 system 100 determines that the limit order is marketable against the BBO, then at step 3506, system 100 executes the limit order at the BBO up to the published size and any reserve size at the BBO. Then, at step 3508, system 100 determines whether any size remains on the limit order.

If at step 3508 system 100 determines there is size remaining on the limit order, then at step 3510, system 100 executes any remaining limit order size against other orders on the display book at the BBO, and also sweeps the display book if possible to execute any remaining unexecuted size. Then, at step 3512, system 100 adds any unexecuted size of the limit order to the display book.

If at step 3504, system 100 determines that the limit order is not marketable against the BBO, then at step 3514, system 100 determines whether the limit order price is within any price discretion of the d-Quote. If the limit order price is not within any price discretion of the d-Quote, then at step 3516, system 100 adds the limit order to the display book.

If at step 3514, system 100 determines that the limit order price is within any price discretion of the d-Quote, then at step 3518, system 100 determines whether the d-Quote has minimum (side) size or maximum (side) size. If the d-Quote has minimum (side) size or maximum (side) size, then at step 3520, system 100 determines whether the limit order size is within the d-Quote minimum (side) size or maximum (side) size.

If at step 3520, system 100 determines that the limit order size is not within the d-Quote minimum (side) size or maximum (side) size, then at step 3516, system 100 adds the limit order to the display book.

If at step 3518, system 100 determines that the d-Quote does not have minimum (side) size or maximum (side) size, or at step 3520, system 100 determines that the limit order size is within the d-Quote minimum (side) size or maximum (side) size, then at step 3522, system 100 determines whether the d-Quote has a maximum discretionary volume. If the d-Quote does not have a maximum discretionary volume, then at step 3524, system 100 executes the limit order at the limit order price first using reserve size of the d-Quote and then published size of the d-Quote. System 100 then determines at step 3508 whether there is any size remaining on the limit order, as discussed above.

If at step 3522, system 100 determines that the d-Quote has a maximum discretionary volume, then at step 3526, system 100 determines whether the limit order size is within the maximum discretionary volume. If the limit order size is within the maximum discretionary volume, then as discussed above, at step 3524, system 100 executes the limit order at the limit order price first using reserve size of the d-Quote and then published size of the d-Quote.

If at step 3526, system 100 determines that the limit order size is not within the maximum discretionary volume, then at step 3528, system 100 executes the limit order at the limit order price first using reserve size of the d-Quote and then published size of the d-Quote, up to the maximum discretionary volume. Then, as discussed above, at step 3508, system 100 determines whether there is any size remaining on the limit order.

FIG. 36 illustrates another option after system 100 establishes the d-Quote as the new BBO in step 3408 of FIG. 34. At step 3602, system 100 determines whether there are any orders on the display book that are marketable at the BBO against the d-Quote. If there are orders on the display book that are marketable at the BBO against the d-Quote, then at step 3604, system 100 executes the orders at the BBO first against any reserve and then against the published size, up to the total of the published and any reserve size of the d-Quote.

If at step 3602, system 100 determines that there are no orders on the display book that are marketable at the BBO against the d-Quote, then at step 3606, system 100 determines whether the order price is within any price discretion of the d-Quote. If the order price is not within any price discretion of the d-Quote, then there is no execution.

If at step 3606, system 100 determines that the order price is within any price discretion of the d-Quote, then at step 3608, system 100 determines whether the d-Quote has any minimum (side) size or maximum (side) size volume. If the d-Quote has any minimum (side) size or maximum (side) size volume, then at step 3610, system 100 determines whether the order size is within the minimum (side) size or maximum (side) size volume. If the order size is not within the minimum (side) size or maximum (side) size volume of the d-Quote, then there is no execution.

If at step 3608, system 100 determines that the d-Quote does not have any minimum (side) size or maximum (side) size volume, or at step 3610, system 100 determines that the order size is within the minimum (side) size or maximum (side) size volume, then at step 3612, system 100 determines whether the d-Quote has any maximum discretionary volume. If the d-Quote does not have any maximum discretionary volume, then at step 3614, system 100 executes the order at the order price first using any reserve size of the d-Quote and then using published size of the d-Quote.

If at step 3612, system 100 determines that the d-Quote has any maximum discretionary volume, then at step 3616, system 100 determines whether the order size is within the maximum discretionary volume. If the order size is within the maximum discretionary volume, then at step 3614, system 100 executes the order at the order price first using any reserve size of the d-Quote and then using published size of the d-Quote.

If at step 3616, system 100 determines that the order size is not within the maximum discretionary volume, then at step 3618, system 100 executes the order at the order price first using reserve size of the d-Quote and then published size of the d-Quote, up to the maximum discretionary volume.

FIG. 37 illustrates another option after system 100 establishes the d-Quote as the new BBO in step 3408 of FIG. 34. At step 3702, system 100 receives a market order. At step 3704, system 100 executes the market order at the BBO first against the reserve size and then against the published size up to total of the published and reserve size.

At step 3706, system 100 determines whether any size remains on the market order, and if so, at step 3708 executes the remaining size against the next best prices on the order display book until the market order is fully executed.

Figure 38A:
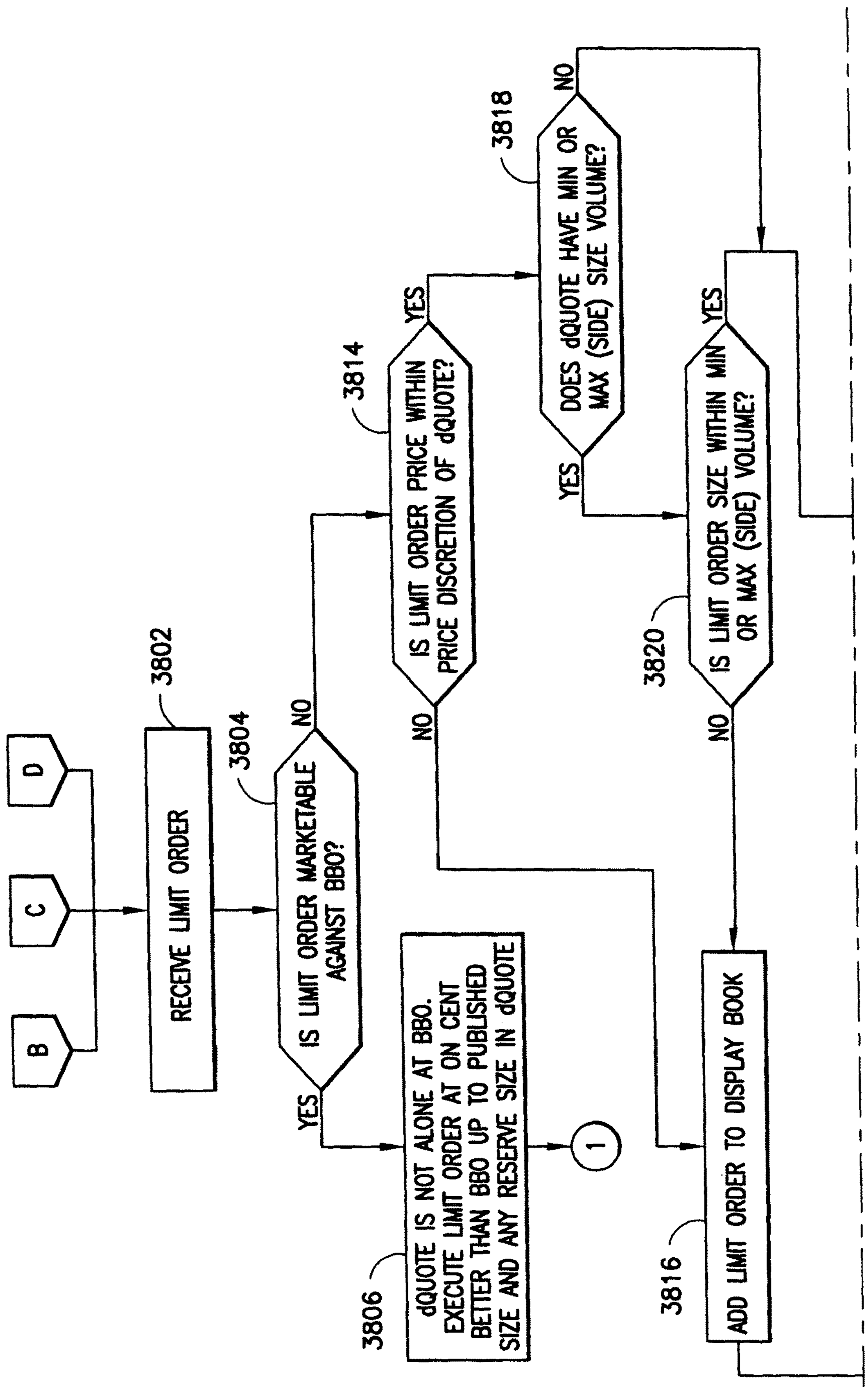
Figures 38, 38B:
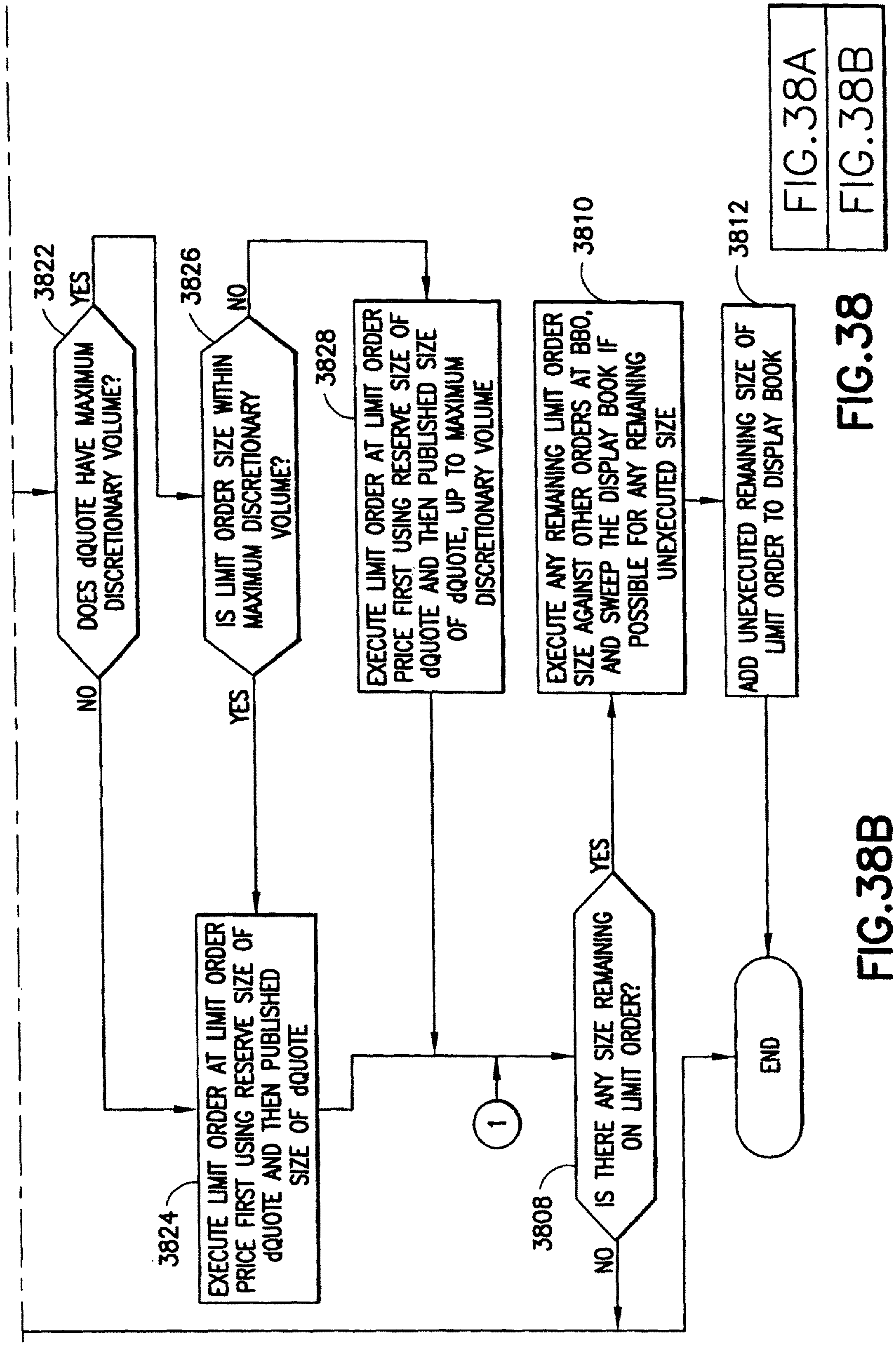

If at step 3404 of FIG. 34, system 100 adds the size of the d-Quote to existing size at the BBO, or at steps 3420 or 3422, system 100 pegs the d-Quote to the BBO, then system 100 has a number of possible actions, one of which is illustrated in FIG. 38.

Referring to FIG. 38, at step 3802, system 100 receives a limit order. At step 3804, system 100 determines whether the limit order is marketable against the BBO. As discussed above, a limit order is marketable against the BBO if it is priced at the BBO, or priced better than the BBO. FIG. 6 illustrates a marketable limit order priced at the BBO, and FIG. 7 illustrates a marketable limit order priced better than the BBO. If at step 3804 system 100 determines that the limit order is marketable against the BBO, then at step 3806, system 100 executes the limit order at one cent better than the BBO up to the published size and any reserve size at the BBO. Then, at step 3808, system 100 determines whether any size remains on the limit order.

If at step 3808 system 100 determines there is size remaining on the limit order, then at step 3810, system 100 executes any remaining limit order size against other orders on the display book at the BBO, and also sweeps the display book if possible to execute any remaining unexecuted size. Then, at step 3812, system 100 adds any unexecuted size of the limit order to the display book.

If at step 3804, system 100 determines that the limit order is not marketable against the BBO, then at step 3814, system 100 determines whether the limit order price is within any price discretion of the d-Quote. If the limit order price is not within any price discretion of the d-Quote, then at step 3816, system 100 adds the limit order to the display book.

If at step 3814, system 100 determines that the limit order price is within any price discretion of the d-Quote, then at step 3818, system 100 determines whether the d-Quote has minimum (side) size or maximum (side) size. If the d-Quote has minimum (side) size or maximum (side) size, then at step 3820, system 100 determines whether the limit order size is within the d-Quote minimum (side) size or maximum (side) size.

If at step 3820, system 100 determines that the limit order size is not within the d-Quote minimum (side) size or maximum (side) size, then at step 3816, system 100 adds the limit order to the display book.

If at step 3818, system 100 determines that the d-Quote does not have minimum (side) size or maximum (side) size, or at step 3820, system 100 determines that the limit order size is within the d-Quote minimum (side) size or maximum (side) size, then at step 3822, system 100 determines whether the d-Quote has a maximum discretionary volume. If the d-Quote does not have a maximum discretionary volume, then at step 3824, system 100 executes the limit order at the limit order price first using reserve size of the d-Quote and then published size of the d-Quote. System 100 then determines at step 3808 whether there is any size remaining on the limit order, as discussed above.

If at step 3822, system 100 determines that the d-Quote has a maximum discretionary volume, then at step 3826, system 100 determines whether the limit order size is within the maximum discretionary volume. If the limit order size is within the maximum discretionary volume, then as discussed above, at step 3824, system 100 executes the limit order at the limit order price first using reserve size of the d-Quote and then published size of the d-Quote.

If at step 3826, system 100 determines that the limit order size is not within the maximum discretionary volume, then at step 3828, system 100 executes the limit order at the limit order price first using reserve size of the d-Quote and then published size of the d-Quote, up to the maximum discretionary volume. Then, as discussed above, at step 3808, system 100 determines whether there is any size remaining on the limit order.

Many of the example embodiments above are described with steps performed in on order. However, it is envisioned and anticipated that steps might be performed in different orders and that some steps might not be performed and/or additional steps might be performed.

Although illustrative embodiments have been described herein in detail, it should be noted and will be appreciated by those skilled in the art that numerous variations may be made within the scope of this invention without departing from the principle of this invention and without sacrificing its chief advantages.

Many of the example embodiments described above and illustrated in FIGS. 2-38 use a buy or a sell order to illustrate the embodiment. In the interest of brevity, a corresponding opposite example using a sell or buy order is not provided However, there is no intention to limit the inventions to only the examples, and transactions using the opposite type of order are clearly envisioned.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

The invention claimed is:

1. A computer-implemented method for improving data throughput on an electronic exchange system, the method comprising:

in the electronic exchange system comprising a programmed computer coupled to one or more participant computers, one or more external market data sources, and a display book system embodied on a computing device and comprising a display, each in communication with the electronic exchange system through a network, the programmed computer comprising non-transitory memory and at least one processor executing computer-readable instructions stored in the non-transitory memory, the computer-readable instructions causing the programmed computer to perform the functions of:

monitoring, in real-time by the programmed computer, fluctuations to external market data from the one or more external market data sources;

determining, by the programmed computer, an exchange best bid or offer (BBO) of the electronic exchange system that fluctuates in response to the monitored fluctuations in the external market data;

maintaining, by the programmed computer, one or more data values displayed on said display of the display book system and actionable via the display book system, said maintaining comprising:

receiving, by the programmed computer, broker interests via the one or more participant computers, the broker interests including a broker interest as instructions to buy or sell a security at a first price with a discretionary price range, a floor price, a ceiling price, a maximum trade size and a maximum discretionary volume size, wherein the maximum discretionary volume size is less than the maximum trade size, the floor price and the ceiling price comprising the discretionary price range, automatically and continually comparing the broker interests to the fluctuating BBO, responsive to the monitored fluctuations, automatically identifying, responsive to the comparing, one or more ineligible broker interests among the broker interests that do not match the fluctuating BBO, said one or more ineligible broker interests ineligible for display via the display book system and therefore ineligible for execution by the programmed computer, when the one or more ineligible broker interests are within the discretionary price range and prior to the one or more ineligible broker interests being automatically removed from the display of the display book system and becoming unactionable, —automatically correcting the one or more ineligible broker interests to match the fluctuating BBO to form one or more corrected broker interests such that said one or more corrected broker interests are displayed by the programmed computer on said display of the display book system as actionable indicators that are continuously actionable, such that selecting at least one of the actionable indicators results in an automatic initiation of a selective execution operation;

automatically removing any of the one or more of the broker interests not corrected by the programmed computer from said display of the display book system such that those broker interests not corrected are unactionable; and receiving, by the programmed computer, one or more orders from among the one or more participant computers responsive to a displayed broker interest among the actionable indicators on the display book system, the received one or more orders causing the programmed computer to execute further computer-readable instructions, thereby causing the programmed computer to further perform the function of:

selectively executing the displayed broker interest against the received one or more orders for the security, comprising:

receiving an order from among the one or more orders for the security with an order trade size, wherein the order for the security is an order to sell if the displayed broker interest is to buy, and the order for the security is an order to buy if the displayed broker interest is to sell, determining whether the order trade size is or is not less than the maximum trade size, responsive to determining that the order trade size is less than the maximum trade size, trading at least part of the displayed broker interest against the order up to the maximum discretionary volume size, and responsive to determining that the order trade size is not less than the maximum trade size, trading no part of the displayed broker interest against the order.

2. The method according to claim 1, wherein the order is a market order.

3. The method according to claim 1, wherein the order is limit order.

4. The method according to claim 1, further comprising:

in response to determining that at least one of the broker interests does not match the fluctuating BBO, comparing the fluctuating BBO to a price range set by the broker:

a) when the comparison indicates that the fluctuating BBO is within the price range, automatically correcting the one or more of the broker interests to match the BBO, and b) when the comparison indicates that the fluctuating BBO is outside of the price range, maintaining the at least one of the broker interests thereby removing the at least one of the broker interests from said display of the display book system as a result of a change in the external market data linked to said at least one of the broker interests.

5. The method according to claim 1 further comprising:

when the one or more ineligible broker interests are outside the discretionary price range, (a) automatically correcting the one or more ineligible broker interest to one of the floor price and the ceiling price, and (b) automatically eliminating the discretionary price range contrary to the respective instructions.

6. A computer-implemented method for improving data throughput on an electronic exchange system, the method comprising:

in the electronic exchange system comprising a programmed computer coupled to one or more participant computers, one or more external market data sources, and a display book system embodied in a computing device and comprising a display, each in communication with the electronic exchange system through a network, the programmed computer comprising non-transitory memory and at least one processor executing computer-readable instructions stored in the non-transitory memory, the computer-readable instructions causing the programmed computer to perform the functions of:

monitoring, in real-time by the programmed computer, fluctuations to external market data from the one or more external market data sources;

determining an exchange best bid or offer (BBO) of the electronic exchange system that fluctuates in response to the monitored fluctuations in the external market data;

maintaining, by the programmed computer, one or more data values displayed on said display of the display book system and actionable via the display book system, said maintaining comprising:

receiving, by the programmed computer, broker interests via the one or more participant computers, the broker interests including a broker interest as instructions to buy or sell a security at a first price with a discretionary price range, a floor price, a ceiling price, a maximum trade size and a maximum discretionary volume size, wherein the maximum discretionary volume size is less than the maximum trade size, the floor price and the ceiling price comprising the discretionary price range, automatically and continually comparing the broker interests to the fluctuating BBO, responsive to the monitored fluctuations, automatically identifying, responsive to the comparing, one or more ineligible broker interests among the broker interests that do not match the fluctuating BBO, said one or more ineligible broker interests ineligible for display via the display book system and therefore ineligible for execution by the programmed computer, when the one or more ineligible broker interests are within the discretionary price range and prior to the one or more ineligible broker interests being automatically removed from the display of the display book system and becoming unactionable, automatically correcting the one or more ineligible broker interests to match the fluctuating BBO to form one or more corrected broker interests such that said one or more corrected broker interests are displayed by the programmed computer on said display of the display book system as actionable indicators that are continuously actionable, such that selecting at least one of the actionable indicators results in an automatic initiation of a selective execution operation;

automatically removing any of the one or more of the broker interests not corrected by the programmed computer from said display of the display book system such that those broker interests not corrected are unactionable; and receiving, by the programmed computer, one or more orders from among the one or more participant computers responsive to a displayed broker interest among the actionable indicators on the display book system, the received one or more orders causing the programmed computer to execute further computer-readable instructions, thereby causing the programmed computer to further perform the function of:

selectively executing the displayed broker interest against the received one or more orders for the security, comprising:

receiving an order from among the one or more orders for the security with an order trade size, wherein the order for the security is an order to sell if the displayed broker interest is to buy, and the order for the security is an order to buy if the displayed broker interest is to sell, determining whether the order trade size is or is not greater than a minimum trade size, determining whether the order trade size is or is not less than the maximum trade size, responsive to determining that the order trade size is greater than the minimum trade size and determining that the order trade size is less than the maximum trade size, trading at least part of the displayed broker interest against the order up to the maximum discretionary volume size, and responsive to determining that the order trade size is not greater than the minimum trade size or determining that the order trade size is not less than the maximum trade size, trading no part of the displayed broker interest against the order.

7. The method according to claim 6, wherein the order is a market order.

8. The method according to claim 6, wherein the order is a limit order.

9. A computer-implemented method for improving data throughput on an electronic exchange system, the method comprising:

in the electronic exchange system comprising a programmed computer coupled to one or more participant computers, one or more external data sources, and a display book system embodied on a computing device and comprising a display, each in communication with the electronic exchange system through a network, the programmed computer comprising non-transitory memory and at least one processor executing computer-readable instructions stored in the non-transitory memory, the computer-readable instructions causing the programmed computer to perform the functions of:

monitoring, in real-time by the programmed computer, fluctuations to external market data from the one or more external market data sources;

determining an exchange best bid or offer (BBO) of the electronic exchange system that fluctuates in response to the monitored fluctuations in the external market data;

maintaining, by the programmed computer, one or more data values displayed on said display of the display book system and actionable via the display book system, said maintaining comprising:

receiving, by the programmed computer, broker interests via the one or more participant computers, the broker interests including a broker interest as instructions to buy or sell a security at a first price with a discretionary price range, a floor price, a ceiling price, a maximum trade size and a maximum discretionary volume size, wherein the maximum discretionary volume size is less than the maximum trade size, the floor price and the ceiling price comprising the discretionary price range, automatically and continually comparing the broker interests to the fluctuating BBO, responsive to the monitored fluctuations, automatically identifying, responsive to the comparing, one or more ineligible broker interests among the broker interests that do not match the fluctuating BBO, said one or more ineligible broker interests ineligible for display via the display book system and therefore ineligible for execution by the programmed computer, when the one or more ineligible broker interests are within the discretionary price range and prior to the one or more ineligible broker interests being automatically removed from the display of the display book system and becoming unactionable, —automatically correcting the one or more ineligible broker interests to match the fluctuating BBO to form one or more corrected broker interests such that said one or more corrected broker interests are displayed by the programmed computer on said display of the display book system as actionable indicator that are continuously actionable, such that selecting at least one of the actionable indicators results in an automatic initiation of a selective execution operation;

automatically removing any of the one or more of the broker interests not corrected by the programmed computer from said display of the display book system such that those broker interests not corrected are unactionable; and receiving, by the programmed computer, one or more orders from among the one or more participant computers responsive to a displayed broker interest among the actionable indicators on the display book system, the received one or more orders causing the programmed computer to execute further computer-readable instructions, thereby causing the programmed computer to further perform the function of:

selectively executing the displayed broker interest against the received one or more orders for the security, comprising:

receiving an order from among the one or more orders to buy the security with an order trade price, and an order trade size, determining whether the order trade price is or is not less than the first price, determining whether the order trade price is or is not within the discretionary price range, determining whether the order trade size is or is not greater than a minimum trade size, determining whether the order trade size is or is not less than the maximum trade size, responsive to determining that the order trade price is less than the first price; determining that the order trade price is within the discretionary price range; determining that the order trade size is greater than the minimum trade size and determining that the order trade size is less than the maximum trade size, trading at least part of the displayed broker interest against the order up to the maximum discretionary volume size, and responsive to determining that the order trade price is not less than the first price; or determining that the order trade price is not within the discretionary price range; or determining that the order trade size is not greater than the minimum trade size; or determining that the order trade size is not less than the maximum trade size, trading no part of the displayed broker interest against the order.

10. The method according to claim 9, wherein trading is at the order trade price.

11. The method according to claim 9, wherein trading is at a lower limit of the discretionary price range.

12. The method according to claim 9, wherein the order is a limit order.

13. A computer-implemented method for improving data throughput on an electronic exchange system, the method comprising:

in the electronic exchange system comprising a programmed computer coupled to one or more participant computers, one or more external market data sources, and a display book system embodied on a computing device and comprising a display, each in communication with the electronic exchange system through a network, the programmed computer comprising non-transitory memory and at least one processor executing computer-readable instructions stored in the non-transitory memory, the computer-readable instructions causing the programmed computer to perform the functions of:

monitoring, in real-time by the programmed computer, fluctuations to external market data from the one or more external market data sources;

determining an exchange best bid or offer (BBO) of the electronic exchange system that fluctuates in response to the monitored fluctuations in the external market data;

maintaining, by the programmed computer, one or more data values displayed on said display of the display book system and actionable via the display book system, said maintaining comprising:

receiving, by the programmed computer, broker interests via the one or more participant computers, the broker interests including a broker interest as instructions to buy or sell a security at a first price with a discretionary price range, a floor price, a ceiling price, a maximum trade size and a maximum discretionary volume size, wherein the maximum discretionary volume size is less than the maximum trade size, the floor price and the ceiling price comprising the discretionary price range, automatically and continually comparing the broker interests to the fluctuating BBO, responsive to the monitored fluctuations, automatically identifying, responsive to the comparing, one or more ineligible broker interests among the broker interests that do not match the fluctuating BBO, said one or more ineligible broker interests ineligible for display via the display book system and therefore ineligible for execution by the programmed computer, when the one or more ineligible broker interests are within the discretionary price range and prior to the one or more ineligible broker interests being automatically removed from the display of the display book system and becoming unactionable, —automatically correcting the one or more ineligible broker interests to match the fluctuating BBO to form one or more corrected broker interests such that said one or more corrected broker interests are displayed by the programmed computer on said display of the display book system as actionable indicators that are continuously actionable, such that selecting at least one of the actionable indicators results in an automatic initiation of a selective execution operation;

automatically removing any of the one or more of the broker interests not corrected by the programmed computer from said display of the display book system such that those broker interests not corrected are unactionable; and receiving, by the programmed computer, one or more orders from among the one or more participant computers responsive to a displayed broker interest among the actionable indicators on the display book system, the received one or more orders causing the programmed computer to execute further computer-readable instructions, thereby causing the programmed computer to further perform the function of:

selectively executing the displayed broker interest against the received one or more orders for the security, comprising:

receiving an order from among the one or more orders to sell the security with an order trade price, and an order trade size, determining whether the order trade price is or is not greater than the first price, determining whether the order trade price is or is not within the discretionary price range, determining whether the order trade size is or is not greater than a minimum trade size, determining whether the order trade size is or is not less than the maximum trade size, responsive to determining that the order trade price is greater than the first price; determining that the order trade price is within the discretionary price range; determining that the order trade size is greater than the minimum trade size and determining that the order trade size is less than the maximum trade size, trading at least part of the displayed broker interest against the order up to the maximum discretionary volume size, and responsive to determining that the order trade price is not greater than the first price; or determining that the order trade price is not within the discretionary price range; or determining that the order trade size is not greater than the minimum trade size; or determining that the order trade size is not less than the maximum trade size, trading no part of the displayed broker interest against the order.

14. The method according to claim 13, wherein trading is at the order trade price.

15. The method according to claim 13, wherein trading is at an upper limit of the discretionary price range.

16. The method according to claim 13, wherein the order is a limit order.

17. A computer-implemented method for improving data throughput on an electronic exchange system, the method comprising:

in the electronic exchange system comprising a programmed computer coupled to one or more participant computers, one or more external market data sources, and a display book system embodied on a computing device and comprising a display, each in communication with the electronic exchange system through a network, the programmed computer comprising non-transitory memory and at least one processor executing computer-readable instructions stored in the non-transitory memory, the computer-readable instructions causing the programmed computer to perform the functions of:

monitoring, in real-time by the programmed computer, fluctuations to external market data from the one or more external market data sources;

determining, by the programmed computer, an exchange best bid or offer (BBO) of the electronic exchange system that fluctuates in response to the monitored fluctuations in the external market data;

maintaining, by the programmed computer, one or more data values displayed on said display of the display book system and actionable via the display book system, said maintaining comprising:

receiving, by the programmed computer, broker interests via the one or more participant computers, the broker interests including a broker interest as instructions to buy or sell a security at a first price with a discretionary price range, a floor price, a ceiling price, a maximum trade size and a maximum discretionary volume size, wherein the maximum discretionary volume size is less than the maximum trade size, the floor price and the ceiling price comprising the discretionary price range, automatically and continually comparing the broker interests to the fluctuating BBO, responsive to the monitored fluctuations, automatically identifying, responsive to the comparing, one or more ineligible broker interests among the broker interests that do not match the fluctuating BBO, said one or more ineligible broker interests ineligible for display via the display book system and therefore ineligible for execution by the programmed computer, when the one or more ineligible broker interests are within the discretionary price range and prior to the one or more ineligible broker interests being automatically removed from the display of the display book system and becoming unactionable, —automatically correcting the one or more ineligible broker interests to match the fluctuating BBO to form one or more corrected broker interests such that said one or more corrected broker interests are displayed by the programmed computer on said display of the display book system as actionable indicators that are continuously actionable, such that selecting at least one of the actionable indicators results in an automatic initiation of a selective execution operation;

automatically removing any of the one or more of the broker interests not corrected by the programmed computer from said display of the display book system such that those broker interests not corrected are unactionable; and receiving, by the programmed computer, one or more orders from among the one or more participant computers responsive to a displayed broker interest among the actionable indicators on the display book system, the received one or more orders causing the programmed computer to execute further computer-readable instructions, thereby causing the programmed computer to further perform the function of:

selectively executing the displayed broker interest against the received one or more orders for the security, comprising:

receiving a market order from among the one or more orders to buy the security, and trading at least part of the displayed broker interest against the market order at a trade price that is one cent below the first price.

18. A computer-implemented method for improving data throughput on an electronic exchange system, the method comprising:

in the electronic exchange system comprising a programmed computer coupled to one or more participant computers, one or more external market data sources, and a display book system embodied on a computing device and comprising a display, each in communication with the electronic exchange system through a network, the programmed computer comprising non-transitory memory and at least one processor executing computer-readable instructions stored in the non-transitory memory, the computer-readable instructions causing the programmed computer to perform the functions of:

monitoring, in real-time by the programmed computer, fluctuations to external market data from the one or more external market data sources;

determining an exchange best bid or offer (BBO) of the electronic exchange system that fluctuates in response to the monitored fluctuations in the external market data;

maintaining, by the programmed computer, one or more data values displayed on said display of the display book system and actionable via the display book system, said maintaining comprising:

receiving, by the programmed computer, broker interests via the one or more participant computers, the broker interests including a broker interest as instructions to buy or sell a security at a first price with a discretionary price range, a floor price, a ceiling price, a maximum trade size and a maximum discretionary volume size, wherein the maximum discretionary volume size is less than the maximum trade size, the floor price and the ceiling price comprising the discretionary price range, automatically and continually comparing the broker interests to the fluctuating BBO, responsive to the monitored fluctuations, automatically identifying, responsive to the comparing, one or more ineligible broker interests among the broker interests that do not match the fluctuating BBO, said one or more ineligible broker interests ineligible for display via the display book system and therefore ineligible for execution by the programmed computer, when the one or more ineligible broker interests are within the discretionary price range and prior to the one or more ineligible broker interests being automatically removed from the display of the display book system and becoming unactionable, —automatically correcting the one or more ineligible broker interests to match the fluctuating BBO to form one or more corrected broker interests such that said one or more corrected broker interests are displayed by the programmed computer on said display of the display book system as actionable indicators that are continuously actionable, such that selecting at least one of the actionable indicators results in an automatic initiation of a selective execution operation;

automatically removing any of the one or more of the broker interests not corrected by the programmed computer from said display of the display book system such that those broker interests not corrected are unactionable; and receiving, by the programmed computer, one or more orders from among the one or more participant computers responsive to a displayed broker interest among the actionable indicators on the display book system, the received one or more orders causing the programmed computer to execute further computer-readable instructions, thereby causing the programmed computer to further perform the function of:

selectively executing the displayed broker interest against the received one or more orders for the security, comprising:

receiving a market order from among the one or more orders to sell the security, and trading at least part of the displayed broker interest against the market order at a trade price that is one cent above the first price.

19. A programmed computer system for improving data throughput on an electronic exchange system, the programmed computer system being within the electronic exchange system and comprising a programmed computer coupled to one or more participant computers, one or more external data sources, and a display book system embodied on a computing device and comprising a display, each in communication with the electronic exchange system through a network, the programmed computer comprising at least one processor executing computer software stored in non-transitory memory of the programmed computer, the computer software causing the programmed computer to:

monitor, in real-time by the programmed computer, fluctuations to external market data from the one or more external market data sources;

determine an exchange best bid or offer (BBO) of the electronic exchange system that fluctuates in response to the monitored fluctuations in the external market data;

maintain one or more data values displayed on said display of the display book system and actionable via the display book system, the computer software further causing the programmed computer to:

receive broker interests via the one or more participant computers, the broker interests including a broker interest as instructions to buy or sell a security at a first price with a discretionary price range, a floor price, a ceiling price, a maximum trade size and a maximum discretionary volume size, wherein the maximum discretionary volume size is less than the maximum trade size, the floor price and the ceiling price comprising the discretionary price range, automatically and continually compare the broker interests to the fluctuating BBO, responsive to the monitored fluctuations, automatically identify, responsive to the comparing, one or more ineligible broker interests among the broker interests that do not match the fluctuating BBO, said one or more ineligible broker interests ineligible for display via the display book system and therefore ineligible for execution by the programmed computer, when the one or more ineligible broker interests are within the discretionary price range and prior to the one or more ineligible broker interests being automatically removed from the display of the display book system and becoming unactionable, —automatically correct the one or more ineligible broker interests to match the fluctuating BBO to form one or more corrected broker interests such that said one or more corrected broker interests are displayed by the programmed computer on said display of the display book system as actionable indicators that are continuously actionable, such that selecting at least one of the actionable indicators results in an automatic initiation of a selective execution operation;

automatically remove any of the one or more of the broker interests not corrected by the programmed computer from said display of the display book system such that those broker interests not corrected are unactionable;

receive one or more orders from among the one or more participant computers responsive to a displayed broker interest among the actionable indicators on the display book system; and selectively execute the displayed broker interest against the received one or more orders for the security, the computer software further causing the programmed computer to:

receive a buy order from among the one or more orders for the security with an order trade price, and an order trade size, determine whether the order trade price is or is not less than the first price, determine whether the order trade price is or is not within the discretionary price range, determine whether the order trade size is or is not greater than a minimum trade size, determine whether the order trade size is or is not less than the maximum trade size, trade at least part of the displayed broker interest against the buy order up to the maximum discretionary volume size when it is determined that the order trade price is less than the first price, the order trade price is within the discretionary price range, the order trade size is greater than the minimum trade size and the order trade size is less than the maximum trade size, and trade no part of the displayed broker interest against the buy order when it is determined that the order trade price is not less than the first price, the order trade price is not within the discretionary price range, the order trade size is not greater than the minimum trade size or the order trade size is not less than the maximum trade size.

20. A non-transitory tangible computer-readable medium having computer executable software code stored thereon, the code for improving data throughput on an electronic exchange system, comprising code to:

in the electronic exchange system comprising a programmed computer coupled to one or more participant computers, one or more external market data sources, and a display book system embodied on a computing device and comprising a display, each in communication with the electronic exchange system through a network:

monitor, in real-time by the programmed computer, fluctuations to external market data from the one or more external market data sources;

determine an exchange best bid or offer (BBO) of the electronic exchange system that fluctuates in response to the monitored fluctuations in the external market data;

maintain, by the programmed computer, one or more data values displayed on said display of the display book system and actionable via the display book system, the executable software code further comprising code to cause the programmed computer to:

receive broker interests via the one or more participant computers, the broker interests including a broker interest as instructions to buy or sell a security at a first price with a discretionary price range, a floor price, a ceiling price, a maximum trade size and a maximum discretionary volume size, wherein the maximum discretionary volume size is less than the maximum trade size, the floor price and the ceiling price comprising the discretionary price range, automatically and continually compare the broker interests to the fluctuating BBO, responsive to the monitored fluctuations, automatically identify, responsive to the comparing, one or more ineligible broker interests among the broker interests that do not match the fluctuating BBO, said one or more ineligible broker interests ineligible for display via the display book system and therefore ineligible for execution by the programmed computer, when the one or more ineligible broker interests are within the discretionary price range and prior to the one or more ineligible broker interests being automatically removed from the display of the display book system and becoming unactionable, —automatically correct the one or more ineligible broker interests to match the fluctuating BBO to form one or more corrected broker interests such that said one or more corrected broker interests are displayed by the programmed computer on said display of the display book system as actionable indicators that are continuously actionable, such that selecting at least one of the actionable indicators results in an automatic initiation of a selective execution operation;

automatically remove any of the one or more of the broker interests not corrected by the programmed computer from said display of the display book system such that those broker interests not corrected are unactionable;

receive, by the programmed computer, one or more orders from among the one or more participant computers responsive to a displayed broker interest among the actionable indicators on the display book system; and selectively execute, by the programmed computer, the displayed broker interest against the received one or more orders for the security, the executable software code further comprising code to cause the programmed computer to:

receive a buy order from among the one or more orders for the security with an order trade price and an order trade size, determine whether the order trade price is less or is not less than the first price, determine whether the order trade price is or is not within the discretionary price range, determine whether the order trade size is or is not greater than a minimum trade size, determine whether the order trade size is or is not less than the maximum trade size, trade at least part of the displayed broker interest against the buy order up to the maximum discretionary volume size when it is determined that the order trade price is less than the first price, the order trade price is within the discretionary price range, the order trade size is greater than the minimum trade size and the order trade size is less than the maximum trade size, and trade no part of the displayed broker interest against the buy order when it is determined that the order trade price is not less than the first price, the order trade price is not within the discretionary price range, the order trade size is not greater than the minimum trade size or the order trade size is not less than the maximum trade size.

21. A programmed computer for improving data throughput on an electronic exchange system, comprising:

a memory having at least one region for storing computer executable program code; and a processor electronically communicating with the memory for executing the program code stored in the memory, the programmed computer coupled to one or more participant computers, one or more external market data sources, and a display book system embodied on a computing device and comprising a display, each in communication with the electronic exchange system through a network, the program code comprising code that causes the programmed computer to:

monitor, in real-time by the programmed computer, fluctuations to external market data from the one or more external market data sources;

determine an exchange best bid or offer (BBO) of the electronic exchange system that fluctuates in response to the monitored fluctuations in the external market data;

maintain one or more data values displayed on said display of the display book system and actionable via the display book system, said program code further comprising code that causes the programmed computer to:

receive broker interests via the one or more participant computers, the broker interests including a broker interest as instructions to buy or sell a security at a first price with a discretionary price range, a floor price, a ceiling price, a maximum trade size and a maximum discretionary volume size, wherein the maximum discretionary volume size is less than the maximum trade size, the floor price and the ceiling price comprising the discretionary price range, automatically and continually compare the broker interests to the fluctuating BBO, responsive to the monitored fluctuations, automatically identify, responsive to the comparing, one or more ineligible broker interests among the broker interests that do not match the fluctuating BBO, said one or more ineligible broker interests ineligible for display via the display book system and therefore ineligible for execution by the programmed computer, when the one or more ineligible broker interests are within the discretionary price range and prior to the one or more ineligible broker interests being automatically removed from the display of the display book system and becoming unactionable, —automatically correct the one or more ineligible broker interests to match the fluctuating BBO to form one or more corrected broker interests such that said one or more corrected broker interests are displayed by the programmed computer on said display of the display book system as actionable indicators that are continuously actionable, such that selecting at least one of the actionable indicators results in an automatic initiation of a selective execution operation;

automatically remove any of the one or more of the broker interests not corrected by the programmed computer from said display of the display book system such that those broker interests not corrected are unactionable;

receive one or more orders from among the one or more participant computers responsive to a displayed broker interest among the actionable indicators on the display book system; and selectively execute the displayed broker interest against the received one or more orders for the security, the program code further comprising code that causes the programmed computer to:

receive a buy order from among the one or more orders for the security with an order trade price and an order trade size, determine whether the order trade price is or is not less than the first price, determine whether the order trade price is or is not within the discretionary price range, determine whether the order trade size is or is not greater than a minimum trade size, determine whether the order trade size is or is not less than the maximum trade size, trade at least part of the displayed broker interest against the buy order up to the maximum discretionary volume size when it is determined that the order trade price is less than the first price, the order trade price is within the discretionary price range, the order trade size is greater than the minimum trade size and the order trade size is less than the maximum trade size, and trade no part of the displayed broker interest against the buy order when it is determined that the order trade price is not less than the first price, the order trade price is not within the discretionary price range, the order trade size is not greater than the minimum trade size or order trade size is not less than the maximum trade size.

22. A programmed computer system for improving data throughput on an electronic exchange system, the programmed computer system being within the electronic exchange system and comprising a programmed computer coupled to one or more participant computers, one or more external market data sources, and a display book system embodied on a computing device and comprising a display, each in communication with the electronic exchange system through a network, the programmed computer comprising at least one processor executing computer software stored in non-transitory memory of the programmed computer, the computer software causing the programmed computer to:

monitor in real-time by the programmed computer, fluctuations to external market data from the one or more external market data sources;

determine an exchange best bid or offer (BBO) of the electronic exchange system that fluctuates in response to the monitored fluctuations in the external market data;

maintain one or more data values displayed on said display of the display book system and actionable via the display book system, the computer software further causing the programmed computer to:

receive broker interests via the one or more participant computers, the broker interests including a broker interest as instructions to buy or sell a security at a first price with a discretionary price range, a floor price, a ceiling price, a maximum trade size and a maximum discretionary volume size, wherein the maximum discretionary volume size is less than the maximum trade size, the floor price and the ceiling price comprising the discretionary price range, automatically and continually compare the broker interests to the fluctuating BBO, responsive to the monitored fluctuations, automatically identify, responsive to the comparing, one or more ineligible broker interests among the broker interests that do not match the fluctuating BBO, said one or more ineligible broker interests ineligible for display via the display book system and therefore ineligible for execution by the programmed computer, when the one or more ineligible broker interests are within the discretionary price range and prior to the one or more ineligible broker interests being automatically removed from the display of the display book system and becoming unactionable, —automatically correct the one or more ineligible broker interests to match the fluctuating BBO to form one or more corrected broker interests such that said one or more corrected broker interests are displayed by the programmed computer on said display of the display book system as actionable indicators that are continuously actionable, such that selecting at least one of the actionable indicators results in an automatic initiation of a selective execution operation;

automatically remove any of the one or more of the broker interests not corrected by the programmed computer from said display of the display book system such that those broker interests not corrected are unactionable;

receive one or more orders from among the one or more participant computers responsive to a displayed broker interest among the actionable indicators on the display book system; and selectively execute the displayed broker interest against the received one or more orders for the security, said computer software further causing the programmed computer to:

receive a sell order from among the one or more orders for the security with an order trade price, and an order trade size, determine whether the order trade price is or is not greater than the first price, determine whether the order trade price is or is not within the discretionary price range, determine whether the order trade size is or is not greater than a minimum trade size, determine whether the order trade size is or is not less than the maximum trade size, trade at least part of the displayed broker interest against the sell order up to the maximum discretionary volume size when it is determined that the order trade price is greater than the price, the order trade price is within the discretionary price range, the order size is greater than the minimum trade size and the order trade size is less than the maximum trade size, and trade no part of the displayed broker interest against the sell order when it is determined that the order trade price is not greater than the first price, the order trade price is not within the discretionary price range, the order trade size is not greater than the minimum trade size or the order trade size is not less than the maximum trade size.

23. A non-transitory tangible computer-readable medium having computer executable software code stored thereon, the code for improving data throughput on an electronic exchange system, comprising code to:

in the electronic exchange system comprising a programmed computer coupled to one or more participant computers, one or more external market data sources, and a display book system embodied on a computing device and comprising a display, each in communication with the electronic exchange system through a network:

monitor, in real-time by the programmed computer, fluctuations to external market data from the one or more external market data sources;

determine an exchange best bid or offer (BBO) of the electronic exchange system that fluctuates in response to the monitored fluctuations in the external market data;

maintain, by the programmed computer, one or more data values displayed on said display of the display book system and actionable via the display book system, the computer executable software code further comprising code to cause the programmed computer to:

receive broker interests via the one or more participant computers, the broker interests including a broker interest as instructions to buy or sell a security at a first price with a discretionary price range, a floor price, a ceiling price, a maximum trade size and a maximum discretionary volume size, wherein the maximum discretionary volume size is less than the maximum trade size, the floor price and the ceiling price comprising the discretionary price range, automatically and continually compare the broker interests to the fluctuating BBO, responsive to the monitored fluctuations, automatically identify, responsive to the comparing, one or more ineligible broker interests among the broker interests that do not match the fluctuating BBO, said one or more ineligible broker interests ineligible for display via the display book system and therefore ineligible for execution by the programmed computer, when the one or more ineligible broker interests are within the discretionary price range and prior to the one or more ineligible broker interests being automatically removed from the display of the display book system and becoming unactionable, —automatically correct the one or more ineligible broker interests to match the fluctuating BBO to form one or more corrected broker interests such that said one or more corrected broker interests are displayed by the programmed computer on said display of the display book system as actionable indicators that are continuously actionable, such that selecting at least one of the actionable indicators results in an automatic initiation of a selective execution operation;

automatically remove any of the one or more of the broker interests not corrected by the programmed computer from said display of the display book system such that those broker interests not corrected are unactionable;

receive, by the programmed computer, one or more orders from among the one or more participant computers responsive to a displayed broker interest among the actionable indicators on the display book system; and selectively execute, by the programmed computer, the displayed broker interest against the received one or more orders for the security, the computer executable software code further comprising code to cause the programmed computer to:

receive a sell order from among the one or more orders for the security with an order trade price and an order trade size, determine whether the order trade price is or is not greater than the first price, determine whether the order trade price is or is not within the discretionary price range, determine whether the order trade size is or is not greater than a minimum trade size, determine whether the order trade size is or is not less than the maximum trade size, trade at least part of the displayed broker interest against the sell order up to the maximum discretionary volume size when it is determined that the order trade price is greater than the first price, the order trade price is within the discretionary price range, the order trade size is greater than the minimum trade size and the order trade size is less than the maximum trade size, and trade no part of the displayed broker interest against the sell order when it is determined that the order trade price is not greater than the first price, the order trade price is not within the discretionary price range, the order trade size is not greater than the minimum trade size or the order trade size is not less than the maximum trade size.

24. A programmed computer for improving data throughput on an electronic exchange system, comprising:

a memory having at least one region for storing computer executable program code; and a processor electronically communicating with the memory for executing the program code stored in the memory, the programmed computer coupled to one or more participant computers, one or more external market data sources, and a display book system embodied on a computing device and comprising a display, each in communication with the electronic exchange system through a network, the program code comprising code that causes the programmed computer to:

monitor, in real-time by the programmed computer, fluctuations to external market data from the one or more external market data sources;

determine an exchange best bid or offer (BBO) of the electronic exchange system that fluctuates in response to the monitored fluctuations in the external market data;

maintain one or more data values displayed on said display of the display book system and actionable via the display book system, the program code further comprising code that causes the programmed computer to:

receive broker interests via the one or more participant computers, the broker interests including a broker interest as instructions to buy or sell a security at a first price with a discretionary price range, a floor price, a ceiling price, a maximum trade size and a maximum discretionary volume size, wherein the maximum discretionary volume size is less than the maximum trade size, the floor price and the ceiling price comprising the discretionary price range, automatically and continually compare the broker interests to the fluctuating BBO, responsive to the monitored fluctuations, automatically identify, responsive to the comparing, one or more ineligible broker interests among the broker interests that do not match the fluctuating BBO, said one or more ineligible broker interests ineligible for display via the display book system and therefore ineligible for execution by the programmed computer, when the one or more ineligible broker interests are within the discretionary price range and prior to the one or more ineligible broker interests being automatically removed from the display of the display book system and becoming unactionable, —automatically correct the one or more ineligible broker interests to match the fluctuating BBO to form one or more corrected broker interests such that said one or more corrected broker interests are displayed by the programmed computer on said display of the display book system as actionable indicators that are continuously actionable, such that selecting at least one of the actionable indicators results in an automatic initiation of a selective execution operation;

automatically remove any of the one or more of the broker interests not corrected by the programmed computer from said display of the display book system such that those broker interests not corrected are unactionable;

receive one or more orders from among the one or more participant computers responsive to a displayed broker interest among the actionable indicators on the display book system; and selectively execute the displayed broker interest against the received one or more orders for the security, said program code further comprising code that causes the programmed computer to:

receive a sell order from among the one or more orders for the security with an order trade price and an order trade size, determine whether the order trade price is or is not greater than the first price, determine whether the order trade price is or is not within the discretionary price range, determine whether the order trade size is or is not greater than a minimum trade size, determine whether the order trade size is or is not less than the maximum trade size, trade at least part of the displayed broker interest against the sell order up to the maximum discretionary volume size when it is determined that the order trade price is greater than the first price, the order trade price is within the discretionary price range, the order trade size is greater than the minimum trade size and the order trade size is less than the maximum trade size, and trade no part of the displayed broker interest against the sell order when it is determined that the order trade price is not greater than the first price, the order trade price is not within the discretionary price range, the order trade size is not greater than the minimum trade size or that the order trade size is not less than the maximum trade size.

* * * * *